United States Patent [19]

Taniguchi et al.

[11] Patent Number: 5,754,899
[45] Date of Patent: May 19, 1998

[54] CAMERA CAPABLE OF TAKING PICTURES IN BOTH STANDARD FRAME AND PANORAMIC FRAME

[75] Inventors: Nobuyuki Taniguchi, Nishinomiya; Hideo Kajita, Minamikawachi; Yujiro Mima; Junji Hashimura, both of Sakai; Nobuya Miki, Nara-ken; Masayuki Ikemura, Osaka, all of Japan

[73] Assignee: Minolta Co., Ltd., Osaka, Japan

[21] Appl. No.: 424,102

[22] Filed: Apr. 19, 1995

Related U.S. Application Data

[62] Division of Ser. No. 2,080, Jan. 8, 1993, which is a continuation of Ser. No. 615,019, Nov. 9, 1990, abandoned.

[30] Foreign Application Priority Data

Nov. 10, 1989 [JP] Japan ................................. 1-292917
Nov. 22, 1989 [JP] Japan ................................. 1-303513

[51] Int. Cl.$^6$ ..................... G03B 7/097; G03B 17/24; G03B 17/00
[52] U.S. Cl. ..................... 396/243; 396/311; 396/436
[58] Field of Search ..................... 354/441, 442, 354/443, 105, 106, 159, 432; 396/60, 242, 243, 435, 436, 311

[56] References Cited

U.S. PATENT DOCUMENTS

| | | | |
|---|---|---|---|
| 3,678,834 | 7/1972 | Melillo | 95/36 |
| 4,180,314 | 12/1979 | Koch et al. | 354/159 |
| 4,202,624 | 5/1980 | Krehbiel | 354/159 X |
| 4,357,102 | 11/1982 | Taren et al. | 355/77 |
| 4,493,547 | 1/1985 | Bridges | 354/106 X |
| 4,515,457 | 5/1985 | Harvey | 354/443 |
| 4,639,111 | 1/1987 | Harvey | 354/106 X |
| 4,652,104 | 3/1987 | Harvey | 354/106 |
| 4,768,047 | 8/1988 | Taniguchi et al. | 354/195.1 |
| 4,774,536 | 9/1988 | Inoue et al. | 354/106 |
| 4,855,780 | 8/1989 | Hayakawa | 354/432 |
| 4,860,039 | 8/1989 | Hata et al. | 354/106 |
| 4,924,248 | 5/1990 | Taniguchi et al. | 354/195.1 |
| 5,010,357 | 4/1991 | Misawa | 354/159 |
| 5,051,770 | 9/1991 | Cornuejols | 354/432 |
| 5,086,311 | 2/1992 | Naka et al. | 354/106 X |
| 5,245,373 | 9/1993 | Ogawa et al. | 354/106 |
| 5,305,051 | 4/1994 | Irie et al. | 354/159 X |

FOREIGN PATENT DOCUMENTS

1222786  4/1964  Germany.

*Primary Examiner*—W. B. Perkey
*Attorney, Agent, or Firm*—Sidley & Austin

[57] ABSTRACT

A camera capable of taking pictures selectively in a standard or full size frame and a panorama frame having a reduced vertical dimension. This camera includes vertically movable light-shielding members for partly light-shielding an exposure range of the standard frame to set an exposure range of the panorama frame. When the panorama frame is selected, a warning is given on a display provided on the camera body to the effect that a date and other photographic information cannot be recorded on pictures taken in the panorama frame. The shutter of the camera includes an electronic device for detecting an amount of light traveling from a photographic object to which light is flashed. Output of this device is used for suitably controlling exposure for photography in the standard and panorama frames.

13 Claims, 40 Drawing Sheets

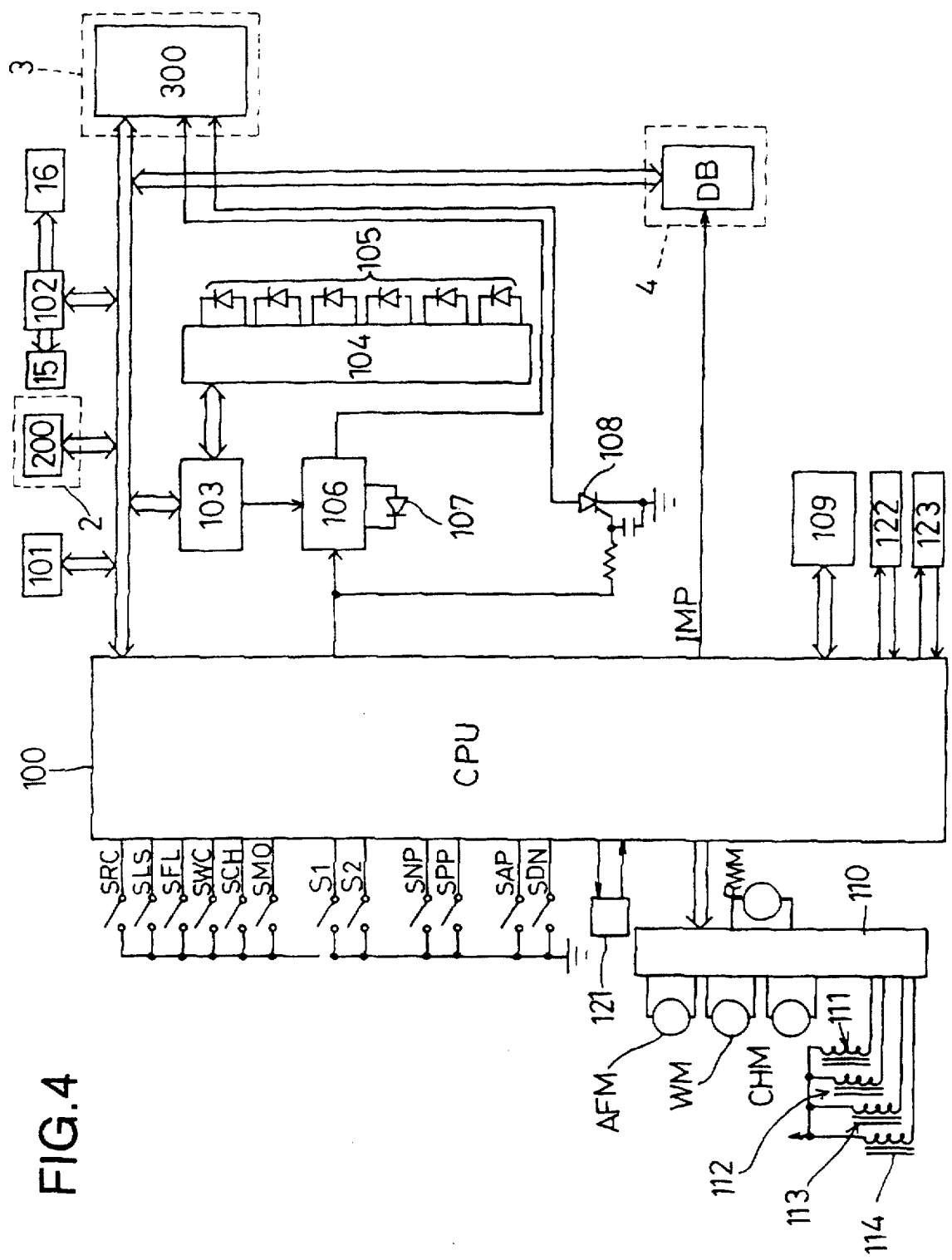

FIG.33
FIG.32
FIG.34
FIG.35
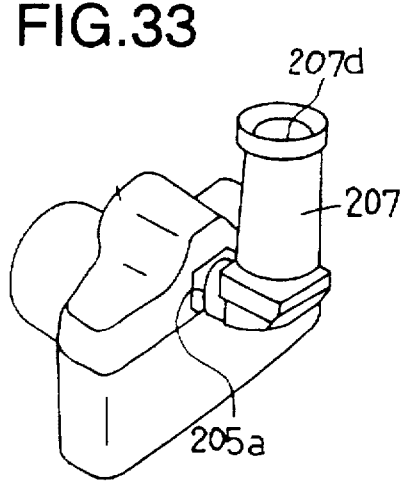
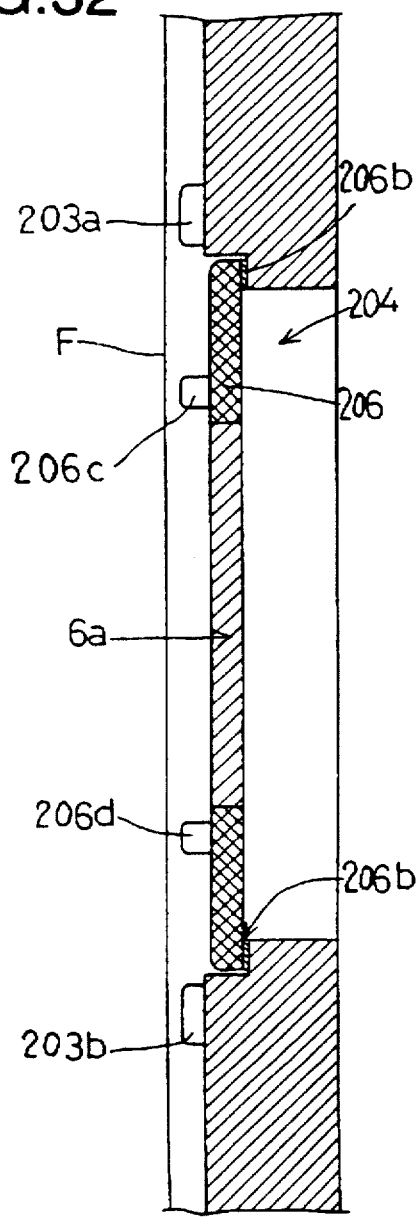
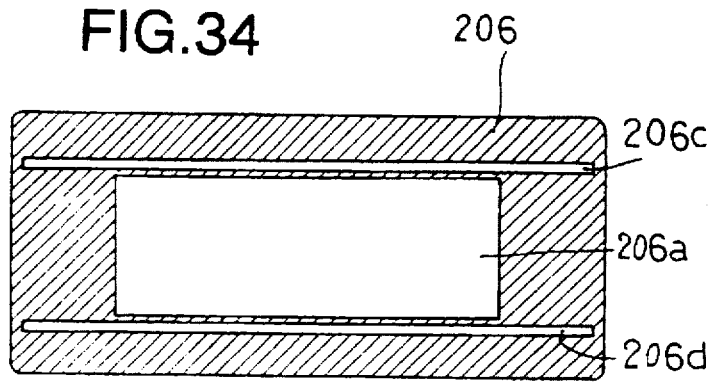
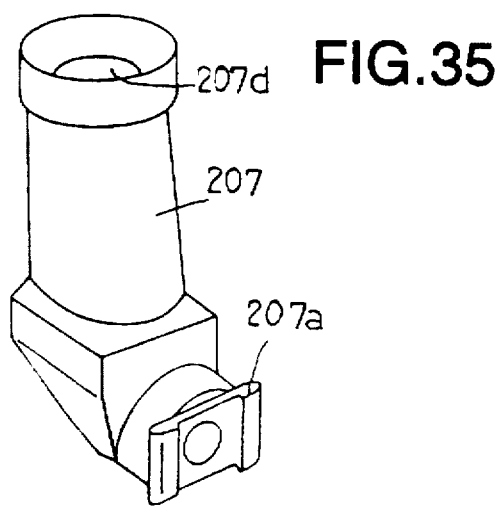

CAMERA CAPABLE OF TAKING PICTURES IN BOTH STANDARD FRAME AND PANORAMIC FRAME

This application is a division of application Ser. No. 08/002,080, filed Jan. 8, 1993, which is a continuation of U.S. patent application Ser. No. 07/615,019 filed Nov. 9, 1990, abandoned.

TECHNICAL FIELD

The present invention relates to a camera having switchable photographic frame sizes.

BACKGROUND ART

Cameras have been proposed for photographing panoramic frames (13 mm×36 mm) having a reduced vertical dimension obtained by shielding light for top and bottom of a standard frame (24 mm×36 mm). When a picture taken in such a panoramic frame is printed, its vertical dimension is enlarged to correspond to that of the standard frame. This results in a picture sideways longer than the standard frame. The sideways elongated picture thus obtained presents a span somewhat like a panorama photo. Thus, such a picture is sometimes called a pseudo-panoramic picture.

Standard frames are preferred in some cases and pseudo-panoramic frames in others, depending on the purpose of photography. Since conventional cameras designed for pseudo-panoramic frames are capable of photographing only pseudo-panoramic pictures, the photographer must change cameras according to varied purposes.

SUMMARY OF THE INVENTION

An object of the present invention is to provide a camera capable of photographing both the standard picture and pseudo-panoramic picture.

Another object of the present invention is to provide a camera of the type having a function for recording predetermined data such as the date and time within the photographic frame, which is capable of notifying the photographer, as the case may be, that the data cannot be recorded in the panoramic frame narrower than the standard frame.

A further object of the invention is to provide a camera of the type having a flashing function, in which light quantity of a flash unit is properly controlled whether the picture being taken is in the standard frame or in the pseudo-panoramic frame.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 1 through 27 show a camera according to the present invention, in which:

FIG. 1 is a plan view of the camera,

FIG. 2 is a front view of the camera,

FIG. 3 is a rear view of the camera,

FIG. 4 is a block diagram of an electric circuitry mounted in the camera,

FIGS. 5 through 12A, 12B and 12C are flowcharts illustrating camera operations,

FIG. 13 is a front view of a film,

FIGS. 16 and 17 are schematic views of a drive mechanism for driving light-shielding members, FIG. 19 is a sectional view of a photo-interrupter portion of the shutter, FIG. 20 is a front view of a photographic range, FIG. 22 is a time chart of shutter runs, FIG. 23 is an explanatory view of the depth of focus, FIG. 25 is a program chart of the depth priority processing, FIG. 26 is a program chart of flash photography, and FIG. 27 is an explanatory view of a correction control for light adjusting data.

FIGS. 28 through 30 show a different embodiment, in which:

FIG. 28 is a perspective view of optical paths,

FIG. 29 is a diagram of a light adjusting circuit, and

FIG. 30 is a flowchart of light adjustment data correction processing.

FIGS. 31 through 37 show another embodiment, in which:

FIG. 31 is a rear view of a camera,

FIG. 32 is a sectional view of an aperture portion,

FIG. 33 is a perspective view of the camera,

FIG. 34 is a rear view of a light-shielding member,

FIG. 35 is a perspective view of an angle finder,

FIG. 36 is a sectional view of the angle finder, and

FIG. 37 is a plan view of a focus plate.

DETAILED DESCRIPTION OF THE PREFERRED EMBODIMENTS

Embodiments of the present invention will be described hereinafter with reference to the drawings.

Figure 1:
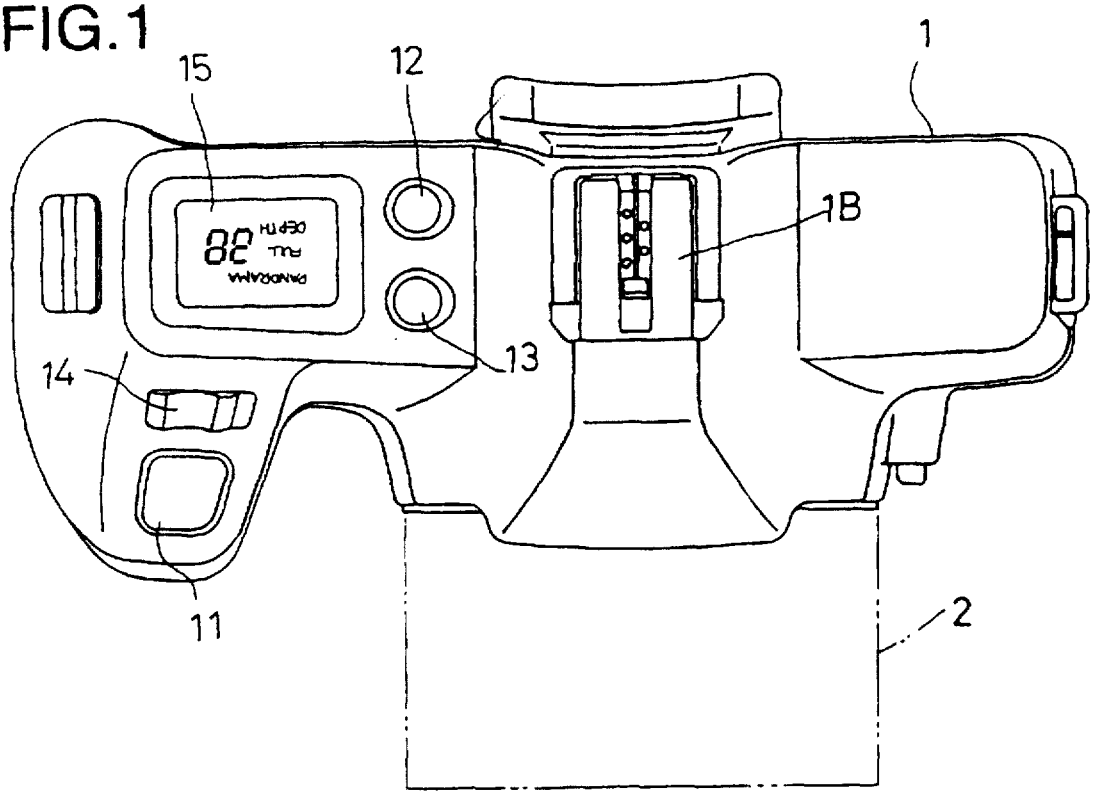
Figure 3:
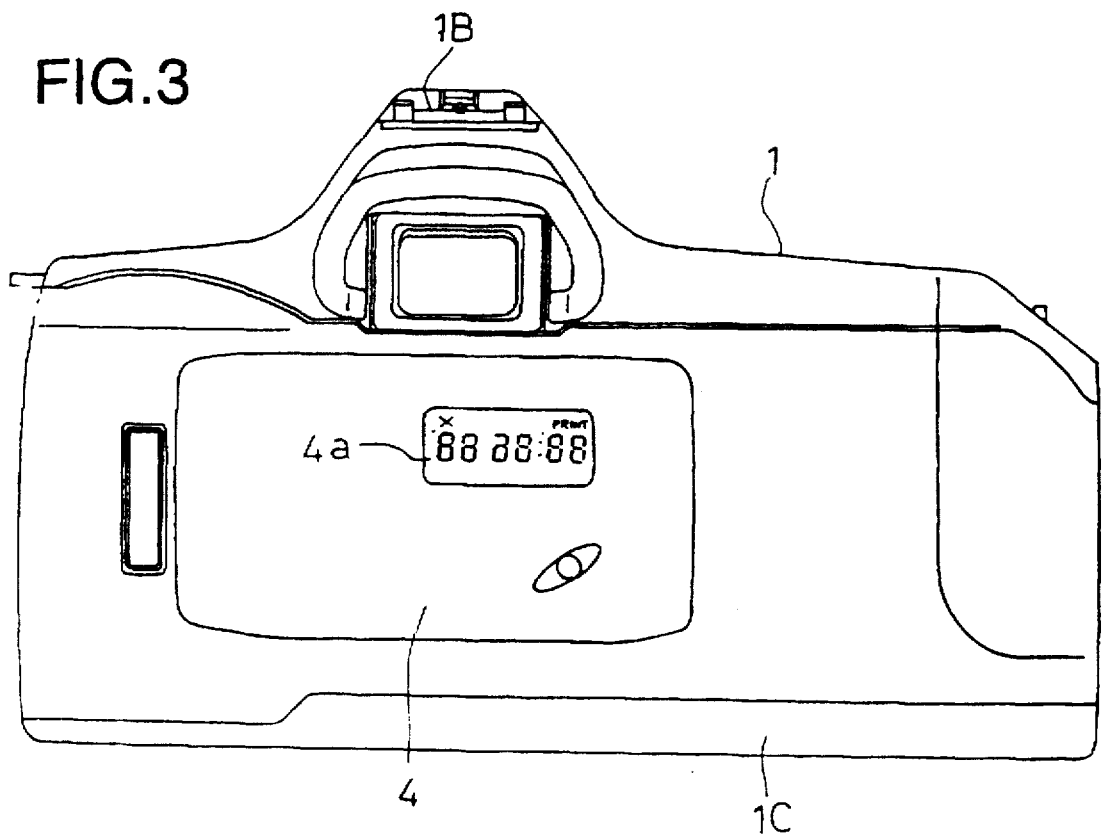
Figure 2:
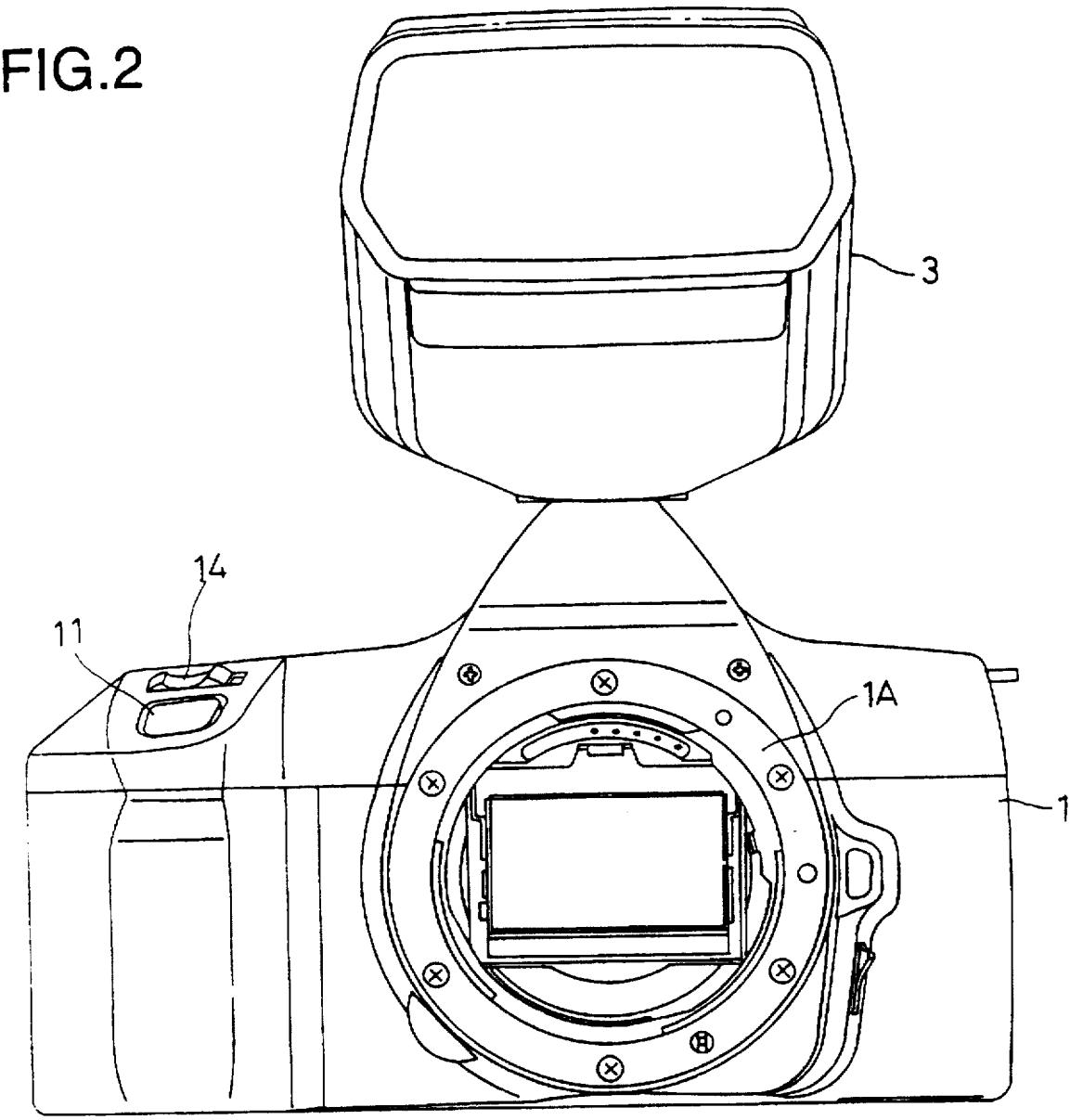

FIGS. 1 through 3 are schematic overall views of a camera according to the present invention. This camera comprises a camera body 1, a photographic lens 2 removably attached to a lens mount 1A of the camera body 1, a flash unit 3 removably attached to a hot shoe 1B of the camera body 1, and a data back unit. 4 incorporated into a back cover 1C of the camera body 1.

FIGS. 1 and 3 show the camera with the flash unit 3 removed, and FIG. 2 shows the camera with the photographic lens 2 removed.

Numeral 11 denotes a release button for effecting a photo-taking operation. Numerals 12 through 14 denote control keys for switching operating modes of the camera.

Numeral 12 denotes a frame size changeover key for switching between a full size mode for taking pictures in a normal size and a panorama mode for taking pictures in a half size with top and bottom of the normal frame size cut out. Numeral 13 denotes a focus mode changeover key for switching between a program mode for taking pictures in a normal auto-focusing state and a depth mode for taking pictures in an autofocusing state giving priority to the depth of field. Numeral 14 denotes a focus area changeover key for switching focus detection areas for autofocusing purposes. The various operating modes mentioned above will be described later.

Numeral 15 denotes a body display portion of a display unit for displaying the various operating modes, film counts and so on.

FIG. 4 is a block diagram of an electric circuitry mounted in the camera according to the present invention. The photographic lens 2, flash unit 3 and data back unit 4 are also included in this figure.

Numeral 100 denotes a CPU for controlling the camera operation, which controls an overall operation of a camera system including various devices mounted in the camera body 1, flash unit 4 and data back unit 4. Numeral 101 denotes a film sensitivity reading circuit for reading film sensitivity information through a terminal provided in a cartridge chamber for contacting a film cartridge. Numeral 200 denotes a lens circuit in the photographic lens 2 for communicating lens data and the like with the CPU 100. Numeral 102 denotes a display control circuit for controlling display of photographic information on the body display portion 15 and a finder display 16 provided in a viewfinder.

Numeral 103 denotes a metering circuit for exchanging signals with an ambient light metering split circuit 104 receiving detection signals from six photo sensors 105, and for controlling a light adjusting circuit 106 receiving a detection signal from a flash light adjusting photo sensor 107. This light adjusting circuit 106 outputs a flash stop signal to a flash control circuit 300 in the flash unit 3 when a quantity of light received by the photo sensor 107 reaches a predetermined quantity. Numeral 108 denotes an X-contact thyristor for outputting a flash trigger signal to the flash control circuit 300 in the flash unit 3 when an output signal of the CPU 100 changes to "H" level.

Reference DB denotes a data control circuit in the data back unit 4, which is operable in response to a recording start signal IMP output from the CPU 100 for controlling recording of necessary data on a film.

Numeral 109 denotes a focus detecting photo sensor array (hereinafter referred to as the CCD) for outputting a detection signal to the CPU 100 for detecting a deviation from an in-focus position of the photographic lens 2 with respect to a photographic object. Reference 110 denotes a driver for driving various motors including an autofocusing motor AFM for eliminating the above-mentioned deviation, a winding motor WM for taking up a film, a rewinding motor RWM for rewinding the film, a charge motor CHM for charging a shutter, a diaphragm and a mirror mechanism. The driver 110 also drives various magnets including a release starting magnet 111, a diaphragm stopping magnet 112, a magnet 113 for starting a first shutter blade, and a magnet 114 for starting a second shutter blade.

Numeral 121 denotes a shutter detecting photo coupler for detecting passage of the shutter through an intermediate position as described later. Numeral 122 denotes a lens position detecting photo coupler for detecting a position of the photographic lens 2 under focus adjustment. Numeral 123 denotes a diaphragm detecting photo coupler for detecting a stop-down condition of the diaphragm.

The CPU 100 receives state signals from various switches SRC-SDN.

Reference SRC denotes a back cover switch which is opened when the back cover 1C of the camera is closed. Reference SLS denotes a loading detecting switch which is opened when initial winding of a film is successfully completed. Reference SFL denotes a film detecting switch which is opened when a film lies in a position opposed to the aperture of the camera. Reference SWC is a one-frame switch which is opened when the film is fed by one frame. Reference SCH denotes a charge detecting switch which is opened upon completion of shutter charging. Reference SMO denotes a frame size changeover switch which is closed by an operation of the frame size changeover key 12.

Reference S1 denotes a metering switch which is closed by a first-stroke depression of the release button 11. The closure of this metering switch S1 starts a metering operation and a focus detecting operation.

Reference S2 denotes a release switch which is closed by a depression of the release button 11 beyond the first-stroke depression. The closure of this release switch S2 starts an actual photo-taking operation.

Reference SNP is a full size detecting switch which is closed when the frame size is set to "full size". Reference SPP denotes a panorama size detecting switch which is closed when the frame size is set to "panorama size".

Reference SAP denotes a focus area changeover switch which is closed by an operation of the focus area changeover key 14. Reference SDN denotes a focus mode changeover switch which is closed by an operation of the focus mode changeover key 13.

The way in which the camera operation is controlled will be described with reference to the flowcharts in FIGS. 5 through 12A, 12B and 12C.

Figure 5:
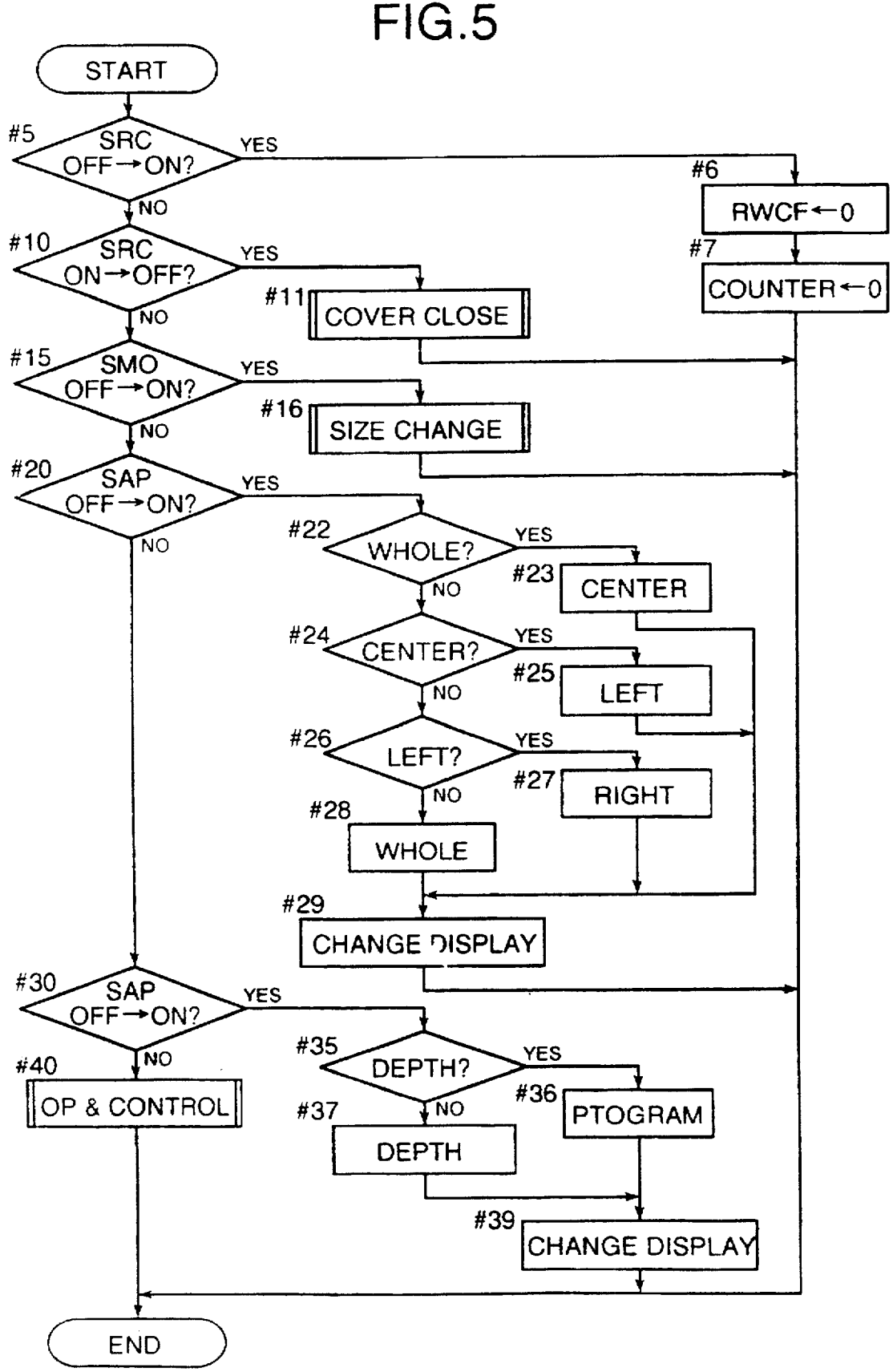

The flowchart of FIG. 5 shows a main routine for controlling the overall operation of the camera, which is started with a change in the states of the switches. In this main routine, the states of several switches SRC, SMO, SAP and SDP mentioned above are checked at steps #5 to #30, and operations are carried out based on results of the checking.

Figure 6:
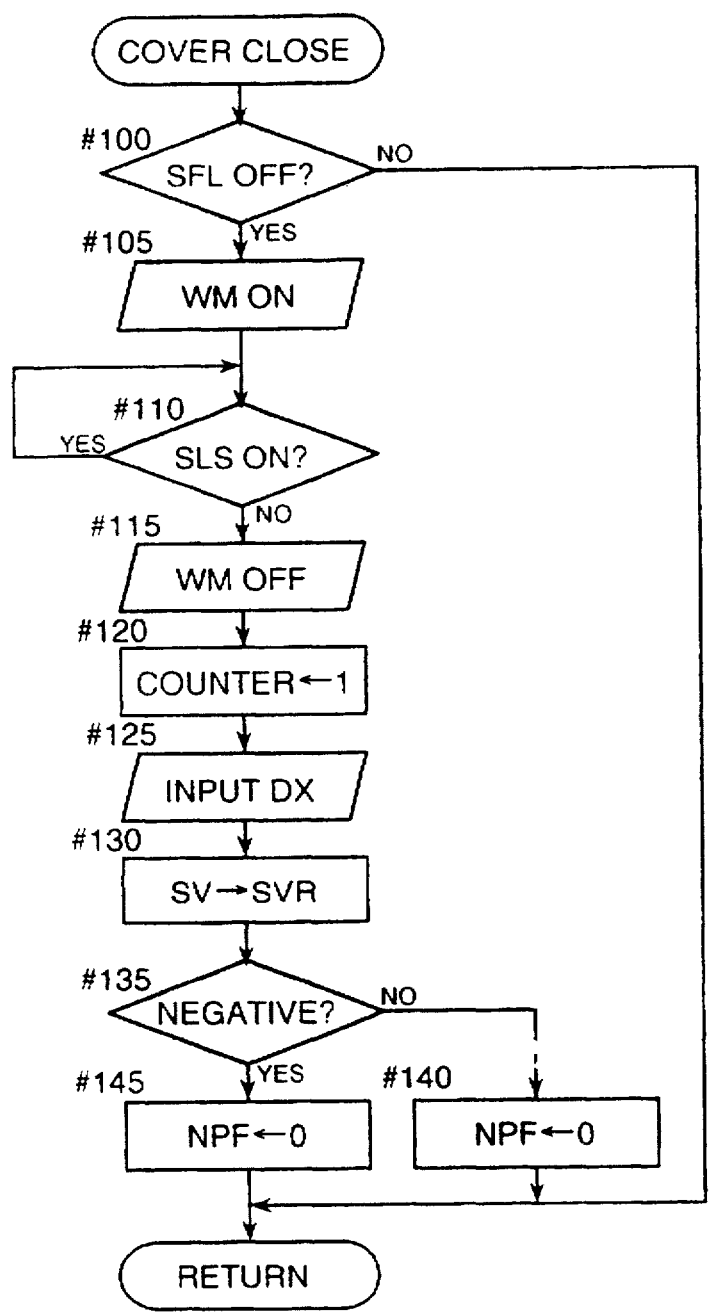

When the back cover 1C is opened (step #5), a rewind completion flag RWCF indicating completion of film rewinding is set to "0" at step #6, a film count is set to "0" at step #7, and the program is ended. When the back cover 1C is closed (step #10), a "cover close" subroutine is called at step #11, and the program is ended. FIG. 6 shows a flowchart of this subroutine.

In this subroutine, presence or absence of a film is checked first at step #100. If there is no film, the program returns to the main routine. If there is a film, the winding motor WM is driven to carry out initial winding of the film until the loading detecting switch SLS is opened (steps #105 to #115). Thereafter the film count is set to "1" at step #120, film sensitivity information is input at step #125, and film sensitivity Sv after logarithm conversion is stored in a film sensitivity register SVR at step #130. Then, at step #135, the film is checked to determine whether it is a negative film or not. If the film is a reversal film, a negative/positive flag NPF is set to "1" at step #140. If the film is a negative film, the negative/positive flag NPF is set to "0" at step #145. From step #140 or #145, the program returns to the main routine.

Figure 7A:
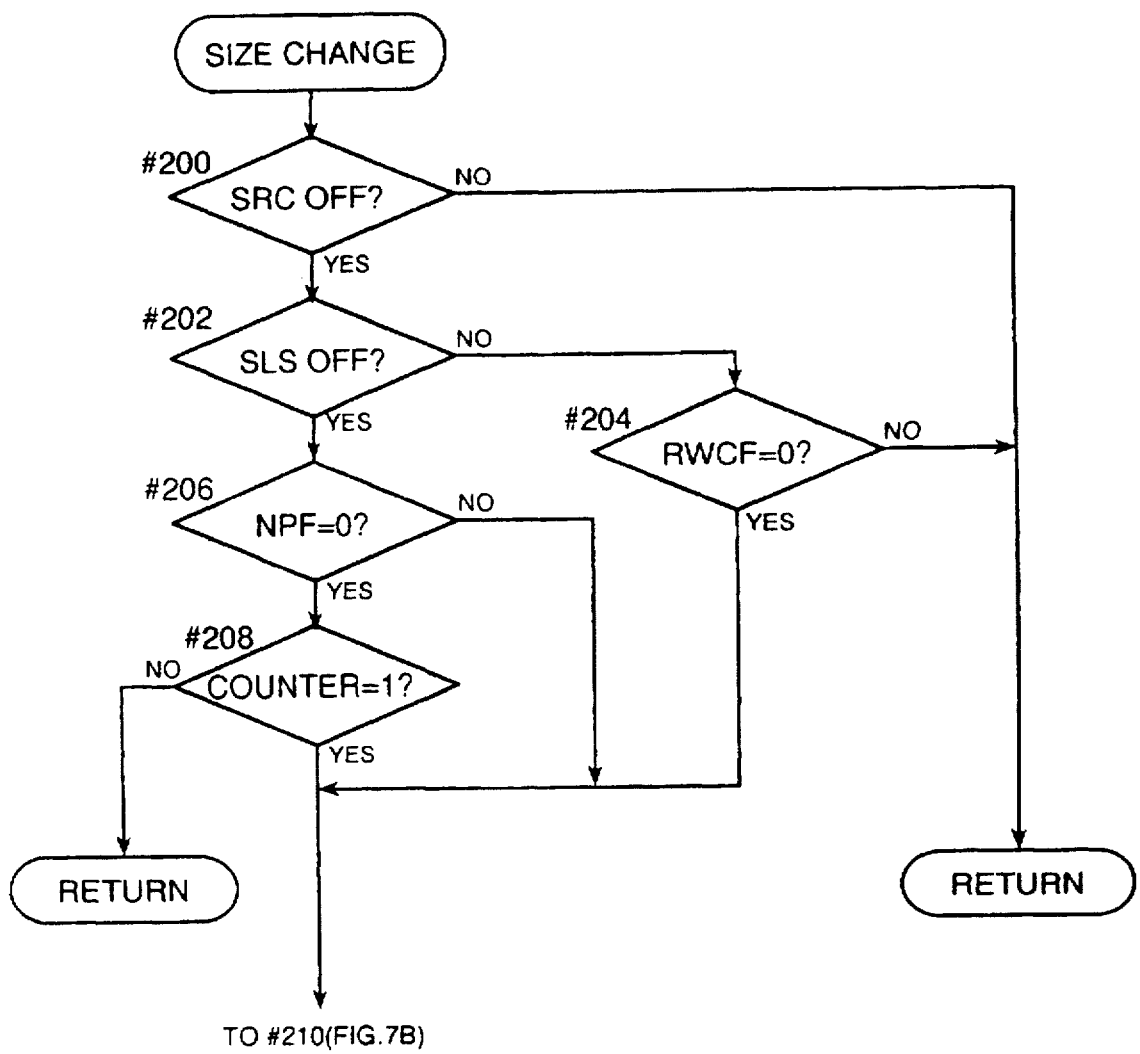
Figure 7B:
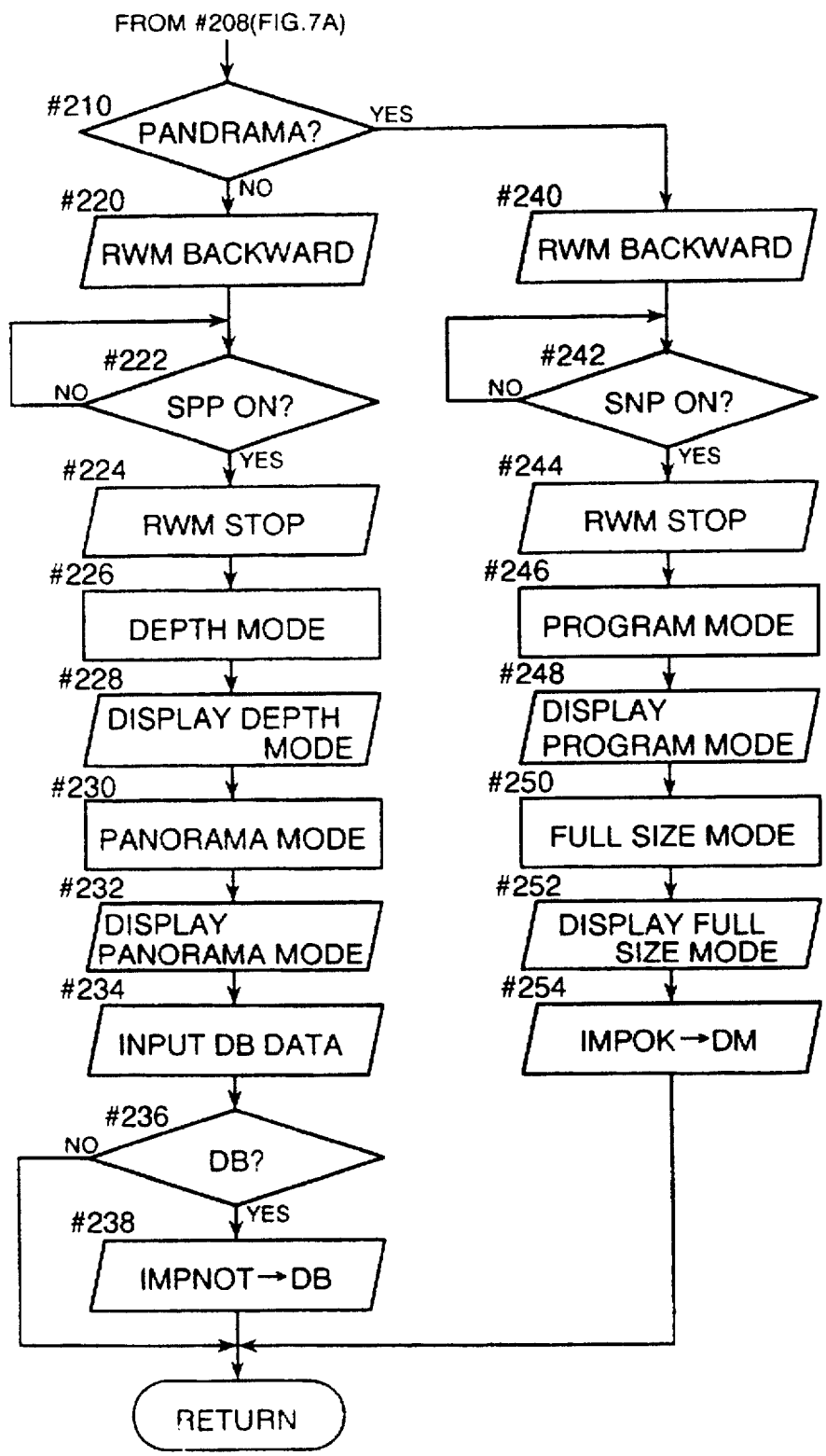
Figure 8A:
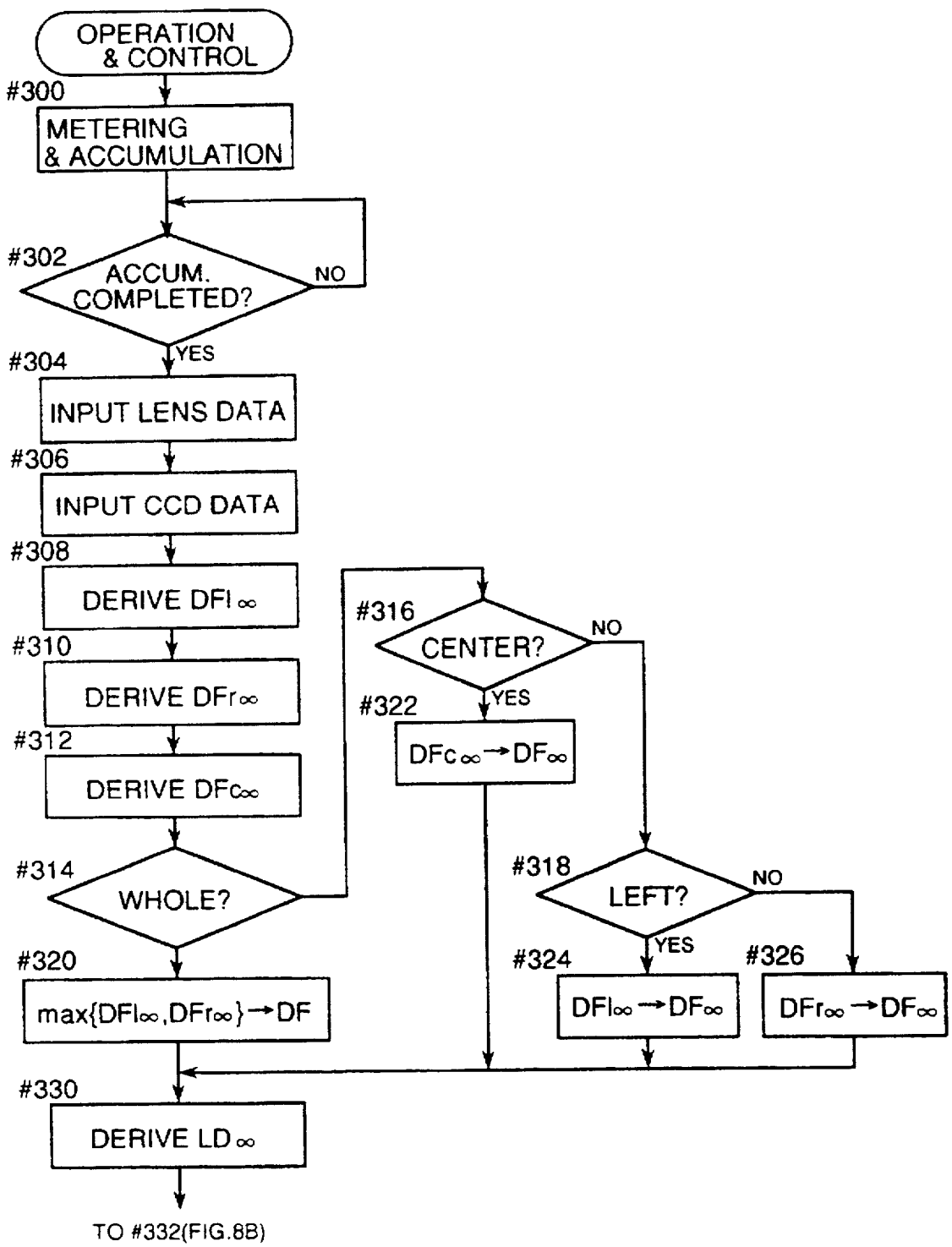
Figure 8B:
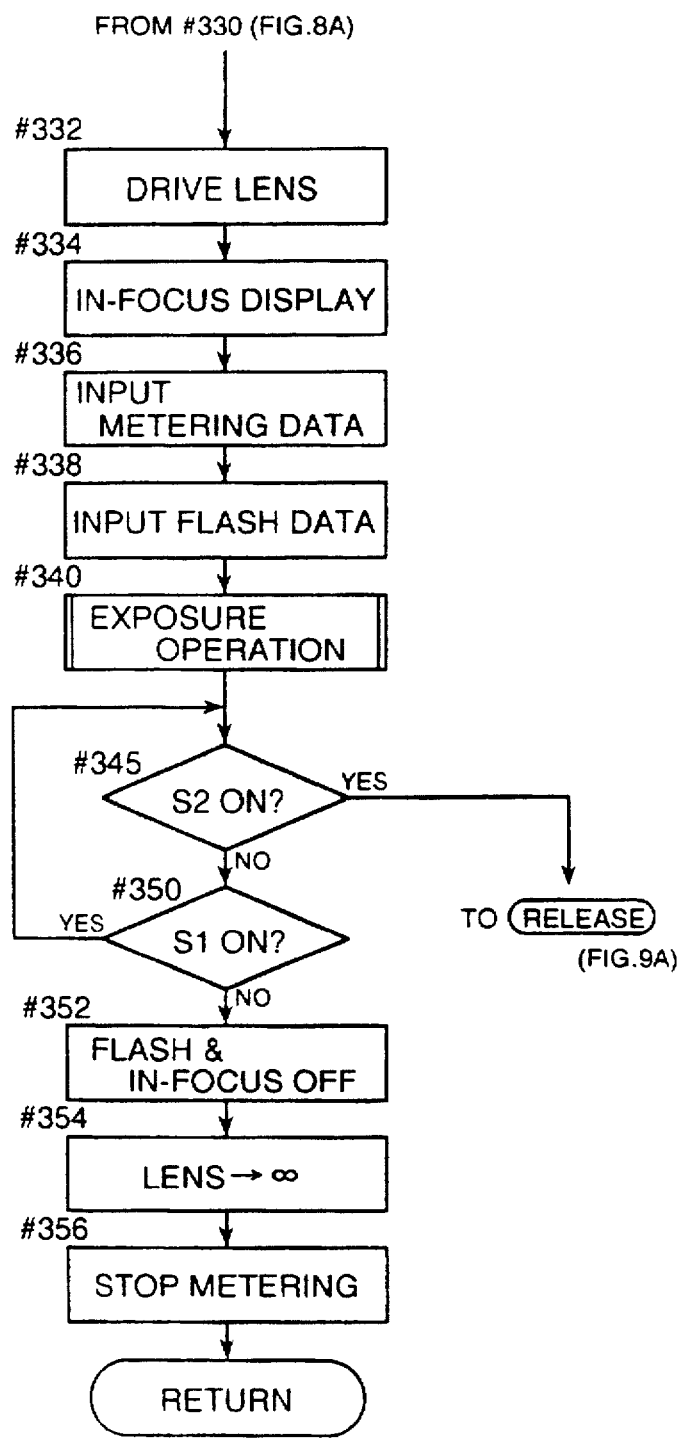

Reverting to the main routine, when the frame size changeover switch SMO is closed at step #15, the program is ended after calling a "frame size change" subroutine at step #16. FIGS. 7A and 7B show flowcharts of this subroutine.

The program returns from this subroutine to the main routine when the back cover 1C is open (step #200), when no film lies opposite the aperture (step #202) and the rewind completion flag RWCF is set to "1" (which returns to "0" with opening of the back cover) (step #204), or when the film is a negative film (step #206) and the film count is not "1" (step #208). Only when none of the above conditions apply, the program moves to step #210 and subsequent steps for effecting a frame size changeover. In other words, a frame size changeover is possible at any time if a reversal film is loaded or if the back cover 1C is closed with no film loaded into the camera. If a negative film is loaded, a frame size changeover is possible-only when the film count is "1".

Figure 13:
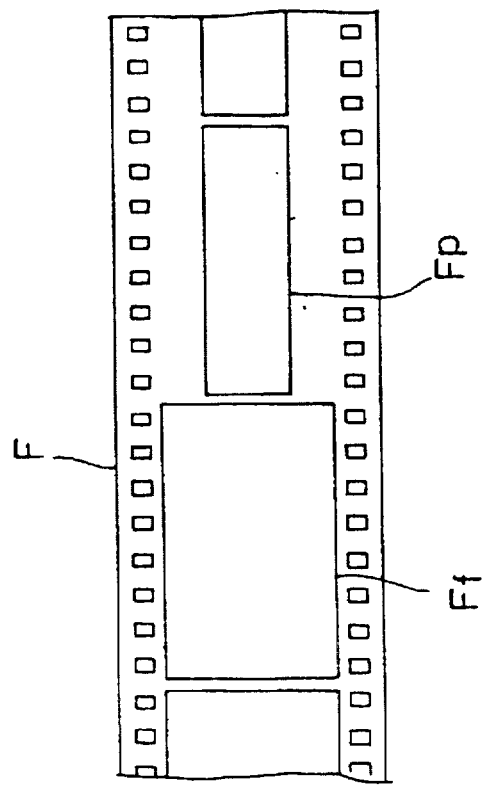

The frame sizes available with this camera will be described now. As shown in FIG. 13, this camera uses a 35 mm film for switching between the full size mode and panorama mode. The full size mode is for taking pictures in full size with a 2:3 vertical to lateral ratio and having an exposure range extending over the entire width of the film (which will be referred to as a full size frame Ff). The panorama mode is for taking pictures in panorama size with a 1:3 vertical to lateral ratio and having an exposure range limited to a transversely intermediate portion of the film (which will be referred to as a panorama frame Fp).

In a developing and printing process of the film following photo-taking, panorama size frames are printed on photographic paper as enlarged in a magnification ratio twice that of full size frames. As a result, the panorama size pictures, while having the same vertical dimension as the full size pictures, appear in sideways elongated prints presenting a panoramic impression.

The frame size changeover is allowed only before a photo-taking operation in the case of a negative film requiring the printing process. This measure is taken to set the same size frame throughout a single film in order to avoid complication of the developing and printing process due to the different magnification ratios. In the case of a reversal film, transparency obtained is maintained frame by frame on mounts. It is relatively easy to sort the frames into groups at a projecting stage and project them in different magnification ratios. Since the two size frames mixed on a single film will not complicate the developing and printing process, the frame size changeover is allowed at any time. Further, in the absence of a film, the frame size changeover is allowed at any time for confirmation of camera mechanisms and operations.

Figure 14A:
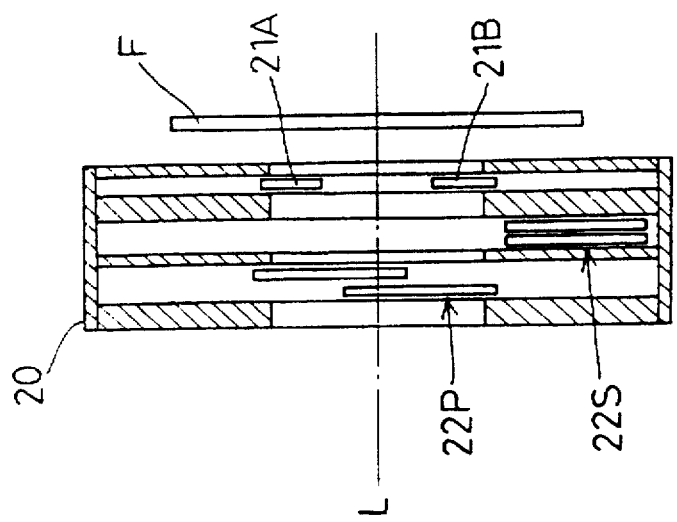
FIGS. 14A through 14C are sectional views of a shutter and adjacent components.
Figure 14B:
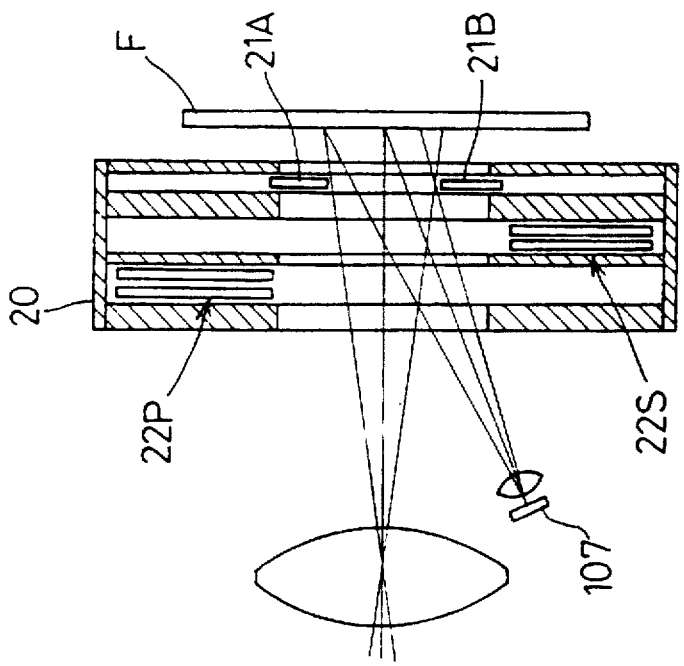
Figure 14C:
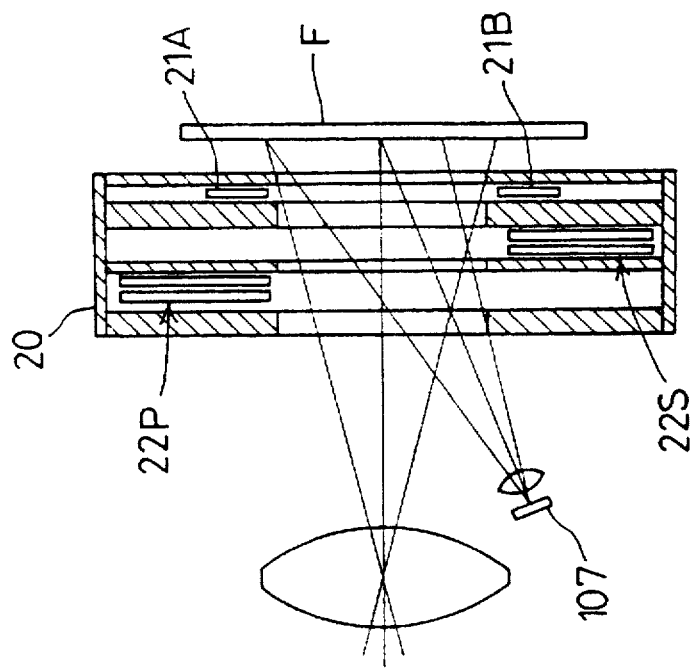
Figure 15A:
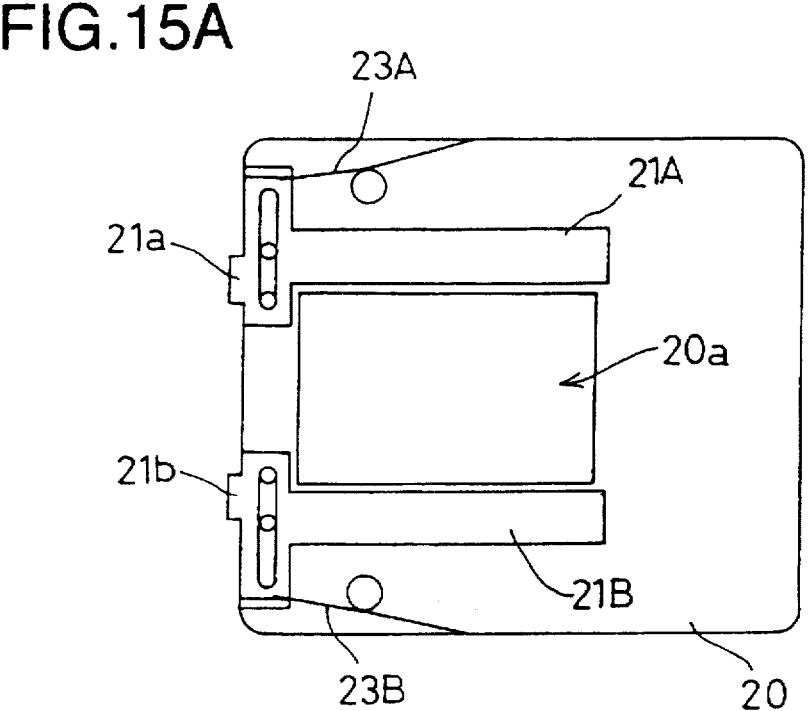
FIGS. 15A and 15B are rear views of a light-shielding portion of the shutter.
Figure 17:
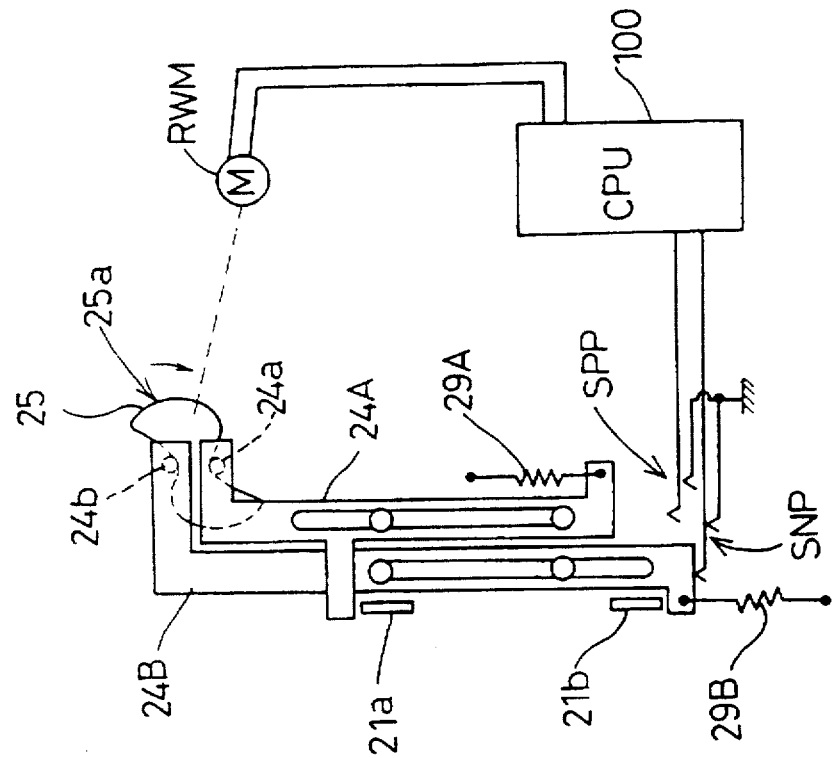
Figure 16:
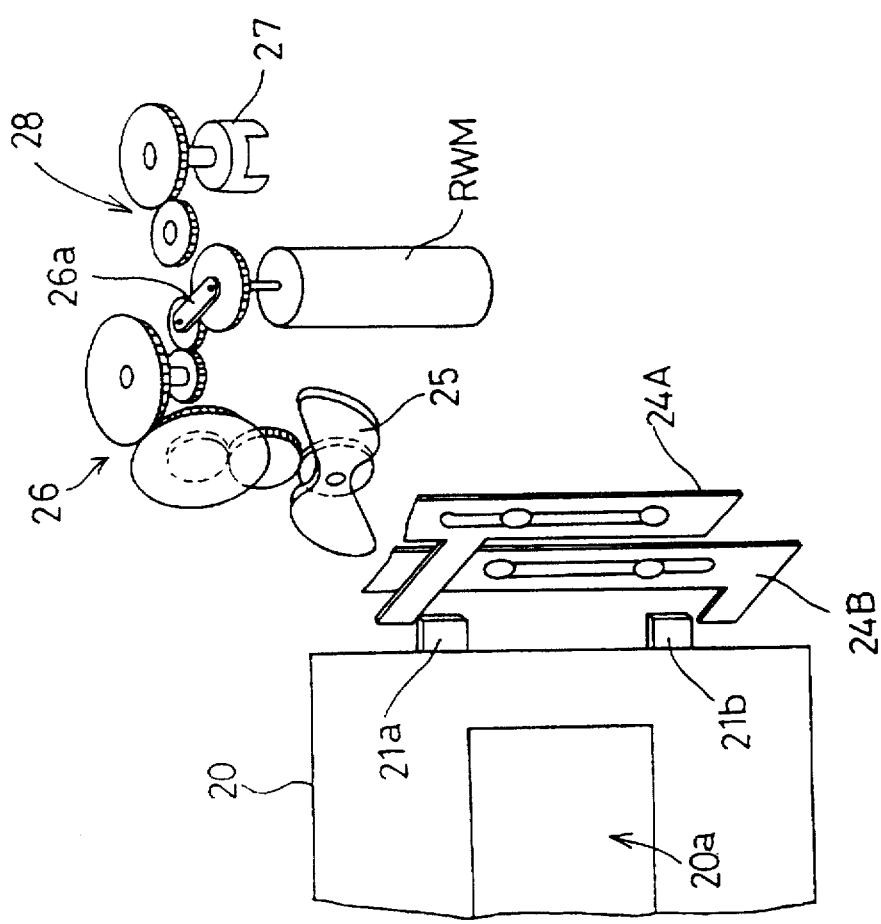

A construction for carrying out the frame size changeover will be described next. As shown in FIGS. 14A, 14B and 14C, a shutter unit 20 defines a shutter opening 20a corresponding to the full size frame. A pair of upper and lower light-shielding members 21A and 21B are slidable between a position for shielding an upper side and a lower side of the shutter opening 20a (FIG. 14C) and a position retracted from the shutter opening 20a (FIG. 14B). The light-shielding members 21A and 21B are, along with a first shutter blade 22P and a second shutter blade 22S, integrally incorporated into the shutter unit 20. The light-shielding members 21A and 21B are mounted in positions closer to the film F than the shutter blades 22P and 22S. As shown in FIG. 15A, these light-shielding members 21A and 21B are normally retained in positions for entirely exposing the shutter opening 20a by respective springs 23A and 23B. In this state, pictures may be taken in full size. The light-shielding members 21A and 21B define projections 21a and 21b projecting laterally of the shutter unit 20, respectively. As shown in FIGS. 16 and 17, the respective projections 21a and 21b are engaged with a pair of control elements 24A and 24B for sliding the light-shielding members 21A and 21B. The control elements 24A and 24B are operatively connected to the film rewind motor RWM through a cam plate 25 and an interlocking gearing 26.

FIG. 17 shows a position for realizing the full size, in which the full size detecting switch SNP is closed and the panorama size detecting switch SPP opened.

As shown in FIG. 16, the interlocking gearing 26 includes a transmission switching device 26a formed of a planet gear pair. When the rewind motor RWM rotates forward, the transmission switching device 26a also rotates forward and meshes with a transmission mechanism 28 for driving a rewind fork 27 engaging the film cartridge. When the rewind motor RWM rotates backward, the transmission switching device 26a also rotates backward and disengages from the transmission mechanism 28. At this time, the transmission switching device 26a meshes with the interlocking gearing 26 for driving the cam plate 25 to effect a frame size changeover.

Figure 15B:
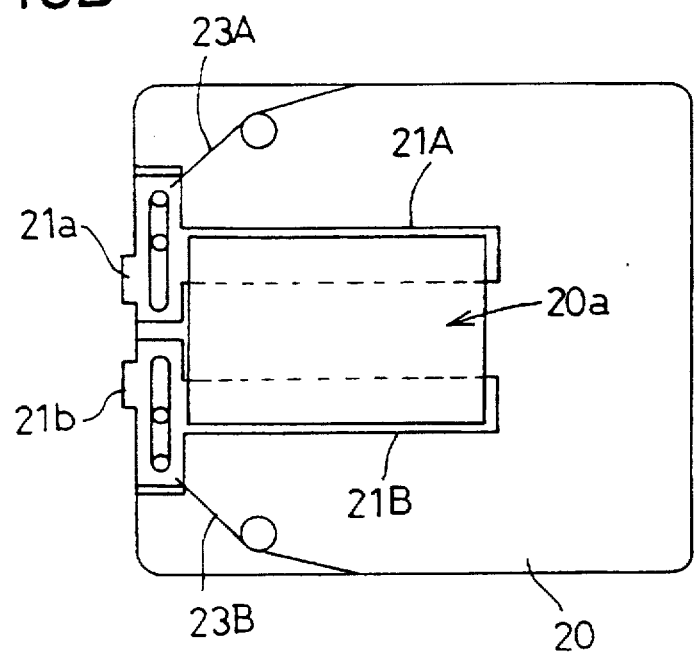

In the frame size changeover state noted above providing the full size frame as shown in FIG. 15A, the cam plate 25 is turned a half clockwise rotation, in FIG. 17, by the backward rotation of the rewind motor RWM. Then, cam surfaces 25a of the cam plate 25 press pins 24a and 24b, thereby vertically sliding the control elements 24A and 24B away from each other. The control elements 24A and 24B in the sliding movement engage the projections 21a and 21b of the light-shielding members 21A and 21B, thereby sliding the light-shielding members 21A and 21B toward each other against the urging force of springs 23A and 23B. Consequently, as shown in FIG. 15B, only a vertically intermediate portion of the shutter opening 20a is exposed to enable photography in the panorama size. In this state, the full size detecting switch SNP is opened and the panorama detecting switch SPP is closed.

In this state, the cam plate 25 is turned a further half clockwise rotation in FIG. 17 for causing the cam surfaces 25a of the cam plate 25 to release the pins 24a and 24b of the control elements 24A and 24B. As a result, the control elements 24A and 24B return to the original positions under the force of springs 29A and 29B, and also the light-shielding members 21A and 21B return to the original positions under the force of springs 23A and 23B, which reinstates the full size state shown in FIG. 15A.

Figure 18A:
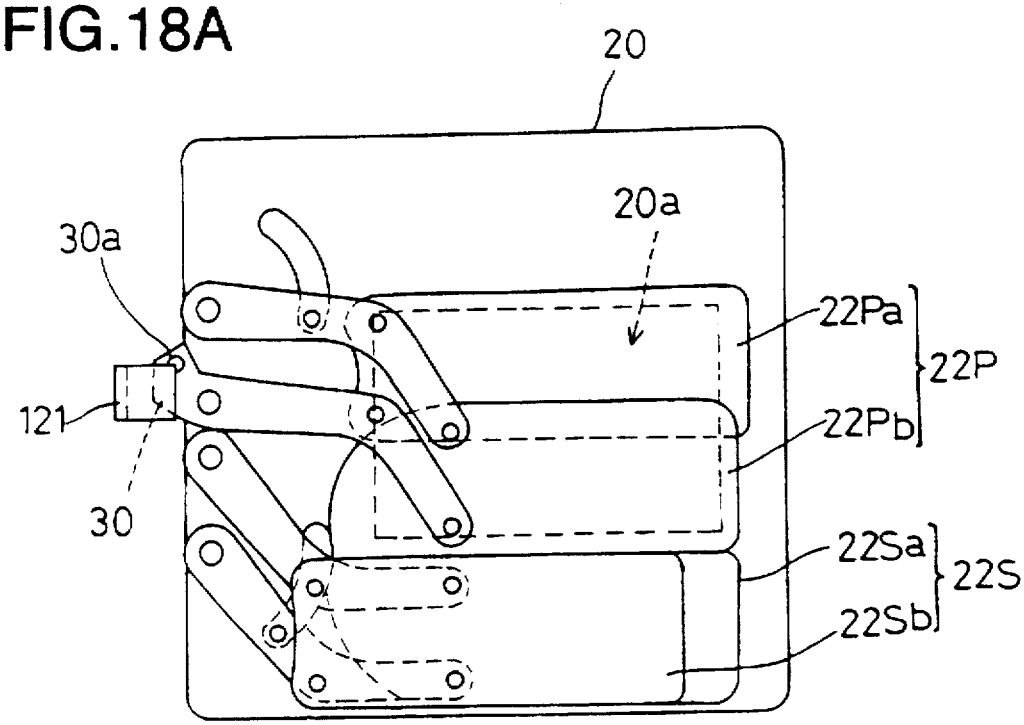
FIGS. 18A and 18B are rear views of shutter blades.
Figure 18B:
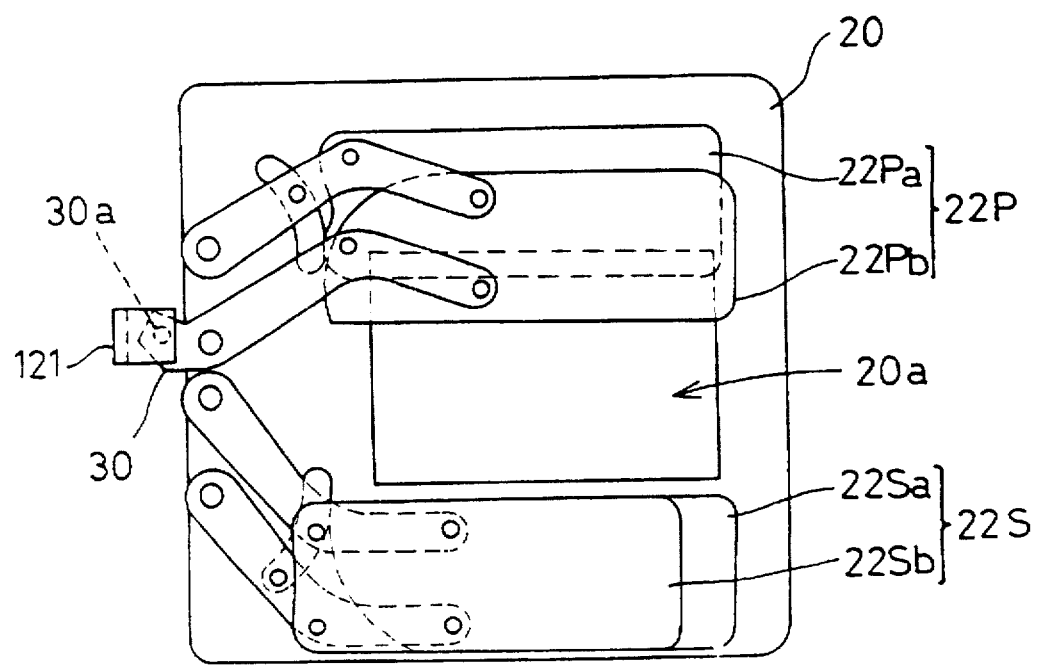

The way in which the shutter operates will be described here also. As shown in FIGS. 18A and 18B, this shutter comprises a vertical run focal plane shutter. As shown in FIGS. 14A, 14B and 14C, the first blade 22P and second blade 22S are arranged from front to back along an optical axis L in the shutter unit 20.

Preparatory to photo-taking, the first blade 22P of the shutter is driven by the charge motor CHM. Then, as shown in FIG. 18A, the first blade 22P has two blade elements 22Pa and 22Pb closing the shutter opening 20a. The first blade 22P is retained in this state by an engaging element not shown.

When a release operation is started in this state, the first blade starting magnet 114 causes the engaging element to release the first blade 22P. As a result, the two blade elements 22Pa and 22Pb move upward to expose the shutter opening 20a as shown in FIG. 18B. Subsequently, upon timing a predetermined shutter speed, the second blade starting magnet 115 causes two blade elements 22Sa and 22Sb of the second blade 22S to move forward to close the shutter opening 20a.

In carrying out flash photography by using such a focal plane shutter, it is necessary to flash light with the shutter opening 20a fully opened in order to avoid shading of a photographic object. The state of the shutter opening is detected for this purpose.

Figure 19:
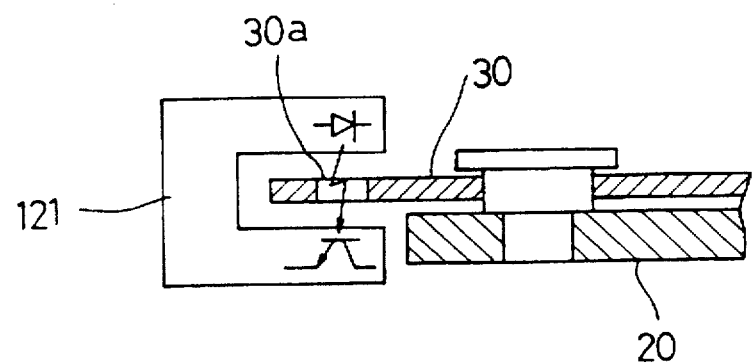

As described above, this camera is adapted for photography in the panorama size to obtain pictures having a reduced vertical dimension. In carrying out flash photography in the panorama size, light may be flashed with the shutter opening 20a vertically limited by the light-shielding members 21A and 21B instead of being fully exposed. Thus, as shown in FIGS. 18A, 18B and 19, the photo coupler 121 for detecting an intermediate position of the shutter is located in a position for transmitting normally interrupted light through a bore 30a defined in a swing arm 30 of the rear blade element 22Pb of the first shutter blade 22P at the timing of the bottom edge of the rear blade element 22Pb reaching the bottom edge of the upper light-shielding member 21A. At the timing of light detection by the photo coupler 121, the X-contact is closed to flash light.

In flash photography in the full size mode, time count is started upon detection by the photo coupler 121 of the intermediate position of the shutter. The X-contact is closed to flash light after lapse of the time required for the bottom edge of rear blade element 22Pb to reach the upper edge of the shutter opening 20 after passing the bottom edge of the upper light-shielding member 21A in the position for the panorama size.

As noted hereinbefore, the panorama size frame has a smaller dimension in the running direction of the two shutter blades 22P and 22S than the full size frame. When taking panorama size pictures, the X-contact is closed to output a synchronizing signal for flashing at a point of time at which the bottom edge of the rear blade element 22Pb of the first shutter blade 22P passes the top edge of the panorama size frame. Thus, the flash synchronizing speed is increased in the panorama size by utilizing the shorter time taken for the shutter to become fully open in the panorama size photography than in the full size photography.

Returning to FIGS. 7A and 7B to continue with the frame size changeover subroutine, step #210 and subsequent steps are executed to effect the frame size changeover. First, the current frame size mode is determined at step #210.

If the full size mode is on, the frame size is changed to the panorama size by rotating the rewind motor RWM backward until the panorama size detecting switch SPP is closed (steps #220 and #224). Then, at step #226, switching is made to the depth mode for photography in the photographic condition giving priority to the depth of field since many photographic objects will lie in the panorama size frame. The depth mode is displayed on the body display 15 at step #228, the frame size mode is switched to the panorama mode at step #230, and the panorama mode is similarly displayed at step #232. Subsequently, the signal is input from the data control circuit DB.

Data is printed in a lower edge of the full size frame, i.e. outside the panorama size frame. Therefore, the date of photography and other data cannot be recorded on a print obtained from the developing and printing process for the panorama size. If the data back unit 4 is provided, recording impossible signal IMPNOT is output to the data back unit 4 (steps #236 and #238). When the data back unit 4 receives the recording impossible signal IMPNOT, the data back unit 4 displays an indication "x" signifying that the data and other information cannot be recorded on a print as shown in FIG. 3. The program returns to the main routine. If the data back unit 4 is not provided, the program just returns to the main routine. The display 4a of the data back unit 4, as shown in FIG. 3, includes an "x" mark which is an indication signifying that the date and other information cannot be recorded on a print.

On the other hand, if step #210 finds the current frame size mode to be the panorama mode, the frame size is changed to the full size by rotating the rewind motor RWM backward until the full size detecting switch SNP is closed (steps #240 and #244). In the full size mode, switching is made, at step #246, to the program mode for photography in the normal photographic condition. The program mode is displayed on the body display 15 at step #248, the frame size mode is switched to the full size mode at step #250, and the full size mode is similarly displayed at step #252. After outputting a print recording valid signal IMPOK to the data back unit 4 at step #254, the program returns to the main routine.

The way in which the various operating modes are shown on the body display 15 will be described. FIG. 1 shows all of the signs displayed although they are actually not displayed simultaneously. The numerals displayed in segments represent a film count. The characters "PANORAMA" represent the panorama mode, which do not appear when the full size mode is on. The characters "FULL" represent the full size mode, which do not appear when the panorama mode is on. The characters "DEPTH" represent the depth mode, which do not appear when the program mode is on.

Returning to FIG. 5 to continue with the main routine, if the focus area changeover switch SAP is closed without the frame size changeover switch SMO being closed (step #20), the program moves to steps #22 and subsequent steps to carry out switching of focus areas for focus detection.

Specifically, the current focus area mode is checked at steps #22 to #26. If "whole" is on, it is switched to "center" (steps #22 and #23). If "center" is on, it is switched to "left" (steps #24 and #25). If "left" is on, it is switched to "right" (steps #26 and #27). If none of the above are on, that is if "right" is on, it is switched to "whole" (steps #26 and #28). Subsequently, a newly selected mode is displayed at step #29 and the program is ended.

Figure 20:
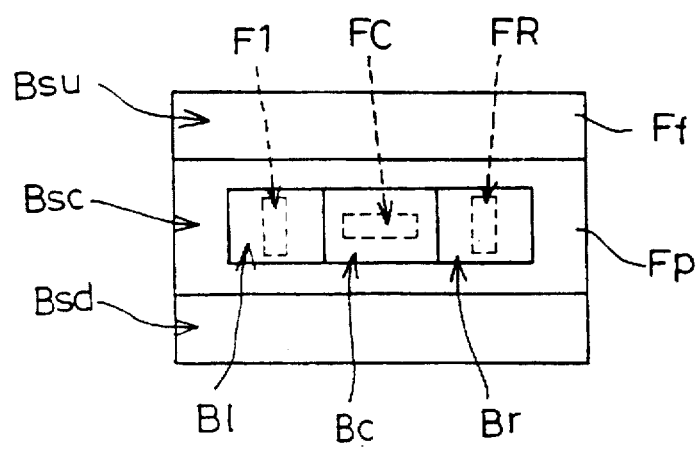

The four types of focus areas noted above and the way in which they are displayed in the viewfinder will be described next. FIG. 20 shows an entire photographic range. The outermost frame Ff corresponds to the full size frame. This frame vertically divided by two lines into three parts, and the middle frame Fp corresponds to the panorama size frame. The panorama frame Fp includes three frames Fl, Fc and Fr marked in broken lines, which correspond to the focus areas noted above.

When the focus area mode is set to "whole", an autofocusing operation is carried out based on focus detecting information from all the three focus areas Fl, Fc and Fr. When the focus area mode is set to "center", "left" or "right", the autofocusing operation is carried out based on focus detecting information from a corresponding one of the focus areas Fc, Fl or Fr.

Incidentally, the entire photographic range is also divided into six parts to define metering areas for providing brightness information of a photographic object. Three of the six metering areas, a left area Bl, a center area Bc and a right area Br, have slightly large ranges including the three focus areas Fl, Fc and Fr, respectively. The remaining three metering areas consist of an intermediate area Bsc corresponding to the panorama frame Fp excluding the three metering areas Bl, Bc and Br, and an upper area Bsu and a lower area Bsd over and under the intermediate area Bsc (corresponding to the full size frame Ff outside the panorama frame Fp). The six metering areas Bl, Bc, Br, Bsc, Bsu and Bsd are associated with the six photo sensors 105 described hereinbefore, respectively.

Figure 21A:
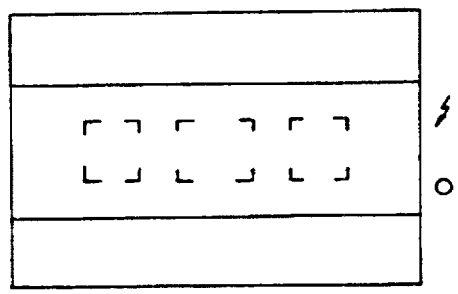
FIGS. 21A through 21C are front views of a view-finder frame.
Figure 21B:
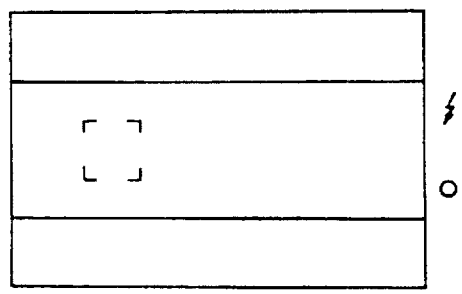
Figure 21C:
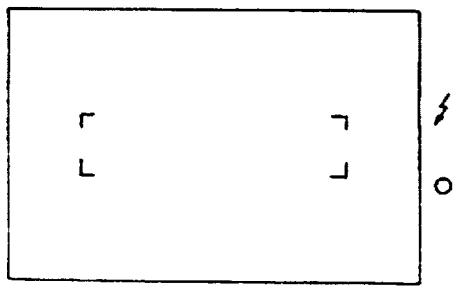

The displays given in the viewfinder will now be described with reference to FIGS. 21A, 21B and 21C. FIGS.

21A shows all marks displayed although they are not displayed simultaneously. The two horizontal lines represent the upper and lower boundaries of the panorama frame Fp in the panorama mode. The three frames in the center indicate the focus areas. When one of the three focus areas is selected, and if "left" is selected in the panorama mode, for example, only one frame is displayed as shown in FIG. 21B. If the focus area mode is set to "whole" and the full size mode is on, for example, one large frame is displayed as shown in FIG. 21C. The zigzag mark at the righthand side of the viewfinder frame is a flash indicator lit when a flashing capacitor is being charged. The round mark thereunder is an in-focus indicate lit green when a photographic optical system is in an in-focus condition with respect to a photographic object.

Returning to FIG. 5 to continue with the main routine, if the focus mode changeover switch SDP is closed without the focus area changeover switch SAP being closed, the program moves to steps #35 to check the determine the current focus mode. If the depth mode is on, it is switched to the program mode at step #36. If the program mode is on, it is switched to the depth mode at step #36. After changing the focus mode display at step #39, the program is ended.

As already described, the focus modes are displayed on the body display 15 such that the characters "DEPTH" are displayed in the depth mode and are eliminated in the program mode.

If the focus mode changeover switch SDP is not closed either, an arithmetic operation and control subroutine is called at step #40, and the program is ended. FIGS. 8A and 8B through 10A and 10B show flowcharts of this subroutine.

This subroutine first starts metering by the metering circuit 103 and accumulation in a focus detecting CCD by the focus detecting circuit 109 (step #300). When the accumulation is completed (step #302), lens data such as focal length information and other information are input from the lens circuit 200 (step #304) and the data accumulated in the CCD is input from the focus detecting circuit 109 (step #306). Thereafter, amounts of defocus DF1, DFc and DFr for the respective focus areas Fl, Fc and Fr are obtained (steps #308 to #312).

With this camera, taking the depth mode described later into account, a movable lens in the photographic lens 2, is set to an in-focus position for infinity in an initial state before focus adjustment (which will be referred to as the initial position of the photographic lens 2). The amounts of defocus DF1, DFc and DFr noted hereinbefore are obtained as corresponding to amounts movement of the movable lens from such initial position (the sign " " affixed signifies the amounts of defocus with respect to infinity).

After the arithmetic operations carried out for the respective focus areas Fl, Fc and Fr, the focus area mode is determined at steps #314 to #318. If the focus area mode is set to "whole", the greatest of the three amounts of defocus Dfl, Dfc and DFr, that is the amount of defocus with respect to the photographic object closest to the camera, is set as the amount of defocus DF to be used (step #320). If the focus area mode is set to a choice as other than "whole", the amount of defocus for the focus area corresponding to the selected focus area mode is set as the amount of defocus DF to be used (steps #322 to #326).

After setting the amount of defocus DF to be used, this amount is converted into lens driving pulses LD at step #330, and the movable lens in the photographic lens 2 is driven in accordance with the pulses LD at step #332. Upon completion thereof, an in-focus display in the viewfinder is lit at step #334. Subsequently, metering data are input from the metering circuit 103 at step #336, and flash data are input from the flash control circuit 300 in the flash unit 3 at step #338. Then, an exposure operation subroutine is called at step #340 to derive an exposure value and the like. This subroutine will be described later.

After returning from the exposure operation subroutine, the release switch S2 and metering switch S1 are checked at steps #345 and #350. If the release switch S2 is closed (step #345), the program moves to a release subroutine. If only the metering switch S1 is closed, steps #345 and #350 are repeated to wait for a change in the state of the switches S1 and S2. If the metering switch S1 is also open (step #350), the flash and in-focus displays are turned off at step #352, the movable lens in the photographic lens 2 is returned to the initial position at step #354, the metering operation is stopped at step #356, and the program returns to the main routine.

Figure 9A:
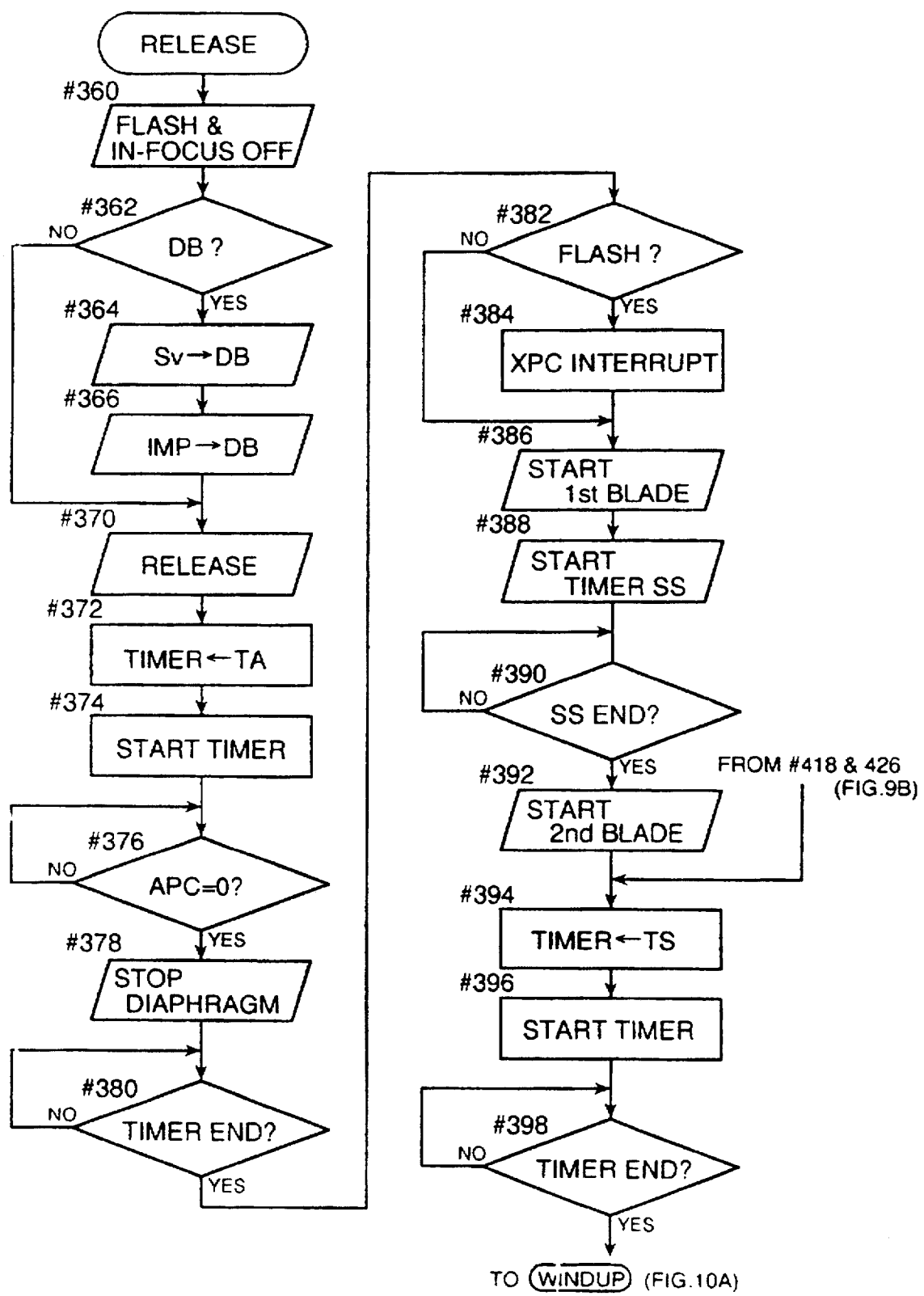
Figure 9B:
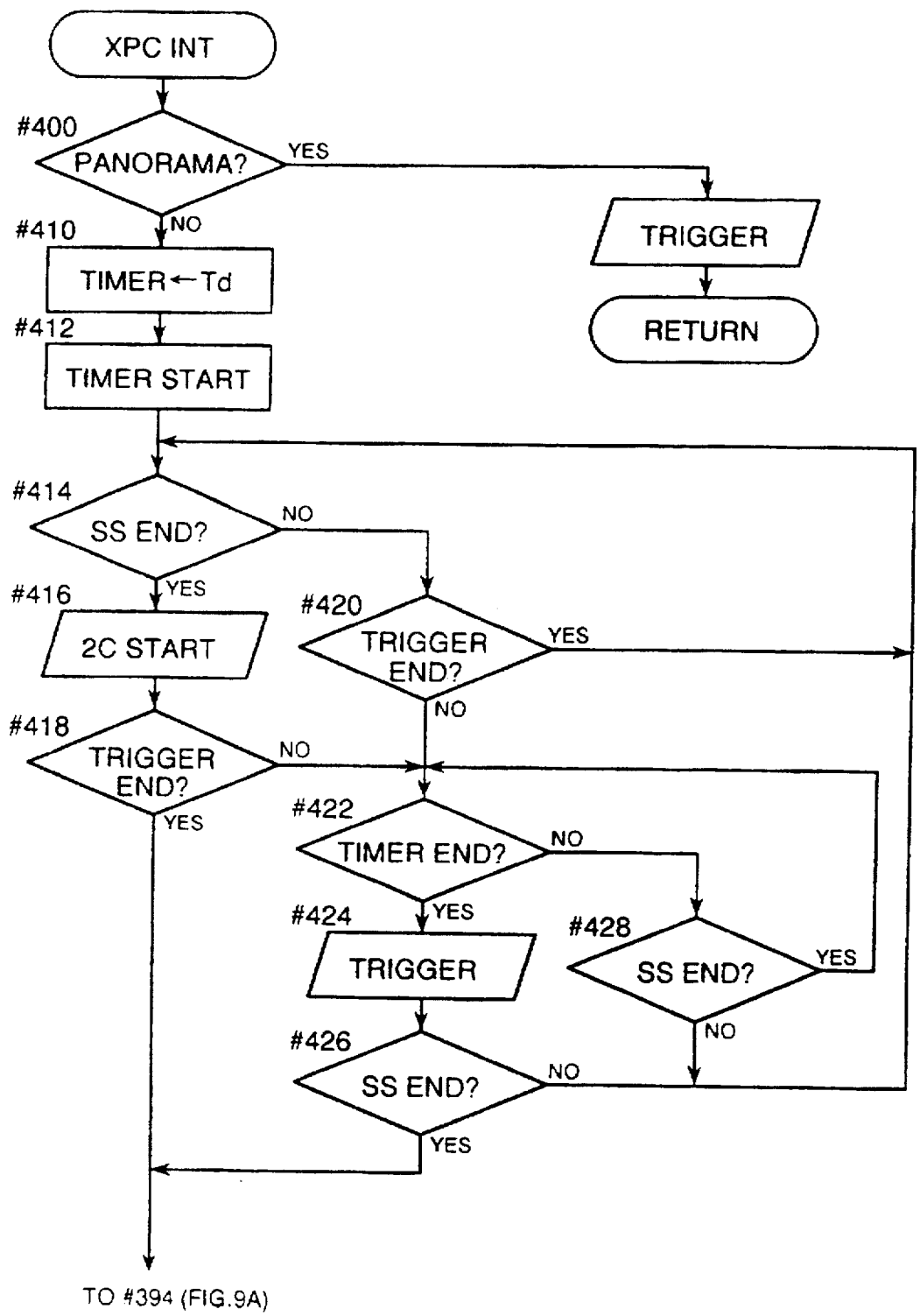

FIGS. 9A and 9B show flowcharts of the release subroutine noted above.

In this subroutine, the flash and in-focus displays are both turned off at step #360 since an image cannot be seen through the viewfinder during a shutter release. Subsequently, only if the data back unit 4 is provided (step #362), film sensitivity Sv and data recording start signal IMP are transmitted to the data control circuit DB at steps #364 and #366.

Thereafter, the release magnet 111 is driven to start a release operation at step #370. A timer is started after setting time TA required for a mirror raising operation (steps #372 and #374). A diaphragm counter APC operable with the diaphragm detecting photo coupler 123 is checked at step #376. If the stop-down amount reaches a predetermined amount, the diaphragm stopping magnet 112 is operated to fix the diaphragm at step #378. Then, at step #380, the program waits for the above timer to expire, i.e. completion of the mirror raising operation.

After the mirror raising operation is completed, checking is made at step #382 whether a flash mode using the flash unit 3 is selected or not. Only when the flash mode is selected, step #384 is executed to permit a synchronization interrupt or XPC interrupt for causing the flash unit 3 to emit light in synchronism. Thereafter, the first shutter blade 22P is started at step #386, and a shutter timer SS for measuring shutter speed is started at step #388. After waiting for the shutter tinier Ss to expire (step #390), the second shutter blade 22S is started at step #392.

Subsequently, a timer is started after setting time Ts required for a run of the second blade 22S (steps #394 and #396). After waiting for this timer to expire (step #398), the program moves to a subsequent windup subroutine.

The synchronization interrupt or XPC interrupt subroutine is executed in the flash mode while waiting for expiration of the shutter timer SS (steps #388 to #390). This XPC interrupt for synchronization takes place when light is detected by the photo coupler 121 for detecting the intermediate position of the shutter as described hereinbefore, that is when the bottom edge of the first shutter blade 22P reaches the position corresponding to the top edge of the panorama frame Fp.

When the XPC interrupt for synchronization occurs, whether the panorama mode is selected or not is checked at step #400. If the panorama mode on, the program makes a return after a trigger signal is output to the flash control circuit 300 since the shutter is in a fully open state for the panorama size. If the full size mode is on, the timer is started after setting time Td required for the bottom edge of the first shutter blade 20A to run from the position corresponding to the top edge of the panorama frame Fp to the position corresponding to the top edge of the full size frame Ff (steps #410 and #412).

Figure 22:
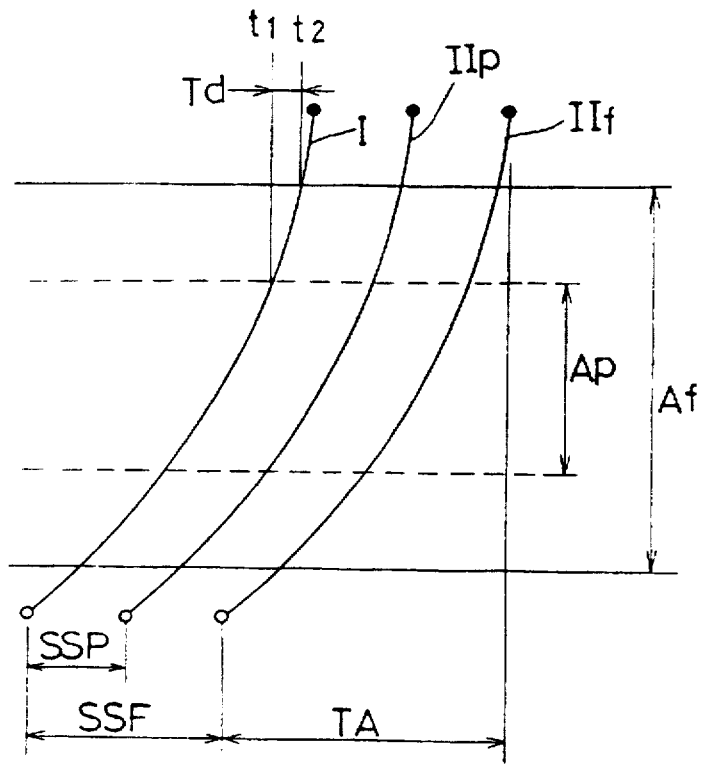

Synchronization timing of the shutter run and the flash unit 3 will be described now. FIG. 22 shows how the first and second shutter blades 22P and 22S run in relation to the panorama size aperture Ap for the panorama frame Fp and the full size aperture Af for the full size frame Ff, with the horizontal axis representing time. In FIG. 22, line I represents the run of the first blade 22P, and lines IIp and IIf represent the runs of the second blade 22S in the panorama mode and full size mode, respectively. Each line has a white circle indicating a start of the run, and a blackened circle indicating an end.

In the panorama mode, a trigger is applied at a point of time t1 at which the first blade 20A moves past the panorama size aperture Ap as described hereinbefore. In the full size mode, the aperture is larger and the synchronizable shutter speed is slower than in the panorama mode. With the XPC interrupt for synchronization, the trigger signal is output at a point of time t2 at which the first blade 22P moves past the full size aperture Af. Since slow synchronization is also possible, this timing may be after the second blade 22S starts running upon lapse of a predetermined shutter speed SSf as shown.

Returning to the description of the XPC interrupt, in the full size mode, the timer is started at step #412 when the first shutter blade moves past the intermediate point as described. Thereafter, the trigger signal output and waiting for lapse of the predetermined shutter speed are both carried out within the interrupt subroutine. After completion of both, the program moves to steps #394 et seq.

Thus, when the shutter timer SS expires, the second blade 22S is started (steps #414 and #415). If output of the trigger signal is completed at step #418, the program moves to step #394 for counting of the run. Otherwise the program waits for the timer to expire at step #422, and causes the trigger signal to be output at step #424. Subsequently, if the shutter timer SS has expired at step #426, the program moves to step #426 for counting the run of the second blade. If the shutter timer SS has not expired at step #414, the program moves to step #420. If output of the trigger signal has been completed, the program returns to step #414 and waits for the shutter timer SS to expire. If the trigger signal has not been output, the program moves to step #422 and waits for the timer to expire. If the timer has not expired at step #422, the program moves to step #428 for checking the shutter timer SS. If the shutter timer SS has expired, the program returns to step #422 and waits for the timer to expire. If the shutter timer SS has not expired at steps #426 and #428, the program returns to step #414 and waits for the shutter timer SS to expire.

Figure 10A:
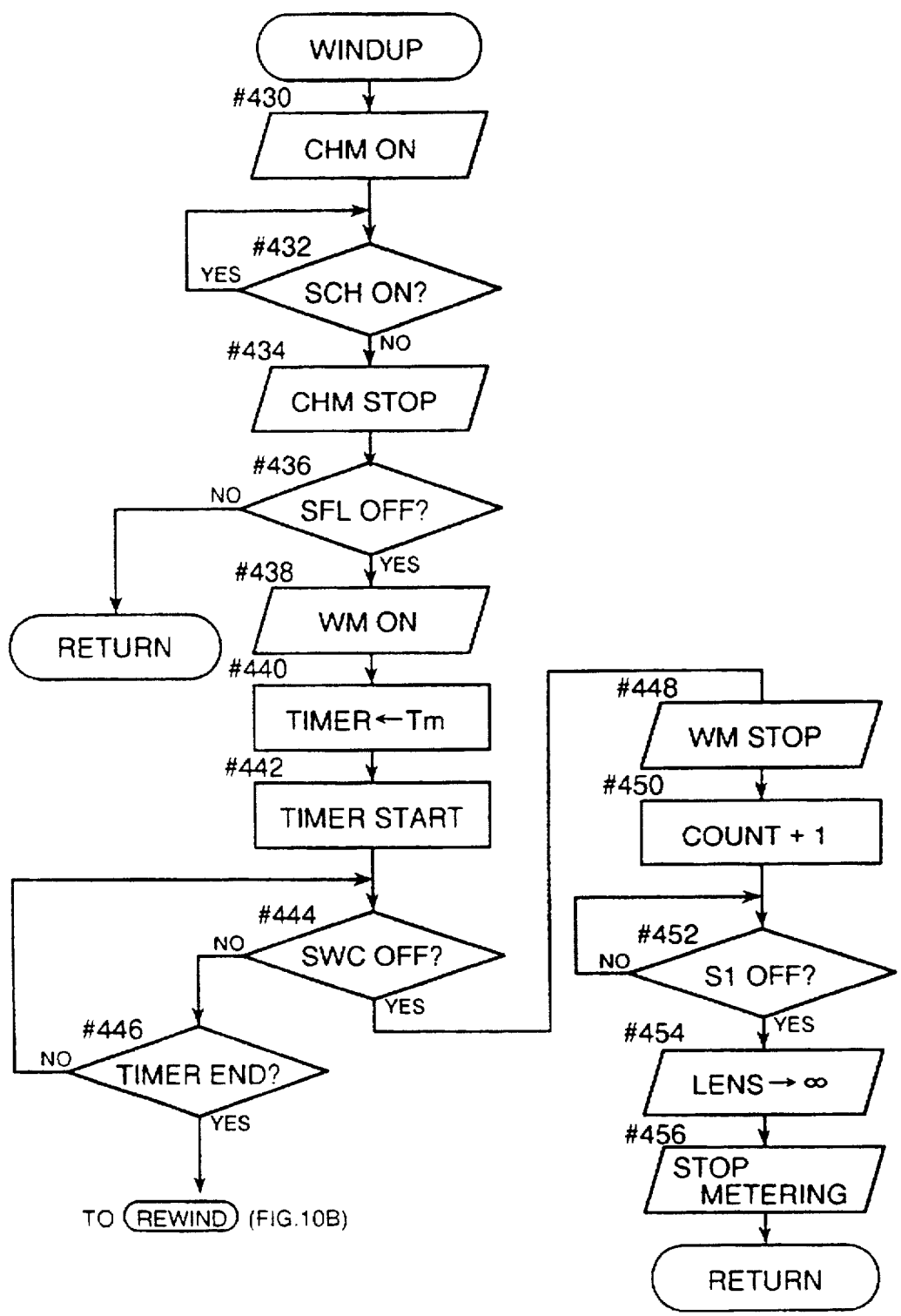
Figure 10B:
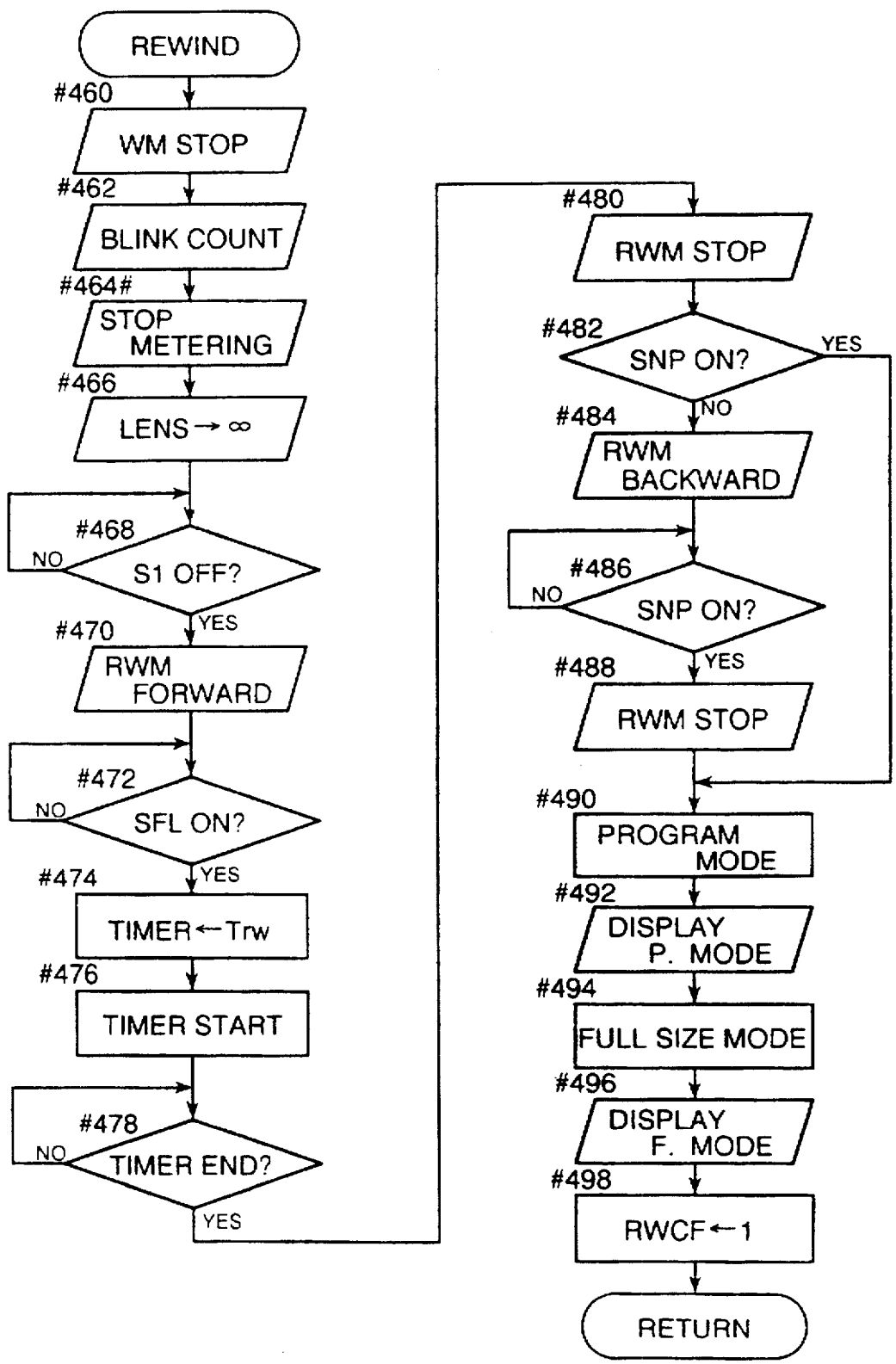
Figure 11A:
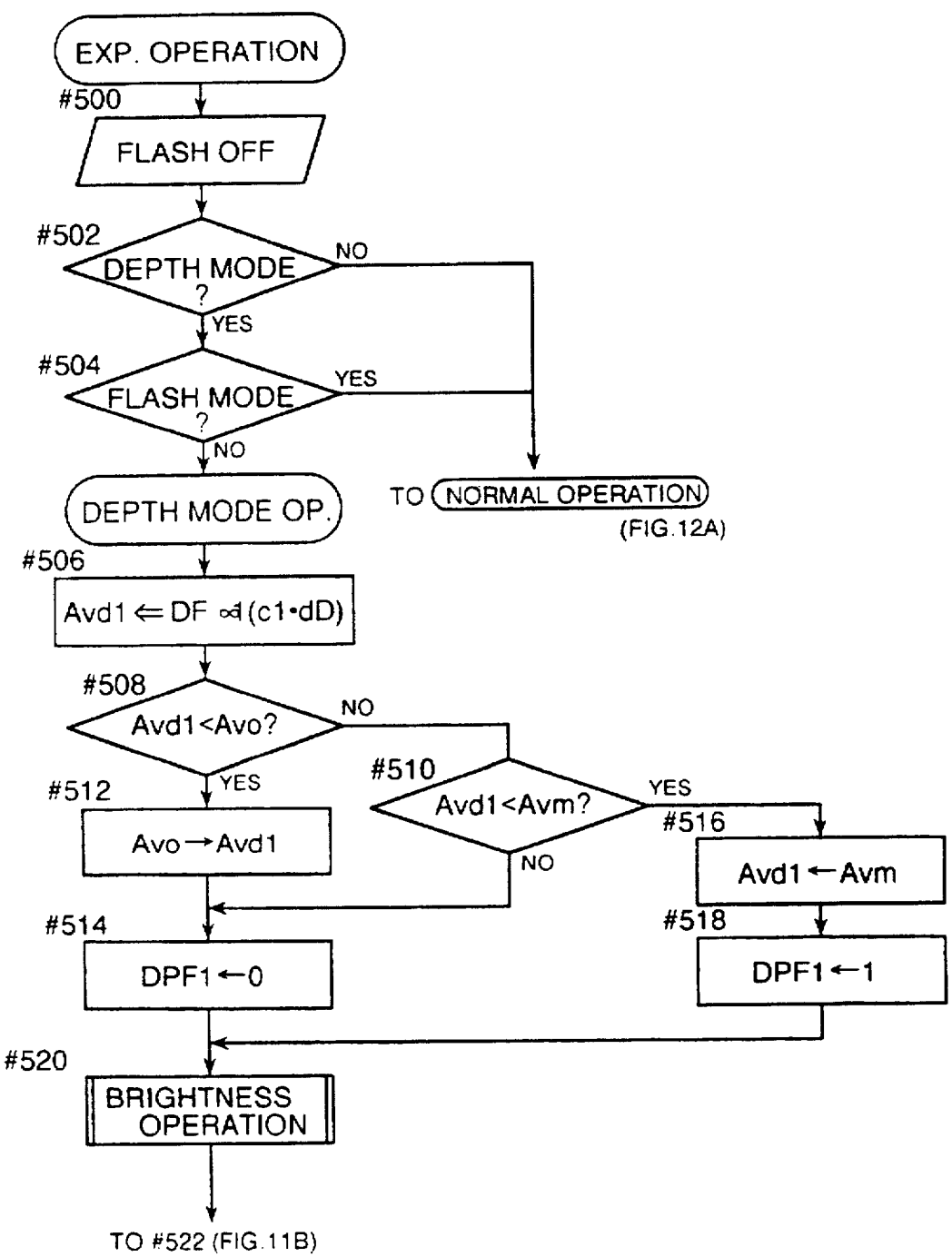
Figure 11B:
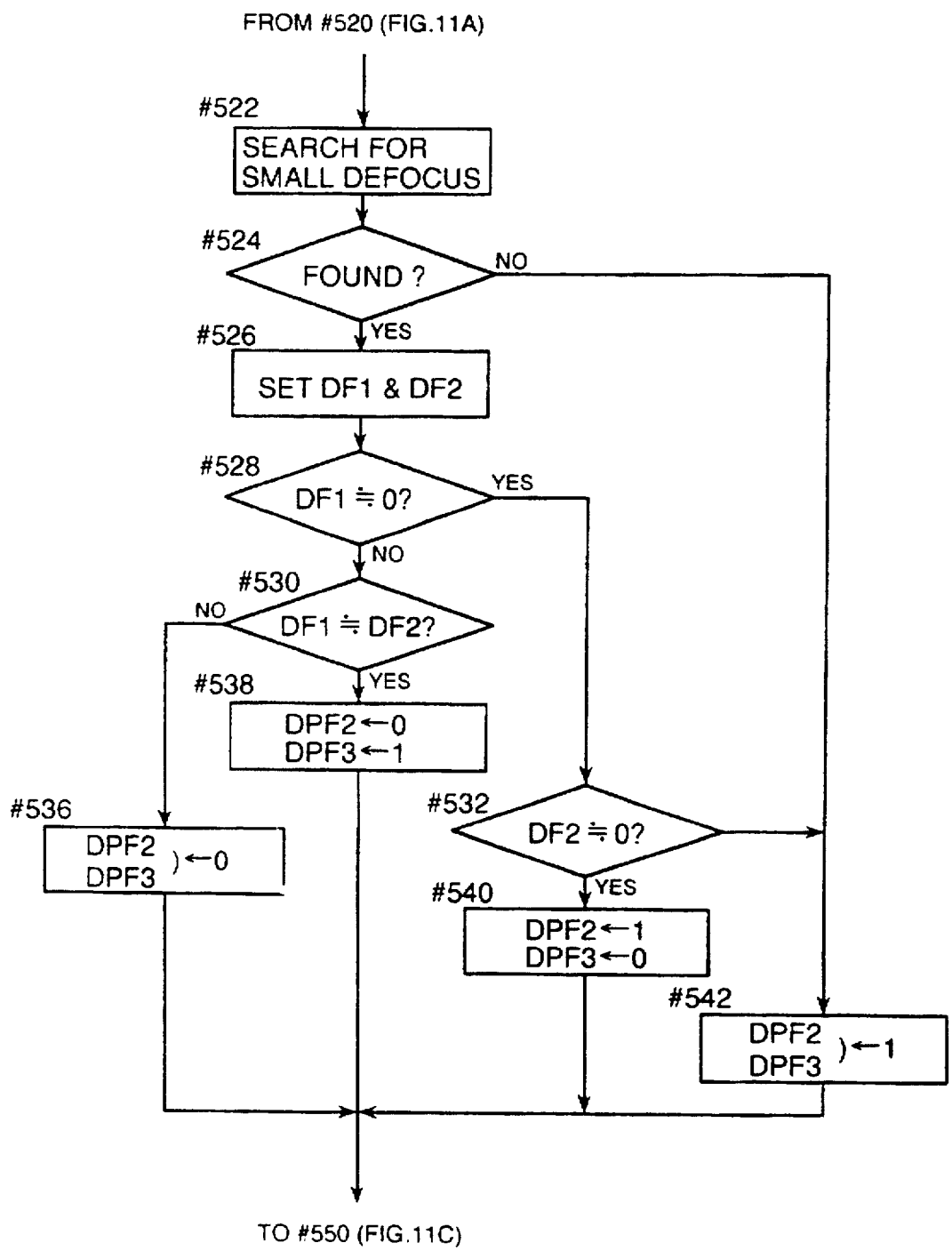
Figure 11C:
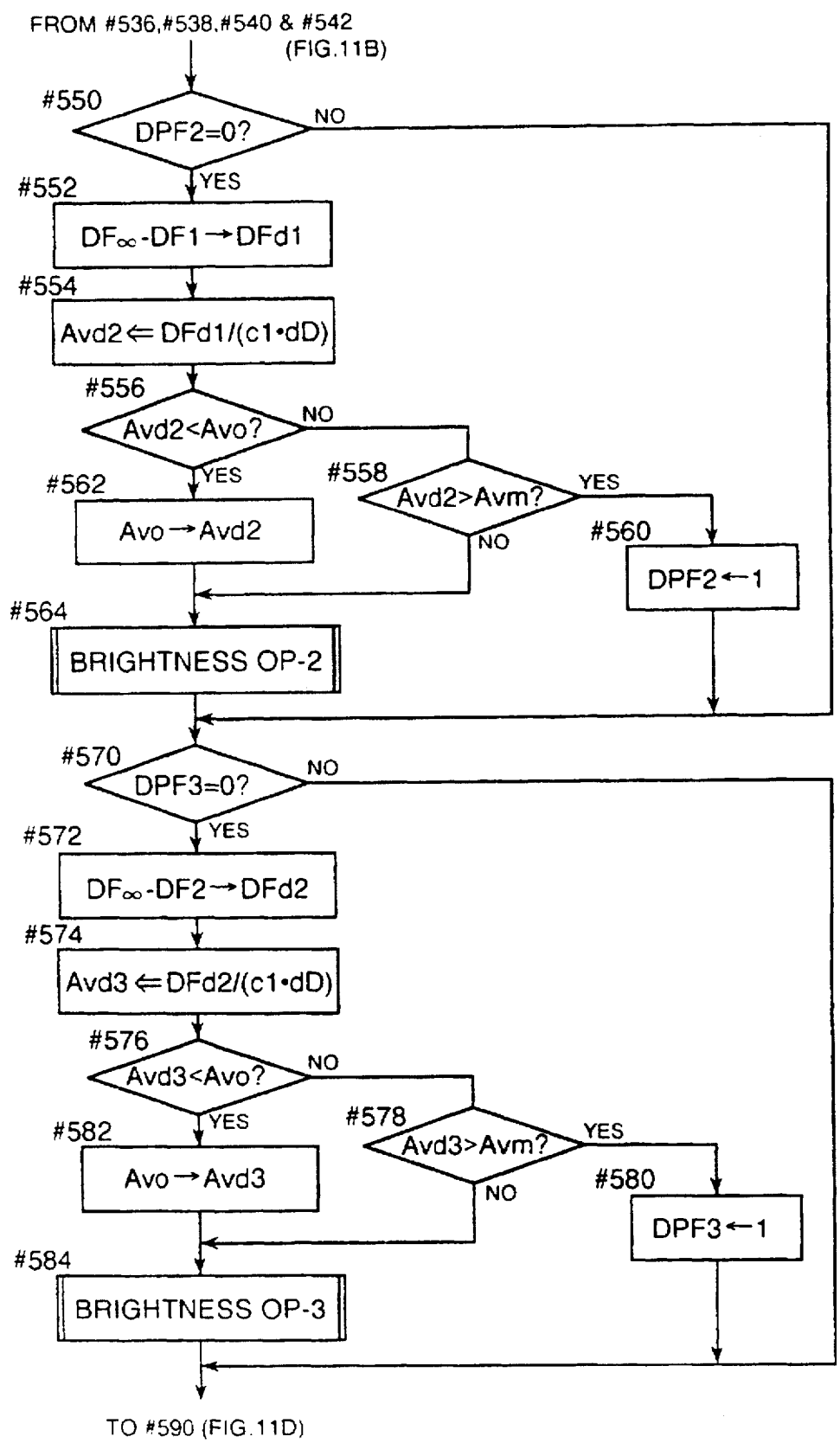
Figure 11D:
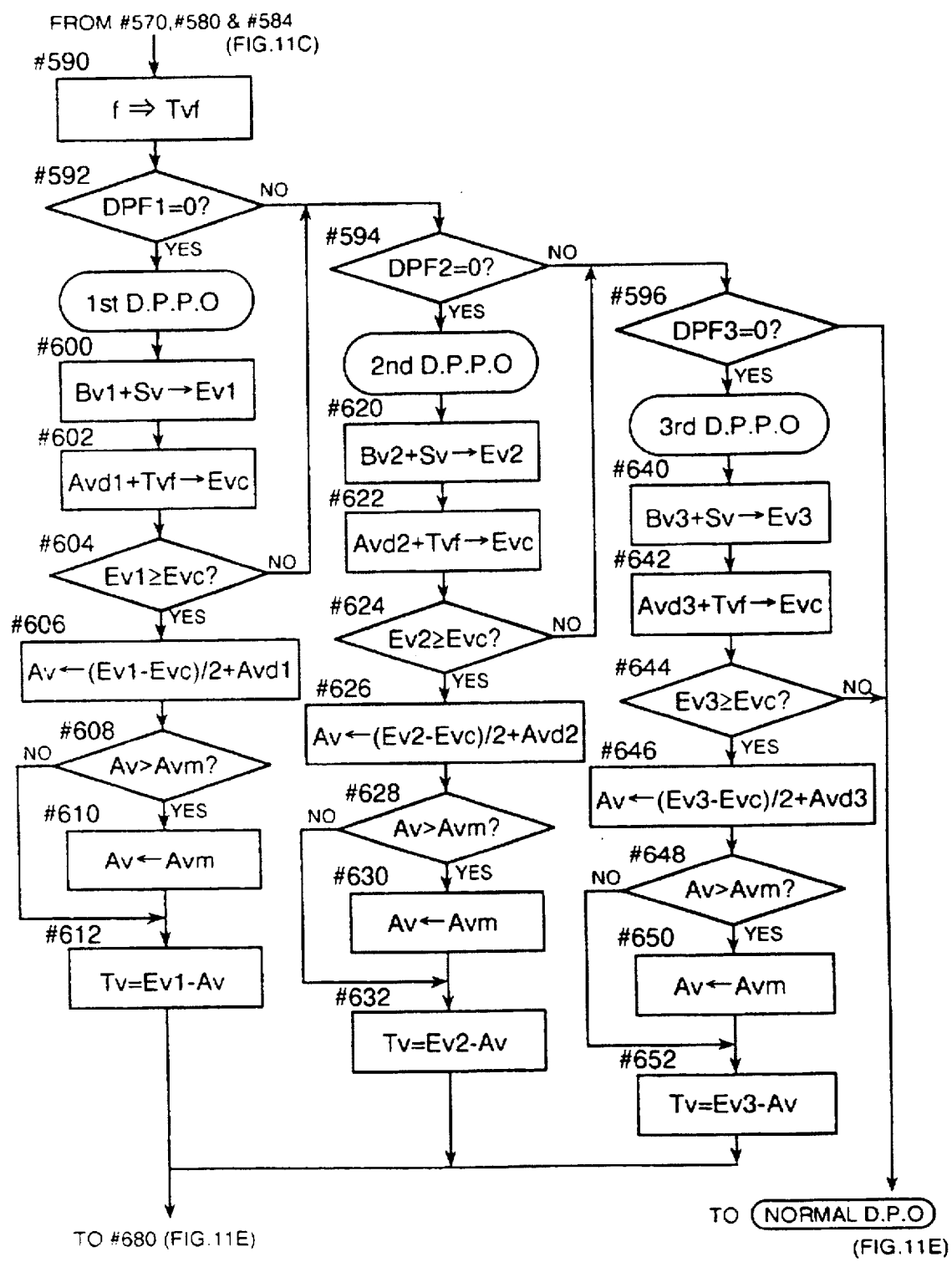
Figure 11E:
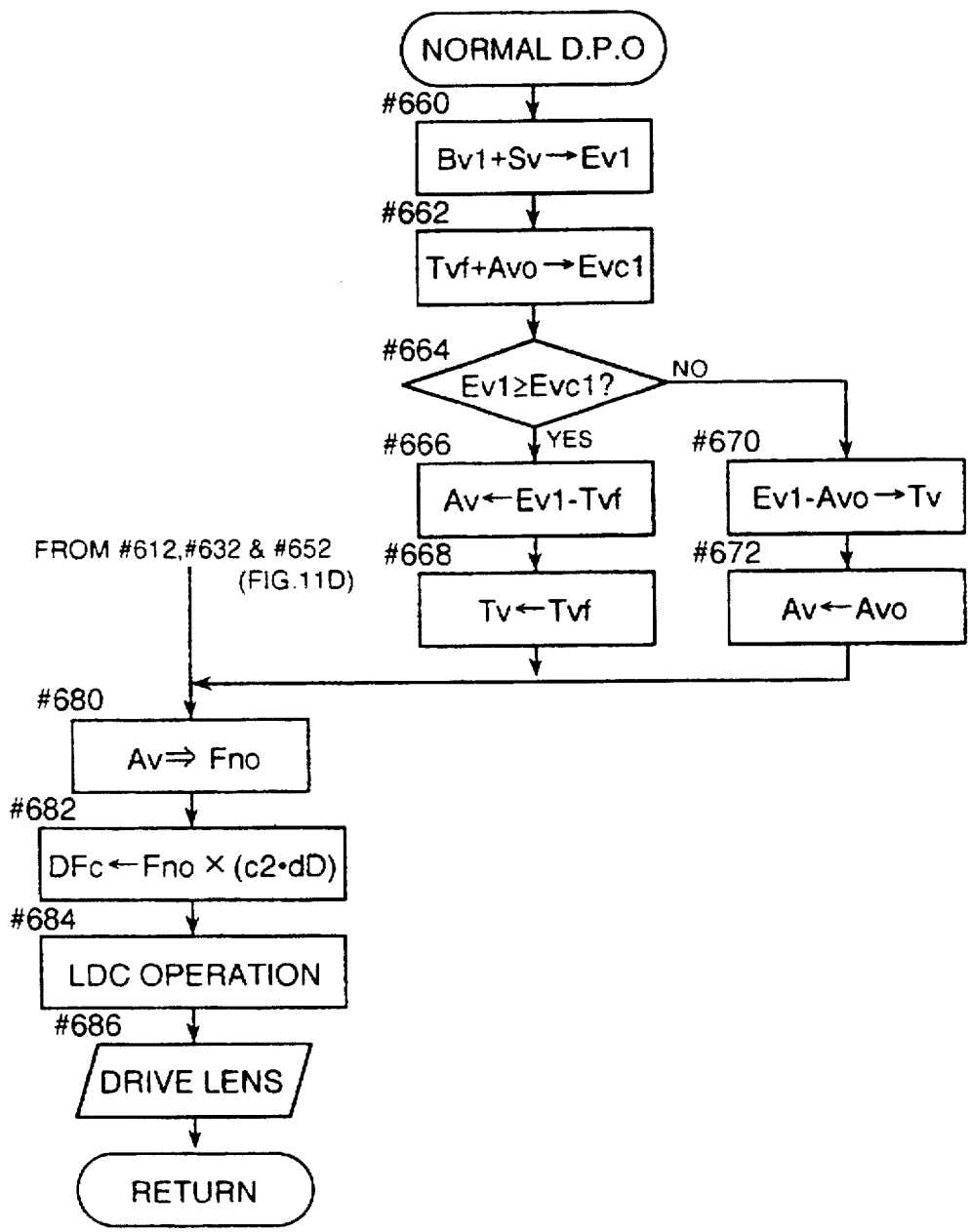

When the second blade 22S completes its run at step #398, the program moves to the windup subroutine as noted hereinbefore. FIGS. 10A and 10B show flowcharts of the windup subroutine.

In this subroutine, the charge motor CHM is started for charging the shutter, diaphragm and mirror mechanism until the charge detecting switch SCH is opened (steps #430 to #434). If a film is not loaded (step #436), the program returns to the main routine since it indicates blind phototaking.

If a film is loaded, the winding motor WM is started at step #438, and a timer is started after setting the time required for advancing the film by one frame at steps #440 and #442. After waiting for the one-frame switch to be opened (step #444), the winding motor WM is stopped at step #448 and a film count is incremented at step #450. After waiting for the metering switch S1 to be opened at step #452, the movable lens of the photographic lens 2 is returned to the initial position at step #454. Then, after stopping the metering operation at step #456, the program returns to the main routine.

While waiting for the film to be taken up by one frame, whether the timer expires or not is checked at step #446. If the timer expires, it is determined that the film has been taken up to the end and in tension. Then the program moves to steps #460 et seq. for executing a rewind subroutine.

In this subroutine, the winding motor WM is stopped at step #460, the film count is blinked at step #462 for notifying that the end of the film has been reached, the metering operation is stopped at step #464, and the movable lens of the photographic lens 2 is returned to the initial position at step #466. After waiting for the metering switch S1 to be opened (step #468), the rewind motor RWM is driven forward to rewind the film at step #470. Then, at step #472, the program waits for the film detecting switch SFL to be closed. Subsequently, the timer is started after setting the time Trw required for the forward end of the film to move from a position opposed to the film detecting switch SFL into the film cartridge (steps #474 and #476). After waiting for the timer to expire (step #478), the rewind motor RWM is stopped at step #480.

Then, the frame size is checked at step #482. Only when the panorama size is selected, the rewind motor RWM is driven backward till closure of the full size detecting switch SNP, to change the frame size to the full size (steps #484 to #488).

Subsequently, at step #490, the focus mode is set to the program mode, which is displayed on the body display 15 at step #492. The frame size:mode is set to the full size mode at step #494, which is displayed at step #496. After setting a rewind completion flag RWCF to "1" at step #498, the program returns to the main routine.

FIGS. 11A through 11E and FIGS. 12A through 12C show flowcharts of the exposure operation subroutine called at step #340 of the operation and control subroutine.

In this subroutine, the flash indicator is turned off at step #500, the focus mode is checked at step #502, and whether the flash mode is on or not is checked at step #504. In the event of the program mode and the flash mode, the program moves to a subroutine for normal operation to be described later. Otherwise, the program moves to steps #506 et seq. for a depth mode operation subroutine.

In the depth mode operation subroutine, a great depth of field is secured by stopping down the diaphragm within a range causing no camera shake, in order to photograph, in a well-focused state, objects in the three focus areas Fl, Fc and Fr described hereinbefore. Also, the movable lens of the photographic lens 2 is moved from an in-focus position with respect to a main photographic object (the object in a selected focus area or the closest object in the case of "whole") within a range not deviating from the above depth of field.

To describe this aspect further, the depth of field is present for the following reason. Consider that each part of a photographic object is formed of spots. An image is recorded when such spots are formed on a film surface through the photographic lens. An ideal image is obtained if the spots constituting the object are formed on the film in a perfect way. In practice, however, perfect spots cannot be obtained but a somewhat blurred image is formed because of lens aberration, defocus and the like. This cannot be perceived by the human eye, and spots blurred up to a certain degree are recognized as spots. The limitation to the faculty of the human eye may be defined by the diameter of a blurred spot image. This diameter is referred to as the diameter of a permissible circle of confusion "dD". A defocus is negligible as long as the degree of the blur of a spot focus on an image plane is within the diameter of a permissible circle of confusion dD forwardly and rearwardly of the image plane. This range is the depth of focus, and the range of a photographic object focused within the depth of focus is the depth of field. An object in the depth of field results in a focused photograph (that is, focused in the human eye, and this applies to the description to follow).

Figure 23:
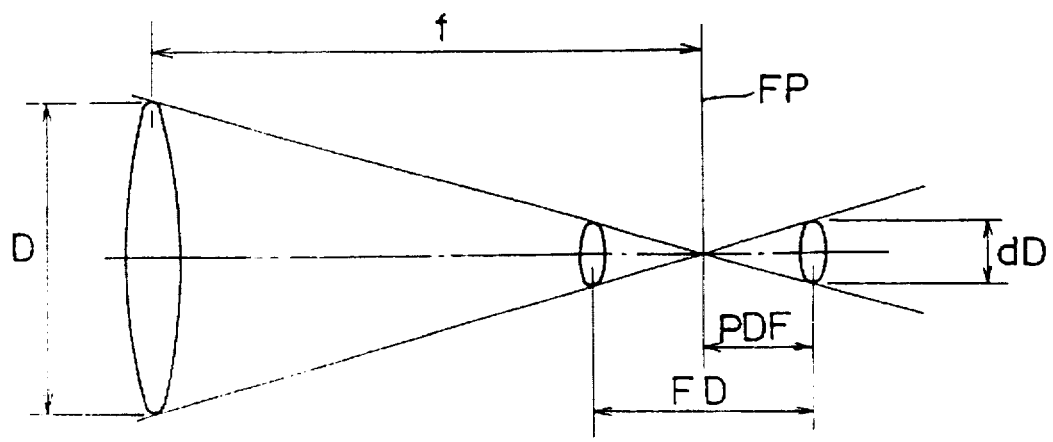

Once the diameter of a permissible circle of confusion dD is determined as above (e.g. 33.3 micrometers), the size of the depth of focus may be derived therefrom. Assuming an optical path as shown in FIG. 23, a range of allowable blur PDF extending at one side of an in-focus position FP is expressed by the following equation:

$$F/D=PDF/dD \qquad (i)$$

Since F-number F of the photographic lens 2 is defined as F=f/D, the following equation is obtained from the above equation:

$$PDF=F \times dD \qquad (ii)$$

Since the depth of focus FD is twice the allowable range PDF, $$FD=2 \times F \times dD \qquad (iii)$$

The depth of field is now considered on the basis of the above concept. In order to take an in-focus photograph of a plurality of objects lying far and near within a certain range, the objects in this range must be formed as images within the depth of focus. It will be understood that, for this purpose, F-number F of the photographic lens 2 may be changed since the above equations (ii) and (iii) show the diameter of a permissible circle of confusion dD is specific to the photographic lens 2.

Figure 24A:
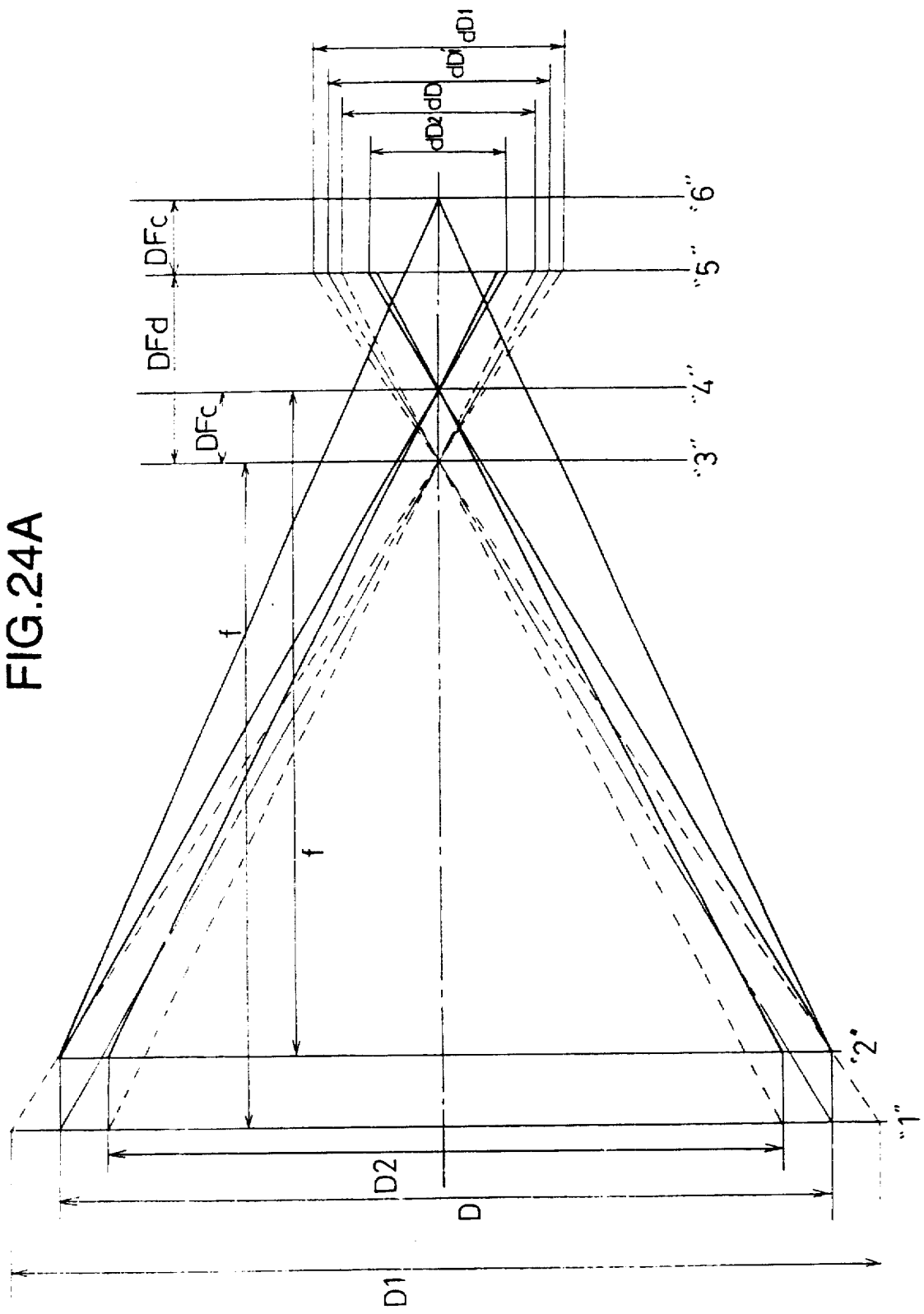
FIGS. 24A through 24C are explanatory views of depth priority processing.

As shown in FIG. 24A, for example, it is assumed that the image of a certain main object is focused on a film plane "5". At this time, the image of an auxiliary object far from the main object (e.g. an object at infinity) is focused at position "3". Consequently, a point image of the auxiliary object formed on the film plane has a diameter dB1 which is greater than the diameter of a permissible circle of confusion dD. If exposure is effected in this state, the auxiliary object will be out of focus.

In this state, the following relationship is formed:

$$F1=f/D1=DFd/dD1 \qquad (iv)$$

where F1 is an F-number of the photographic lens 2, f is a focal length, D1 is an effective diameter of the photographic lens 2, and DFd is an amount of defocus of the auxiliary object with respect to the main object.

The diameter of the spot image of the auxiliary object on the film plane "5" will be equalized to the diameter of a permissible circle of confusion dD by changing the stop-down of the photographic lens 2 while maintaining the photographic lens 2 in position "1". That is, to bring the auxiliary object into an end part of the depth of field, F-number F of the photographic lens 2 may be changed to a maximum depth priority F-number Fdepm derived from the following equation:

$$Fdepm=f/D2=DFd/dD \qquad (v)$$

If exposure is effected in this state, a photograph with the auxiliary object also in focus is obtained in theory. However, photographic objects are usually three-dimensional rather than planar and have projections and recesses along an optical axis. In practice, therefore, a photograph with the auxiliary object in focus is not always possible if the auxiliary object is in the end part of the depth of field. Thus, it is desirable to carry out exposure with some allowance for the depth.

On the other hand, there is limitation to the stop-down of the photographic lens 2. Furthermore, under photographic conditions in which objects have low brightness, an increased amount of stop-down results in a reduced shutter speed which increases the possibility of camera shake. Thus, a variation in the stop-down alone does not facilitate photography of the main and auxiliary objects both in focus.

To cope with such a situation, a control may also be provided for shifting the in-focus position of the photographic lens 2 to a corrected in-focus position closer to the auxiliary object. This is possible since, when the photographic lens 2 is in position "1", the main object is focused on the film plane "5" with depth allowances in either sides. As a result, F-number of the photographic lens 2 may be reduced smaller (that is, a larger aperture) than the maximum depth priority F-number Fdepm mentioned hereinbefore. This reduces the restriction on the stop-down due to the limitation to the stop-down of the photographic lens 2, brightness and others, and realizes a photograph of the main and auxiliary objects both in focus.

To describe this aspect by referring to FIG. 24A, a depth priority F-number Fdep dD1' (dD1'=C1×dD; C1>=1) is obtained which, with the photographic lens 2 located in position "1", renders the image of one spot of the auxiliary object on the film plane "5" smaller than the size dD1 of the spot image of the auxiliary object in equation (iv) though it is slightly larger than the diameter of a permissible circle of confusion dD. That is, $$Fdep=f/D=DFd/dD1'=DFd/C1 \times dD \qquad (vi)$$

where C1 is a constant greater than or equal to 1, which sets the effective aperture diameter of the photographic lens 2 in position "1" to "D". This effective aperture diameter is greater than the effective aperture diameter of the photographic lens 2 that provides the maximum depth priority F-number Fdepm. As a result, the amount of stop-down for such depth priority processing is reduced.

Next, the photographic lens 2 is shifted to position "2" while maintaining the effective aperture diameter D of the photographic lens 2. In this position, the spot image of the auxiliary object on the film plane "5" has a size dD2 which is smaller than the diameter of a permissible circle of confusion dD. In this state, the following relationship is formed:

$$Fdep=f/D=(DFd-DFc)/dD2 \qquad (vii)$$

where DFc is an amount of movement of the photographic lens (hereinafter referred to as the corrected defocus amount).

From this equation (vii) and the preceding equation (iv), the following is obtained:

$$DFc = DFd - dD2 \times Fdep$$
$$= C1 \times dD \times Fdep - k \times dD \times Fdep$$
$$= (C1 - k) \times dD \times Fdep$$

Therefore, if C2=C1−k, $$DFc = C2 \times dD \times dep \quad \text{(viii)}$$

That is, the three constants dD, C1 and C2 may be determined in advance of the depth priority processing which combines the stop-down operation and the movement of the photographic lens 2. Specifically, a stop-down control is carried out first by deriving depth priority F-number Fdep from equation (vi) using amounts of defocus DFd of the main and auxiliary objects obtained in the focus detecting operation. Next, a lens position control is carried out by deriving the corrected defocus amount DFc from equation (viii) using the above depth priority F-number Fdep.

As a result, a photograph may be taken with no noticeable defocus occurring with the main photographic object, and other objects lying over a wide range along an extension line from the camera also in focus with a small amount of stop-down.

From the equations (vi), (vii) and (viii), the following equation is obtained:

$$DFc/DFd = C2 \times dD \times Fdep/C1 \times dD \times Fdep \quad \text{(ix)}$$
$$= C2/C1 = 1 - k/C1$$

Assuming, for example, that the corrected in-focus position is approximately midway between the image of the main object and that of the auxiliary object, C1=1 and C2=0.5 will result in the following equation:

$$DFc/DFd = \tfrac{1}{2}$$

Figure 24B:
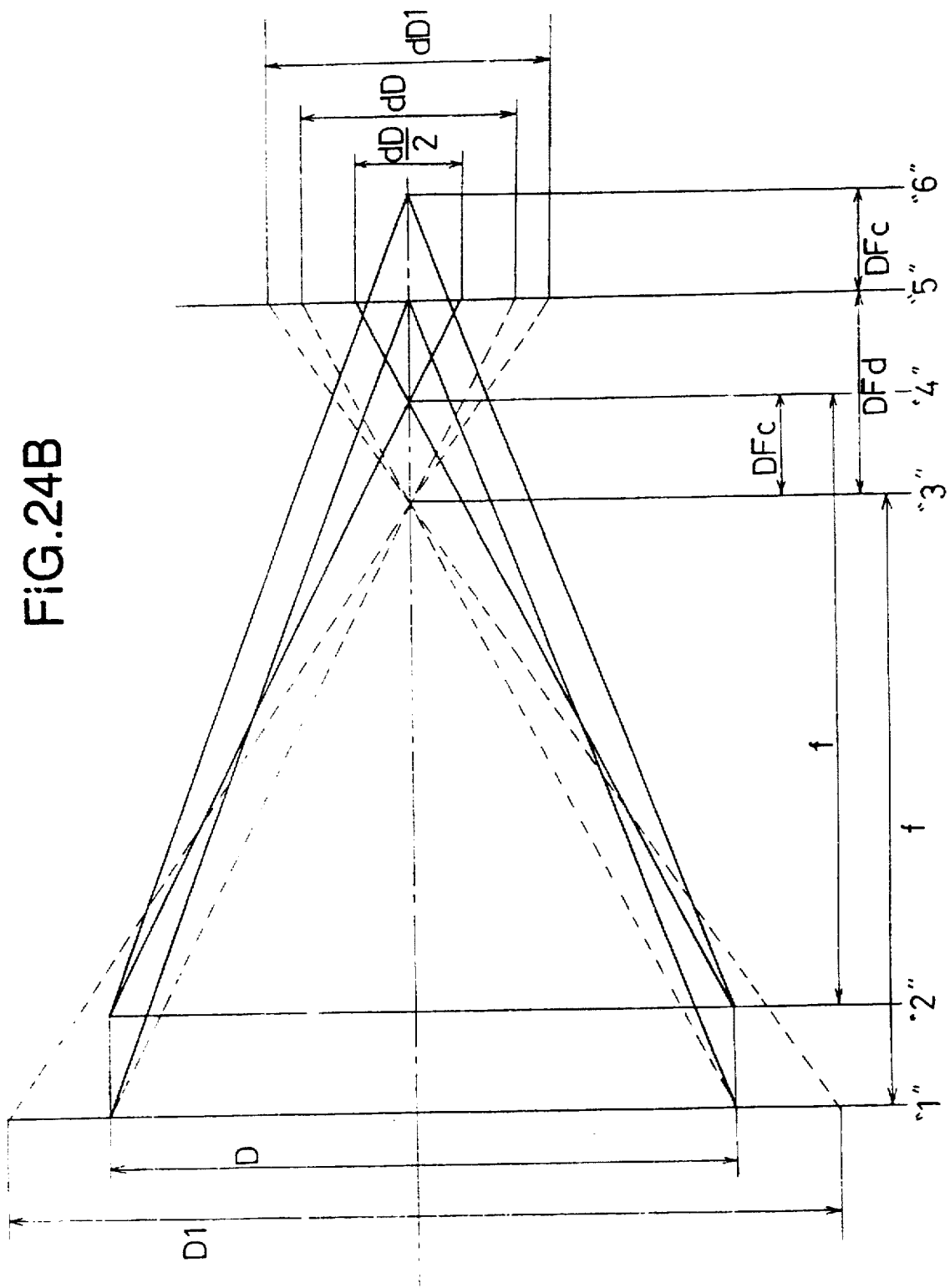

Then, as shown in FIG. 24B, the image of the auxiliary object is focused at position "4" forwardly of the film plane "5", and the spot image of the auxiliary object on the film plane "5" has a size dD/2. On the other hand, the image of the main object is focused at position "6" rearwardly of the film plane "5" and the spot image of the main object on the film plane "5" is slightly smaller than dD/2. Thus, a photograph is taken with both the objects located in the depth of field with sufficient allowances.

Under certain photographic conditions, it may be difficult to take a photograph of both the objects in focus even with the movement of the photographic lens 2. Such conditions include insufficient brightness of the objects, excessive defocus amounts of the main and auxiliary objects resulting in the possibility of camera shake due to stop-down, and the necessity for a stop-down beyond a minimum aperture. In such cases also, the photographic lens 2 is moved in an amount corresponding to the aperture, such that the diaphragm is stopped down to a degree not causing camera shake or to the minimum aperture, or that the image of the auxiliary object is brought as close to the depth of focus as possible while avoiding the image of the main object moving out of the depth of focus.

Figure 24C:
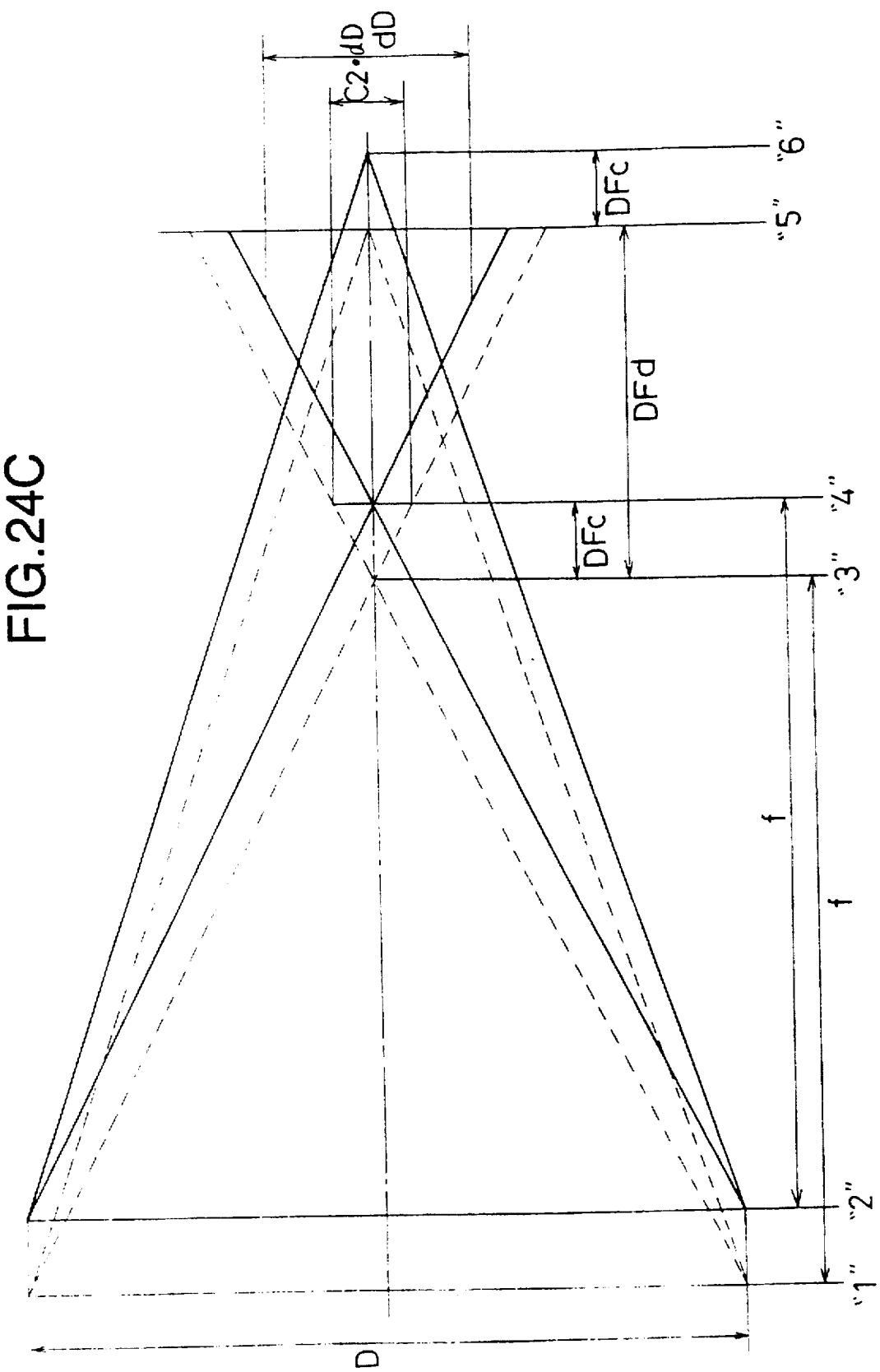

To describe this aspect by referring to FIG. 24C, it is assumed that the photographic lens 2 is in position "1" with F-number Flim corresponding to the stop-down that causes no camera shake or the minimum aperture and the effective aperture diameter of the photographic lens 2 being "D". In this state, the image of the main object is focused on the film plane "5" while that of the auxiliary object is focused at position "3" forwardly of the film plane "5". The corrected defocus amount DFc is derived from equation (viii) by substituting F-number Flim for depth priority F-number Fdep. Thus, $$DFc = C2 \times dD \times Flim$$
$$= C2 \times dD \times f/D$$

If the photographic lens 2 is moved the corrected defocus amount from position "1" to position "2", the image of the main object is focused at position "6" rearwardly of the film plane "5" and the spot image of the main object on the film plane "5" is smaller than C2×dD. Thus, the main object is in focus with some allowance. On the other hand, the image of the auxiliary object is focused at position "4" forwardly of the film plane "5", and the spot image of the auxiliary object on the film plane "5" is larger than the diameter of a permissible circle of confusion dD but smaller than the size dD1 provided when the photographic lens 2 is in position "1". Thus, it may be said that the auxiliary object is brought closer to an in-focus state.

In the depth operation mode, A depth priority aperture value Avd1 is obtained first, which corresponds to the depth priority F-number Fdep for the main object on the assumption of the auxiliary object at infinity (the processing for fitting two photographic objects in the depth of field is hereinafter referred to as depth priority processing, and the operation for obtaining the depth priority aperture value Avd as a depth operation). Thereafter, if depth priority processing is possible in relation to a photographic object lying in a different focus area, a depth operation is carried out in preparation therefor. The photographic lens 2 is fine-adjusted on the basis of the corrected defocus amount derived therefrom after effecting an adjustment taking a maximum aperture value and a critical shutter speed with respect to hand wobbling into consideration. This camera obtains the defocus amount as related to infinity in order to expedite the calculation where the auxiliary object is assumed to be at infinity as described above.

Returning to the exposure operation subroutine, the depth mode subroutine thereof will be described further. The aperture values, brightness levels and the like appearing in the following description are all based on the APEX system in logarithmic expression.

In this subroutine, the depth priority F-number Fdep is first derived from the foregoing equation (vi) using the defocus amount previously obtained for the main photographic object, and a first depth priority aperture value Avd1 corresponding thereto is obtained at step #506.

Next, the first depth priority aperture value Avd1 is compared with an open aperture value Avo and a maximum aperture value Avm (steps #508 and #510). If the first depth priority aperture value Avd1 is smaller than the open aperture value Avo, the open aperture value Avo is set as the first depth priority aperture value Avd1 at step #512. The depth operation is possible in this case and in the case that the first depth priority aperture value Avd1 is between the open aperture value Avo and maximum aperture value Avm. To indicate possibility of the depth operation, a first depth operation flag DPF1 is set to "0" at step #514. If the first depth priority aperture value Avd1 is greater than the open aperture value Avo, the maximum aperture value Avm is set as the first depth priority aperture value Avd1 at step #516. Since no further stop-down is possible, the first depth operation flag DPF1 is set to "1" to indicate this (step #518).

Subsequently, a subroutine "brightness operation -1" is called at step #520 for obtaining a first brightness value Bv1 by priority averaging based on selected focus areas. Operation expressions therefor are listed in Tables 1 and 2. In the tables, "selected area" means a selected focus area, and "adjoining areas" means a focus area including a photographic object having approximately the same defocus amount as the object in the selected focus area. When the "selected area" is one of the right and left focus areas, the "adjoining area" is provided only if at least the center area includes an object having approximately the same defocus amount as the object in the selected focus area. To avoid complication, only the left focus area is exemplified in the tables. The operation may be carried out with similar expressions when other areas are selected.

Table 1 relates to the panorama mode, and Table 2 to the full size mode. In either case, the operation expressions place weight on object brightness information obtained from the "selected area" and "adjoining area". The sign "S" in the tables shows sizes of the respective area.

Next, the remaining defocus amounts obtained earlier are searched, at step #522, in order to find defocus amounts DF smaller (i.e. the objects being farther away) than the defocus amount DF used.

If a smaller defocus amount DF is not found (step #524), the depth priority processing cannot be carried out in relation to the photographic objects in the remaining focus areas. So, a second depth operation flag DPF2 and a third depth operation flag DPF3 are both set to "1" at step #542, and the program moves to step #550.

If smaller defocus amounts DF are found, the smaller of them is set as a first defocus amount DF1 and the larger as a second defocus amount DF2 at step #526. The first and second depth operation flags DPF2 and DPF3 are set in accordance with their values (steps #528 to #532).

If the defocus amounts DF1 and DF2 are both approximately zero, the two objects are almost at infinity. The depth operation has already been carried out for the main object at steps: #506, on the assumption of the auxiliary object being at infinity. Thus, there is no need for repeating the depth priority processing. After setting both of the second and third depth operation flags DPF2 and DPF3 to "1", the program moves to step #550.

If the first defocus amount DF1 is not zero and approximately equal to the second defocus amount DF2, one depth operation is sufficient. So, the second depth operation flag DPF2 is set to "0" and the third depth operation flag DPF3 to "1" at step #538. If the second defocus amount DF2 is not zero, the second depth operation flag DPF2 is set to "1" and the third depth operation flag DPF3 to "0" at step #540. Thereafter the program moves to step #550. It means that, in the above two cases, the depth priority processing may be carried out with respect to the photographic object in one of the focus areas.

Since, at steps #526, the second defocus amount DF2 is set greater than the first defocus amount DF1, the second defocus amount DF2 is not zero if the first defocus amount DF1 is not zero and the two defocus amounts DF are not equal. Thus, the two depth operation flags DPF2 and DPF3 are both set to "0" at step #536 to carry out depth operations separately. Subsequently, the program moves to step #550.

In the routine from step #550 to step #564, the second depth operation is carried out by using the first defocus amount DF1. In the routine from step #570 to step #584, the third depth operation is carried out by using the second defocus amount DF2. The second depth operation flag DPF2 is checked at step #550, and the third depth operation flag DPF3 is checked at step #570. These depth operations are skipped if they are found impossible or unnecessary.

In the routine for the second depth operation, a first defocus difference DFd1 is obtained by subtracting the first defocus amount DF1 from the defocus amount DF used (step #552). Thereafter, the second depth priority aperture value Avd2 is derived from the foregoing equation (vi) using the first defocus difference DFd1 (step #554).

Next, the second depth priority aperture value Avd2 is compared with the open aperture value Avo and maximum aperture value Avm at steps #556 and #558. If the second depth priority aperture value Avd2 is smaller than the open aperture value Avo, the open aperture value Avo is set as the second depth priority aperture value Avd2 at step #562. In this case and in the case that the second depth priority aperture value Avd2 is between the open aperture value Avo and maximum aperture value Avm, a subroutine "brightness operation - 2" is called at step #564 to obtain the second brightness value Bv2 resulting from priority averaging based on selected focus areas. If the second depth priority aperture value Avd2 is greater than the maximum aperture value Avm, no further stop-down is possible and the second depth operation flag DPF2 is set to "1" at step #560. Subsequently, the program moves to step #570.

In the routine for the third depth operation, a second defocus difference DFd2 is obtained by subtracting the second defocus amount DF2 from the defocus amount DF used (step #572). Thereafter, the third depth priority aperture value Avd3 is derived from the foregoing equation (vi) using the second defocus difference DFd2 (step #574).

Next, the third depth priority aperture value Avd3 is compared with the open aperture value Avo and maximum aperture value Avm at steps #576 and #578. If the third depth priority aperture value Avd3 is smaller than the open aperture value Avo, the open aperture value Avo is set as the third depth priority aperture value Avd3 at step #582. In this case and in the case that the third depth priority aperture value Avd3 is between the open aperture value Avo and maximum aperture value Avm, a subroutine "brightness operation - 3" is called at step #584 to obtain the third brightness value Bv3 resulting from priority averaging based on selected focus areas. If the third depth priority aperture value Avd3 is greater than the maximum aperture value Avm, no further stop-down is possible and the third depth operation flag DPF3 is set to "1" at step #580. Subsequently, the program moves to step #590.

Operation expressions for the second brightness value Bv2 and third brightness value Bv3 in the brightness operation - 2 and brightness operation - 3 are listed in Table 3. This table shows the panorama mode only. In the full size mode also, the operations may be carried out, as for the first brightness value Bv1, by adding metering values for adjoining areas to the operation expressions listed in Table 3.

At step #590, a shutter speed Tvf corresponding to the limitation calculated from the focal length f of the photographic lens 2. Next, steps #592 to #596 are executed by referring to the three depth operation flags DPF1, DPF2 and DPF3. If the first depth operation flag DPF1 is set to "0" and the first depth priority aperture value Avd1 is obtained, the program moves to step #600 for a first depth priority program operation routine. If the first depth priority aperture value Avd1 is not obtained, the second depth operation flag DPF2 is set to "0" and the second depth priority aperture value Avd2 is obtained, then the program moves to step #620 for a second depth priority program operation routine. If neither the first depth priority aperture value Avd1 nor the second depth priority aperture value Avd2 is not obtained and only the third depth priority aperture value Avd3 is obtained, the program moves to step #640 for a third depth priority program operation routine. If none of the depth priority aperture values are obtained, the program moves to step #660 for a normal depth program operation routine.

In the first depth priority program operation, a first exposure value Ev1 is derived from the first brightness value Bv1 and film sensitivity value Sv (step #600). A depth priority exposure value Evc is derived from the first depth priority aperture value Avd1 and camera-shake shutter speed Tvf at step #602. Then, the first exposure value Ev1 and depth priority exposure value Evc are compared at step #604.

If the first exposure value Ev1 is smaller than the depth priority exposure value Evc, the first exposure value Ev1 is not available for the program control. The program then turns to step #594 instead of executing the subsequent steps.

If the first exposure value Ev1 is equal to or greater than the depth priority exposure value Evc, step #606 is executed for deriving an aperture value Av for use from the following equation by using the first exposure value Ev1, depth priority exposure value Evc and first depth priority aperture value Avd1:

$$Av=(Ev1-Evc)/2+Avd1.$$

Then, the aperture value Av for use and the maximum aperture value Avm are compared at step #608.

The maximum aperture value Avm is set as the aperture value Av for use only when the aperture value Av for use exceeds the maximum aperture value Avm (step #610). Then, at step #612, a shutter speed Tv for use is obtained by subtracting the aperture value Av for use from the first exposure value Ev1. Subsequently, the program moves to step #680.

Next, in the second depth priority program operation, a second exposure value Ev2 is derived from the second brightness value Bv2 and film sensitivity value Sv (step #620). A depth priority exposure value Evc is derived from the second depth priority aperture value Avd2 and camera-shake shutter speed Tvf at step #622. Then, the second exposure value Ev2 and depth priority exposure value Evc are compared at step #624.

If the second exposure value Ev2 is smaller than the depth priority exposure value Evc, the second exposure value Ev2 is not available for the program control. The program then turns to step #596 instead of executing the subsequent steps.

If the second exposure value Ev2 is equal to or greater than the depth priority exposure value Evc, step #626 is executed for deriving an aperture value Av for use from the following equation by using the second exposure value Ev2, depth priority exposure value Evc and second depth priority aperture value Avd2:

$$Av=(Ev2-Evc)/2+Avd2.$$

Then, the aperture value Av for use and the maximum aperture value Avm are compared at step #628.

The maximum aperture value Avm is set as the aperture value Av for use only when the aperture value Av for use exceeds the maximum aperture value Avm (step #630). Then, at step #632, a shutter speed Tv for use is obtained by subtracting the aperture value Av for use from the second exposure value Ev2. Subsequently, the program moves to step #680.

Further, in the third depth priority program operation, a third exposure value Ev3 is derived from the third brightness value Bv3 and film sensitivity value Sv (step #640). A depth priority exposure value Evc is derived from the third depth priority aperture value Avd3 and camera-shake shutter speed Tvf at step #642. Then, the third exposure value Ev3 and depth priority exposure value Evc are compared at step #644.

If the third exposure value Ev3 is smaller than the depth priority exposure value Evc, the third exposure value Ev3 is not available for the program control. The program then turns to step #660 for the normal depth program operation, instead of executing the subsequent steps.

If the third exposure value Ev3 is equal to or greater than the depth priority exposure value Evc, step #646 is executed for deriving an aperture value Av for use from the following equation by using the third exposure value Ev3, depth priority exposure value Evc and third depth priority aperture value Avd3:

$$Av=(Ev3-Evc)/2+Avd3.$$

Then, the aperture value Av for use and the maximum aperture value Avm are compared at step #648.

The maximum aperture value Avm is set as the aperture value Av for use only when the aperture value Av for use exceeds the maximum aperture value Avm (step #650). Then, at step #652, a shutter speed Tv for use is obtained by subtracting the aperture value Av for use from the third exposure value Ev3. Subsequently, the program moves to step #680.

Finally, in the normal depth program operation, the first exposure value Ev1 is derived from the first brightness value Bv1 and film sensitivity value Sv (step #660). A depth priority critical exposure value Evc1 is derived from the open aperture value Avo and camera-shake shutter speed Tvf at step #662. Then, the first exposure value Ev1 and depth priority critical exposure value Evc1 are compared at step #664.

If the first exposure value Ev1 is greater than the depth priority critical exposure value Evc1, step #666 is executed for subtracting the camera-shake shutter speed Tvf from the first exposure value Ev1 to obtain an aperture value Av for use. At step #668, the camera-shake shutter speed Tvf is adopted as a shutter speed Tv for use. Thereafter, the program moves to step #680. If the first exposure value Ev1 is smaller than the depth priority critical exposure value Evc1, step #670 is executed for subtracting the open aperture value Avo from the first exposure value Ev1 to obtain a shutter speed Tv for use. At step #672, the open aperture value Av is adopted as an aperture value Av for use. Thereafter, the program moves to step #680.

Figure 25:
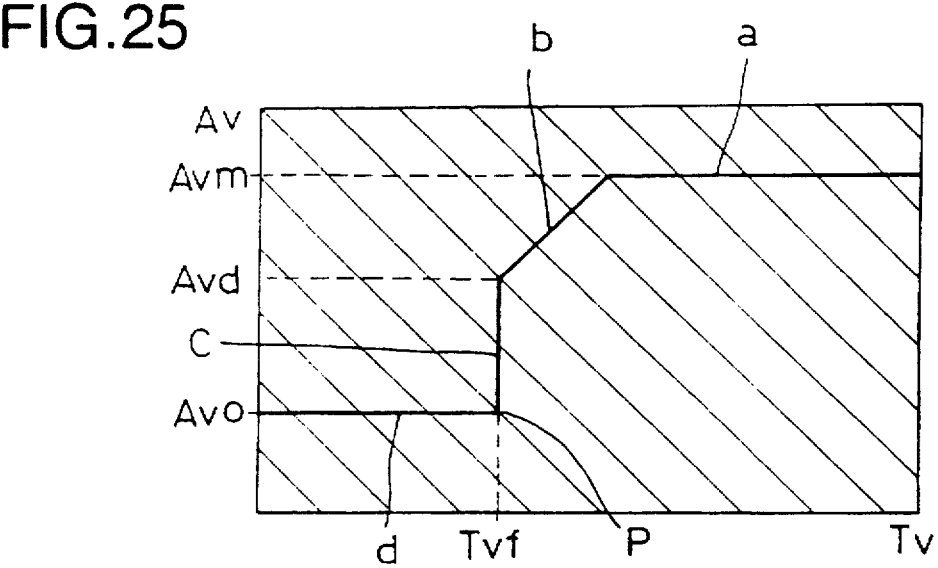

FIG. 25 is a program chart showing operation controls in the above four program operations. In FIG. 25, line a represents the operation carried out at steps #610, #630 and #650 in which the maximum aperture value Avm is adopted as the aperture value Av for use. Line b represents the operation carried out at steps #606, #626 and #646. Lines c and d represent the operations carried out in the normal depth program operation routine. Point p represents the depth priority critical aperture value Avc1. Line c represents the operation carried out at step #666, and line d the operation carried out at step #670.

After the aperture value Av for use and the shutter speed for use are determined through one of the four program operations, step #680 is executed for converting the aperture value Av for use into depth priority F-number Fno. Then, step #682 is executed for obtaining a corrected defocus amount DFc from the in-focus position FP through the following equation using the depth priority F-number Fno and based on the foregoing equation (viii):

$$DFc=Fno\times(C2\times dD) \qquad (x)$$

The corrected defocus amount DFc thus obtained is converted into lens driving pulses LDc at step #684. The movable lens of the photographic lens 2 is driven to the corrected in-focus position based on the pulses LDc at step #686. Then the program makes a return.

Figure 12A:
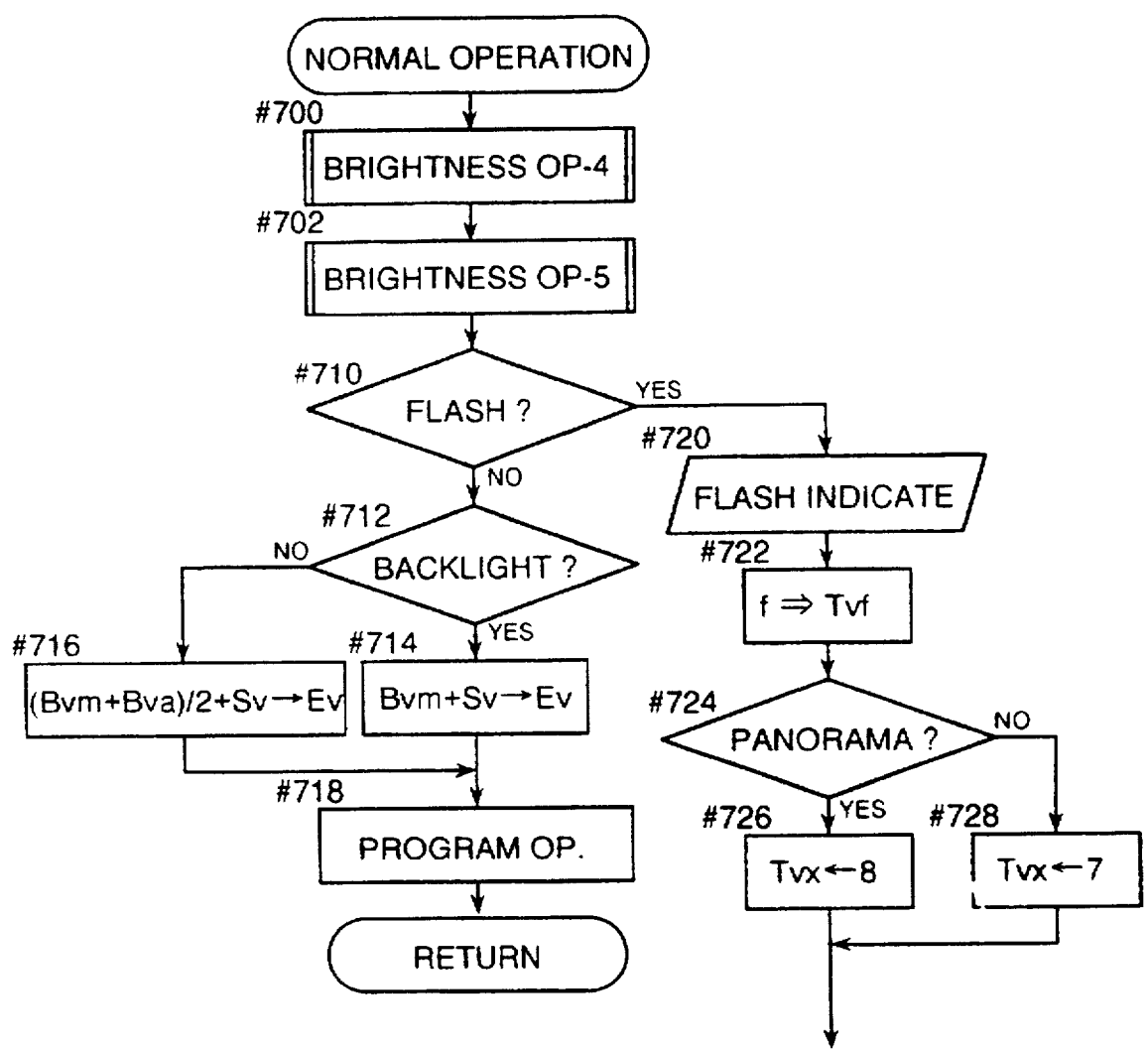
Figure 12B:
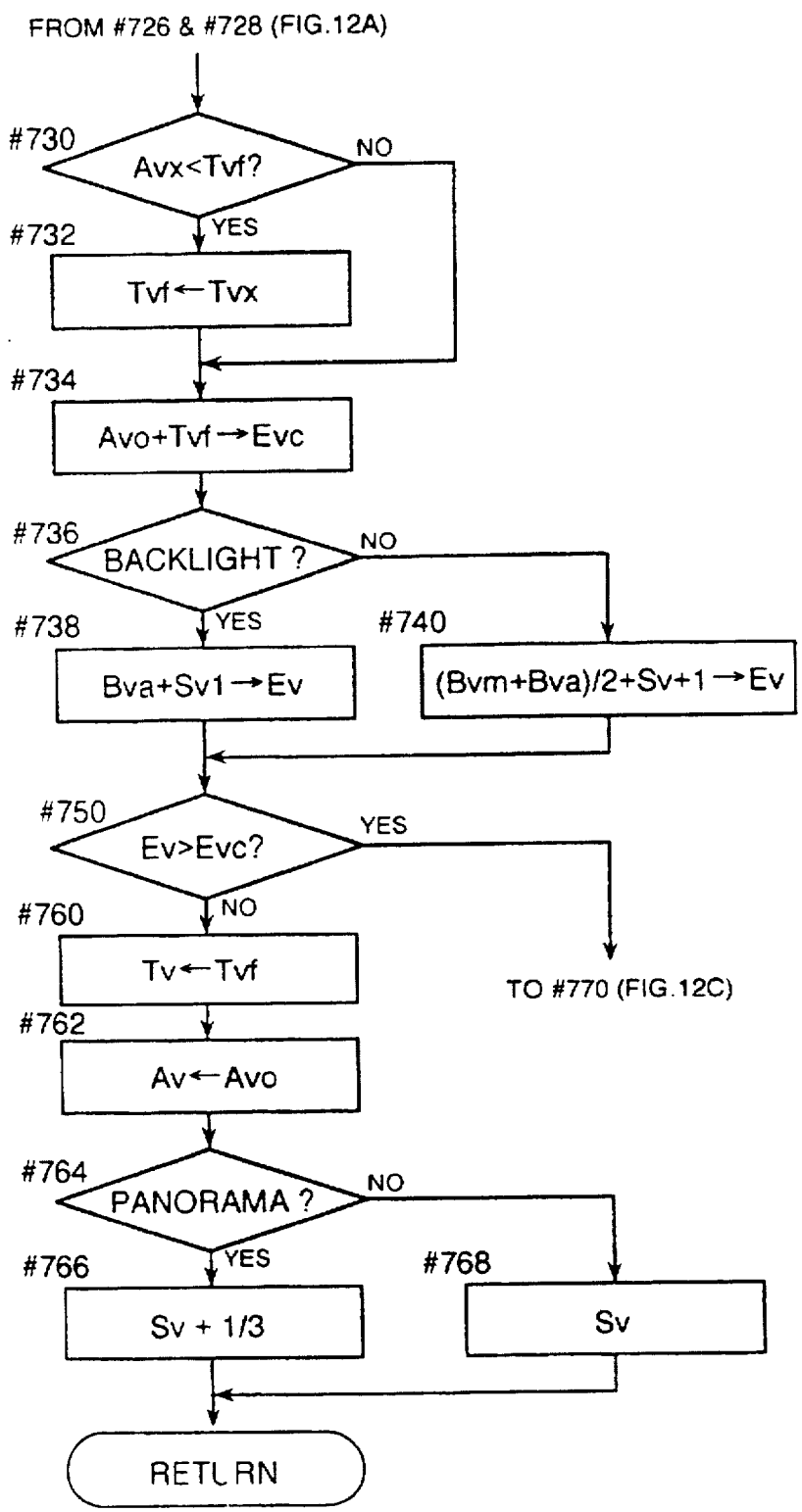
Figure 12C:
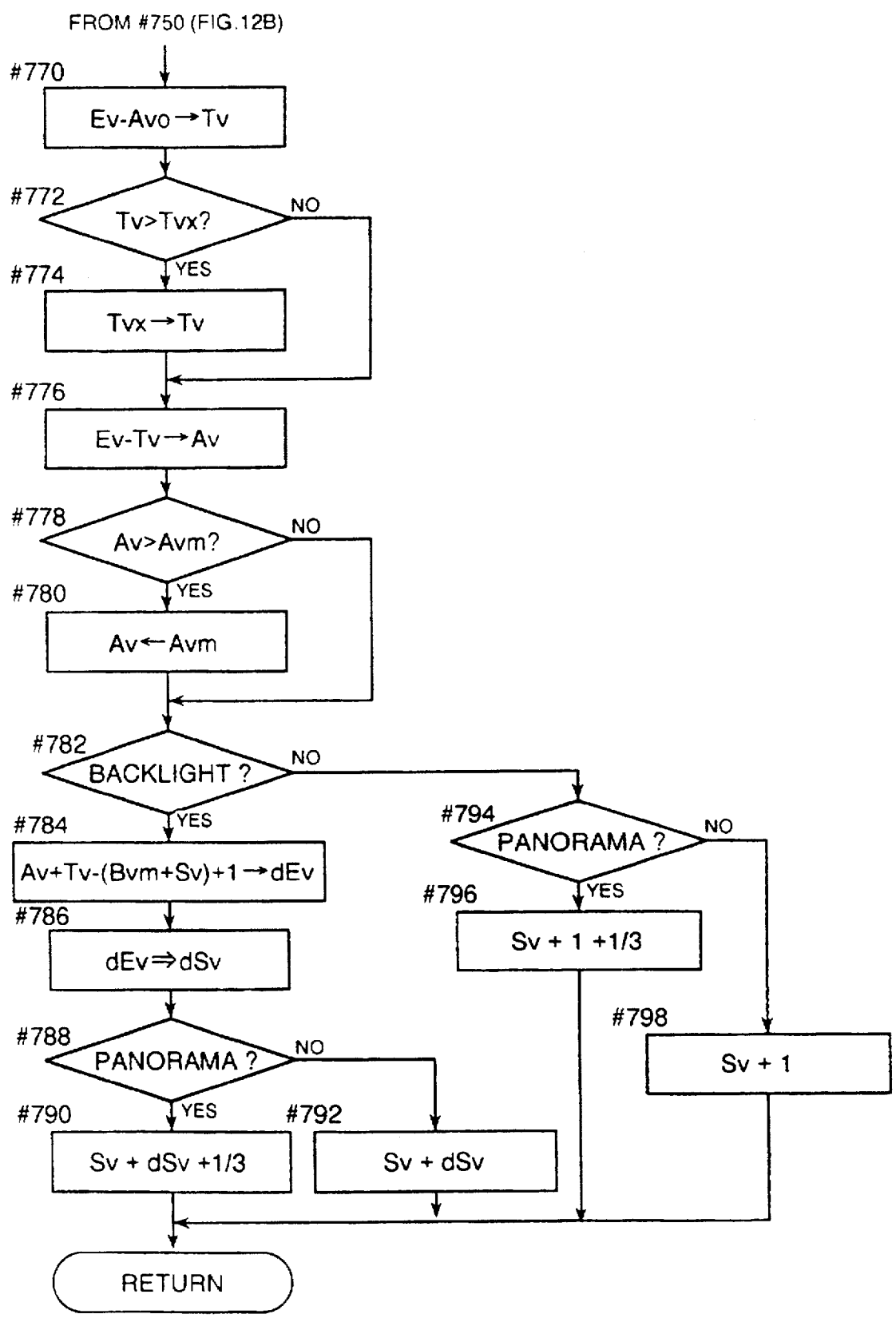

FIGS. 12A, 12B and 12C show flowcharts of the normal operation routine branched from the exposure operation subroutine when the program mode and flash mode are selected.

In this routine, a subroutine "brightness operation - 4" is called at step #700 for obtaining a main brightness value Bvm of the main photographic object in accordance with a selected focus mode. Next, a subroutine "brightness operation - 5" is called at step #702 for obtaining an auxiliary brightness value Bva of an auxiliary photographic object in accordance with the selected focus mode and frame size mode.

Operation expressions for obtaining the two brightness values Bvm and Bva are listed in Table 4. The "selected area" and "adjoining area" in this table are the same as in Tables 1–3.

Next, whether the flash mode is selected or not is checked at step #710. If the flash mode is selected, the program moves to steps #720 et seq. for a flash program operation. If not, whether a backlight condition or not is checked through metering data at step #712. In the case of a backlight condition, step #714 is executed for deriving an exposure value Ev from the following equation using only the main brightness value Bvm:

$$Ev=Bvm+Sv.$$

Otherwise, step #716 is executed for deriving an exposure value Ev from the following equation averaging brightness values obtained from the selected area and adjoining areas:

$$Ev=(Bvm+Bva)/2+Sv.$$

In either case, the program operations are carried out at step #718 to obtain a aperture value Av and a shutter speed Tv for use from the exposure value Ev with reference to a predetermined program chart. Thereafter, the program returns to the original routine.

In the flash program operation routine executed at steps #720 et seq. when the flash mode is selected, the flash indicator is turned on at step #720, and a camera-shake shutter speed Tvf for the camera-shake limitation is obtained from the focal length f of the photographic lens 2 at step #722. Next, whether the panorama mode is selected or not is checked at step #724. If the panorama mode is selected, the synchronization shutter speed Tvx for flash photography is set to "8" corresponding to 1/250 seconds, at step #726, since high-speed synchronization is possible as noted hereinbefore. If the full size mode is selected, step #728 is executed for setting the synchronization shutter speed Tvx to "7" corresponding to 1/125 seconds as in the normal case.

Subsequently, the set synchronization shutter speed Tvx and the camera-shake shutter speed Tvf are compared at step #730. Only when the synchronization shutter speed Tvx is less than the camera-shake shutter speed Tvf, the latter is set as the synchronization shutter speed Tvx at step #732. Then, at step #734, a critical exposure value Evc is obtained from the open aperture value Avo and camera-shake shutter speed Tvf.

Next, whether a backlight condition or not is checked through metering data at step #736. In the case of a backlight condition, step #738 is executed for deriving an exposure value Ev from the following equation using the auxiliary brightness value Bva:

$$Ev=Bva+Sv-1.$$

Since light is flashed for the main object, exposure of adjacent objects is increased by 1 Ev. In the case of, no backlight condition, step #740 is executed for deriving an exposure value Ev from the following equation averaging the main brightness values Bvm and auxiliary brightness value Bva:

$$Ev=(Bvm+Bva)/2+Sv+1.$$

As a result of flashing, exposure of the entire frame will be decreased by 1 Ev. In either case, the exposure value Ev obtained and the critical exposure value Evc are compared at step #750.

When it is dark with the exposure value Ev being less than the critical exposure value Evc, the camera-shake shutter speed Tvf is adopted as the shutter speed Tv at step #760. The open aperture value Avo is adopted as the used aperture value Av at step #762. Then, whether the panorama mode is selected or not is checked at step #764. If it is, the film sensitivity Sv added with "1/3" is set as light adjustment data at step #766. If the full size mode is selected, the film sensitivity Sv is just set as light adjustment data at step #768. Then the program returns to the original routine.

The meaning of adding "1/3" to the film sensitivity Sv as the light adjustment data for the panorama mode will be explained now. As noted hereinbefore, the panorama size corresponds to a vertically intermediate portion of the full size frame. In the panorama mode, therefore, the shutter opening 20a is restricted by the pair of upper and lower light-shielding plates 21A and 21B. Consequently, as shown in FIGS. 14B and 14C, the quantity of light reflected by the film F and impinging on the flash adjusting photo sensor 107 at a time of flash photography is smaller in the panorama mode (FIG. 14C) than in the full size mode (FIG. 14B). The quantity of incident flash light for the different photographic frames is properly determined without varying the sensitivity of the photo sensor 107 between the two mode. That is, the light adjusting circuit of this camera compares a sum of the light detection output of the photo sensor 107 and metering data with a reference value, and outputs a flash stopping signal when the reference value is surpassed. In the panorama mode, therefore, the light adjusting level is substantially lowered by adding the constant "1/3" to the metering data. As a result, attainment of proper exposure is determined earlier than in the ordinary case, to avoid overexposure.

When it is found at step #750 that the exposure value Ev obtained is greater than the critical exposure value Evc, a shutter speed Tv for use is obtained by subtracting the open aperture value Avo from the exposure value Ev (step #770.). Only when the used shutter speed Tv is greater than the synchronization shutter speed Tvx, the latter is set as the shutter speed Tv for use (steps #772 and #774). Then, at step #776, an aperture value Av for use is obtained by subtracting the used shutter speed Tv from the exposure value Ev. Only when this aperture value Av use is greater than the maximum aperture value Avm, the latter is adopted as the aperture value Av for use (steps #778 and #780).

Next, whether a backlight condition or not is checked at step #782. In the case of a backlight condition, since the exposure value Ev has already been obtained at step #738 using only the metering data of the adjoining area, step #784 is now executed for deriving a corrected exposure value dEv from the following equation using the main brightness value Bvm of the main photographic object:

$$dEv=Av+Tv-(Bvm+Sv)+1.$$

Figure 27:
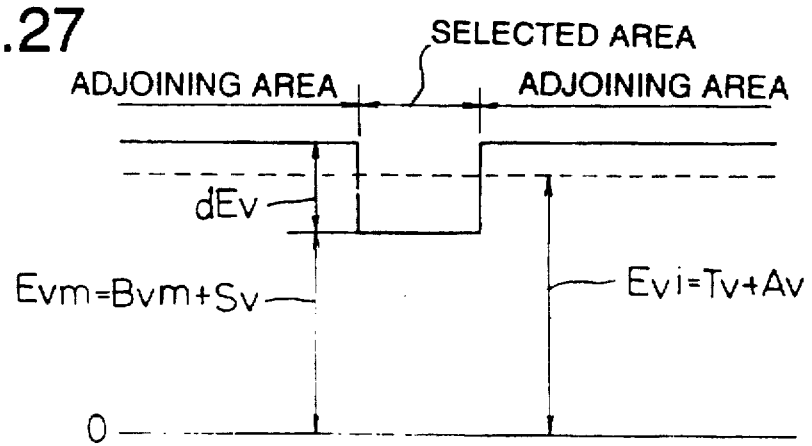

To explain the meaning of this equation, as shown in FIG. 27, the main exposure value Evm for the main object is a sum of the main brightness value Bvm and film sensitivity Sv. On the other hand, a proper exposure value Ev1 is obtained by adding the used aperture value Av and used shutter speed Tv. The corrected exposure value dEv corresponding to the difference between the exposure value Ev obtained from the metering data of adjoining areas and the above main exposure value Evm is obtained by subtracting the main exposure value Evm from the proper exposure value Ev1 and then adding "1" which corresponds to the increase 1 Ev made at step #738.

Next at step #786, a corrected light adjustment value dSv is obtained from the corrected exposure value dEv by referring to the table. Then, whether the panorama mode is selected or not is checked at step #788. If the panorama mode is selected, a sum of the film sensitivity Sv, the corrected light adjustment value dSv and the foregoing frame size adjusting constant "⅓" is set as a light adjustment data at step #790. If the full size mode is selected, a sum of the film sensitivity Sv and the corrected light adjustment value dSv only is set as the light adjustment data at step #792. Subsequently, the program returns to the original routine.

If no backlight condition is found at step #782, whether the panorama mode is selected or not is checked at step #794. If it is, a sum of the film sensitivity Sv, "1" corresponding to the decrease of "1 Ev" made for the entire frame at step #740 and the frame size adjusting constant "⅓" is set as the light adjustment data at step #796. If the full size mode is selected, a sum of the film sensitivity Sv and "1" corresponding to the decrease of "1 Ev" is set as the light adjustment data at step #798. Subsequently, the program returns to the original routine.

Figure 26:
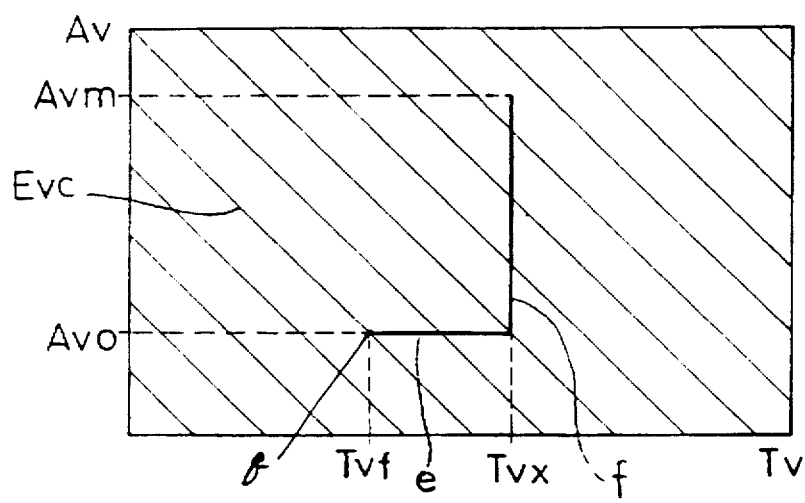

FIG. 26 is a program chart showing operation controls in the flash program operations. In FIG. 26, point q represents the critical exposure value Evc. Exposure values below this value are brought to this point q through the operations carried out at steps #760 and #762. Line e represents the operation carried out at step #770. Line f represents the operations carried out at steps #776 to #780.

Other embodiments of the present invention will be described hereinafter.

Figure 28:
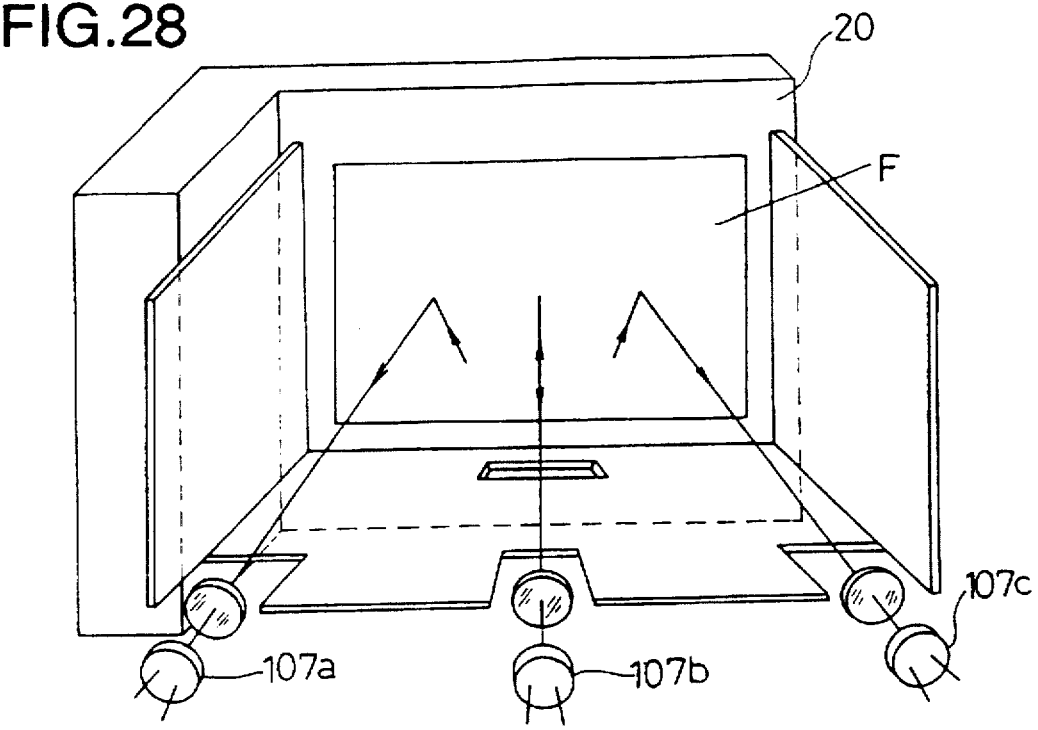

(1) FIG. 28 shows a different embodiment relating to the light adjustment for flash photography. As seen, this embodiment includes three light adjusting photo sensors 107a–107c.

The three photo sensors 107a–107c have a light detection range covering the panorama frame Fp and correspond to the three focus areas F1, Fc and Fr, respectively.

Figure 29:
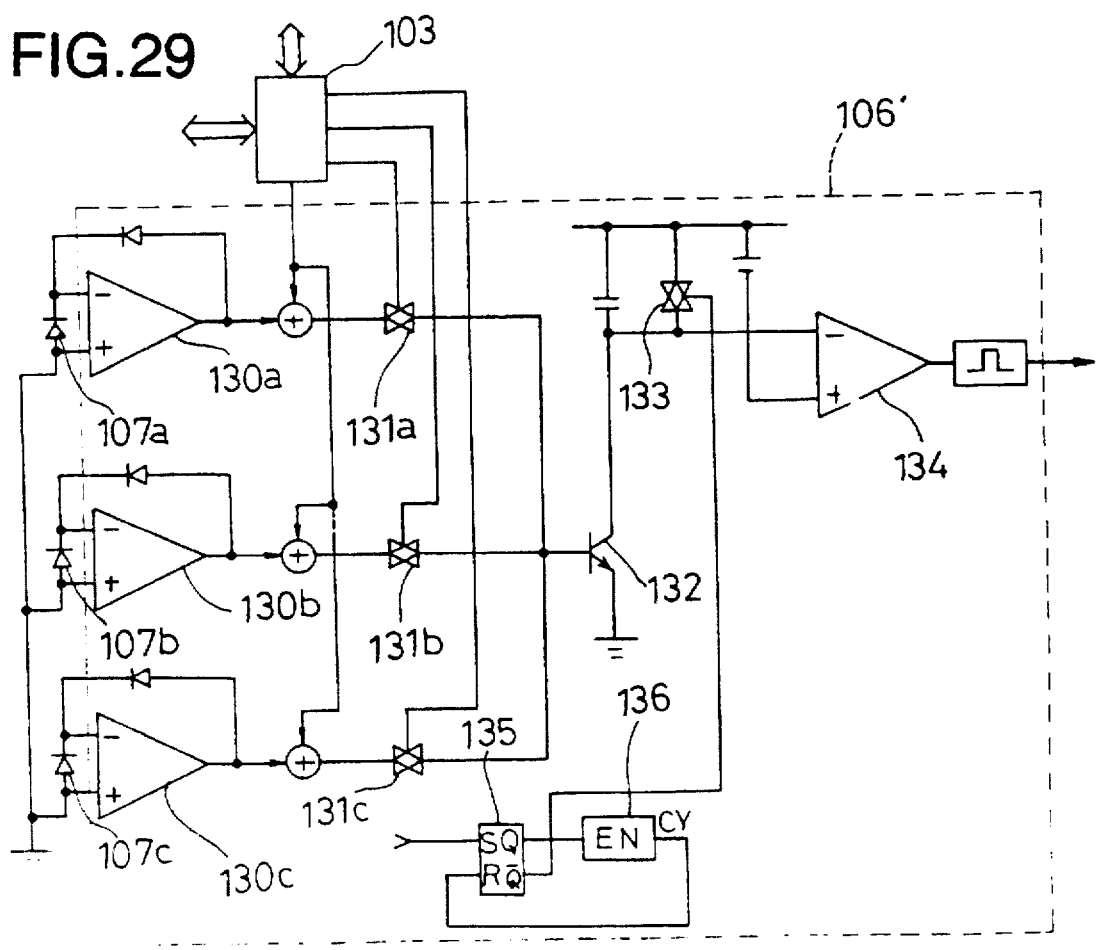

As shown in FIG. 29, a light adjusting circuit 106' includes operational amplifiers 130a–130c and switching elements 131a–131c associated with the three photo sensors 107a–107c. One of the photo sensors 107a–107c is selected by a switching element turned on by a control signal from the metering circuit 103. The selected photo sensor outputs a detection signal which is transmitted through a logarithm expanding transistor 132 to a comparator 134 for comparing the detection signal with a reference level. In FIG. 29, numeral 135 denotes a flip-flop for controlling start of light adjustment, and numeral 136 denotes a timer for controlling finish of light adjustment.

Figure 30:
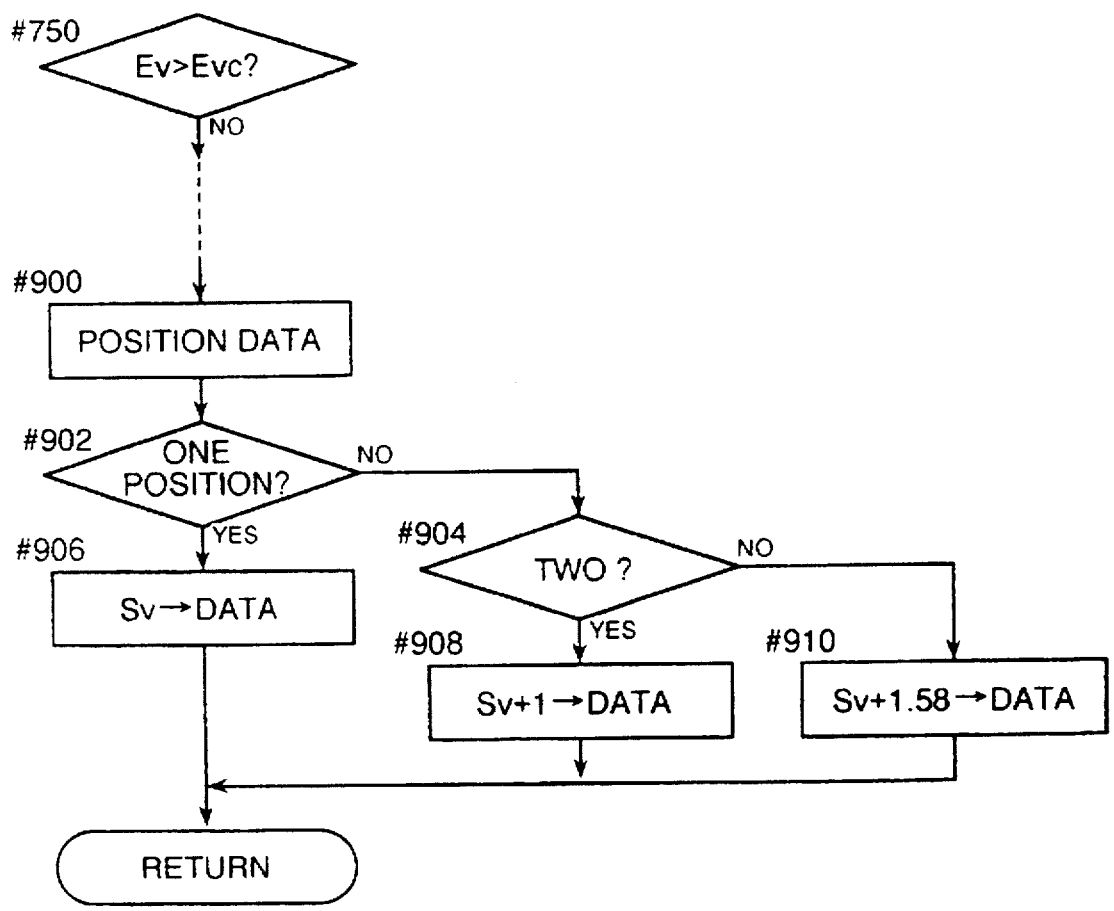

FIG. 30 shows a way in which the light adjustment is controlled by using the three photo sensors 107a–107c. After the exposure value Ev is found below the critical exposure value Evc at step #750 in FIG. 12 and steps #760 and #762 are executed, the program moves to step #900 for obtaining light adjustment position data, i.e. the area selected for the focus detection and the number of adjoining areas. After determining the number of adjoining areas (steps #902 and #904), the film sensitivity Sv is set as the light adjustment data at step #906 if the number is one. In the case of two adjoining areas, the quantity of light detected will be twofold. Thus, a sum of the film sensitivity Sv and "1" (=$\log_2 2$) for correction is set as the light adjustment data at step #908. In the case of three adjoining areas, the quantity of incident light will be threefold. Thus, a sum of the film sensitivity Sv and "1.58" (=$\log_2 3$) is set as the light adjustment data at step #910. Then the program returns to the original routine.

In this embodiment, the photo sensors 107a–107c have a light detecting range covering only the panorama frame Fp. This structure can be modified as follows: Their light detecting range may cover the full size frame Ff. Then, The light-adjusting data is corrected for the panorama frame Fp as described in the foregoing embodiment.

(2) The number of focus area is not limited to three, but may be any plural number.

(3) In carrying out the depth priority processing, at least two of the photographic objects in a plurality of focus areas may be considered for consideration. This number may be arranged variable.

(4) In the foregoing embodiment, the depth priority processing is carried out by combining stop-down of the aperture and movement of the photographic lens 2 to the corrected in-focus position. In working the present invention, however, the depth priority processing may be effected by means of the aperture stop-down only or the movement of the photographic lens 2 to the corrected in-focus position only. Where only the aperture stop-down is used, the present invention may be applied also to a camera including no construction for focus adjustment, e.g. a camera having a so-called focus aid function which only detects whether or not the photographic lens 2 is in an in-focus position with respect to a photographic object.

(5) In the foregoing embodiment, the frame size is switchable between the full size and panorama size. A different construction will be described hereinafter.

Figure 31:
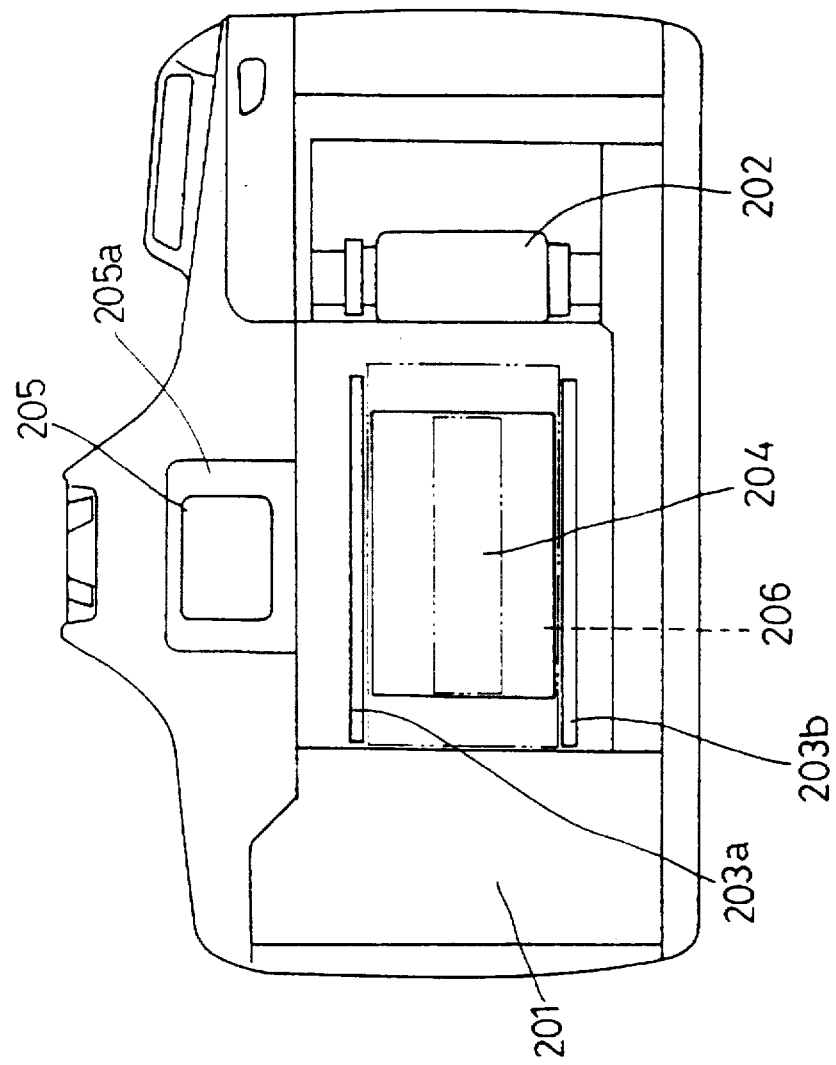

FIG. 31 is a rear view of a camera, with its back cover removed. This camera has approximately the same construction as the camera shown in FIGS. 1 through 3. This camera includes a cartridge chamber 201 for receiving a film cartridge, and a spool 202 for taking up a film drawn from the cartridge and exposed. The camera further includes a pair of upper and lower film guide rails 203a and 203b for guiding the film from the cartridge to the spool through tight contact with upper and lower edges of the film. Numeral 204 denotes an standard shape aperture for allowing photographic light to reach a film plane. Numeral 205a denotes an eyepiece section of a viewfinder optical system 205.

The way in which a panorama size picture is taken with this camera will be described hereunder. A light-shielding member 206 is mounted rearwardly of the aperture 204 as shown in a broken line in FIG. 31, that is between the aperture 204 and film F as shown in FIG. 32. Further, as shown in FIG. 33, this camera takes photographs with an angle finder 207 attached to the eyepiece section 205a of the viewfinder optical system.

As shown in FIGS. 32 and 33, the light-shielding member 206 has a rectangular shape of greater width than the aperture 204. The light-shielding member 206 includes a frame-defining opening 206a centrally thereof, which opening 206 corresponds in shape to the panorama size frame Fp. The light-shielding member 206 further includes an adhesive applied portion 206b at one side thereof for attachment to the aperture 204, and a pair of upper and lower film rails 206c and 206d on a face thereof opposed to the film F.

With the light-shielding member 206 attached to the aperture 204 through the adhesive applied portion 206b, only light passing through the frame-defining opening 206a reaches the film F, thereby realizing photographs in the panorama size frame Fp. By removing the light-shielding member 206 from the aperture 204, all the light passing through the aperture 204 reaches the film F to realize photographs in the full size frame Ff. Thus, the light-shielding member 206 may be added as an accessory to a camera designed for photographs in the full size frame Ff. This readily enables photography in the panorama size frame Fp as well.

Figure 36:
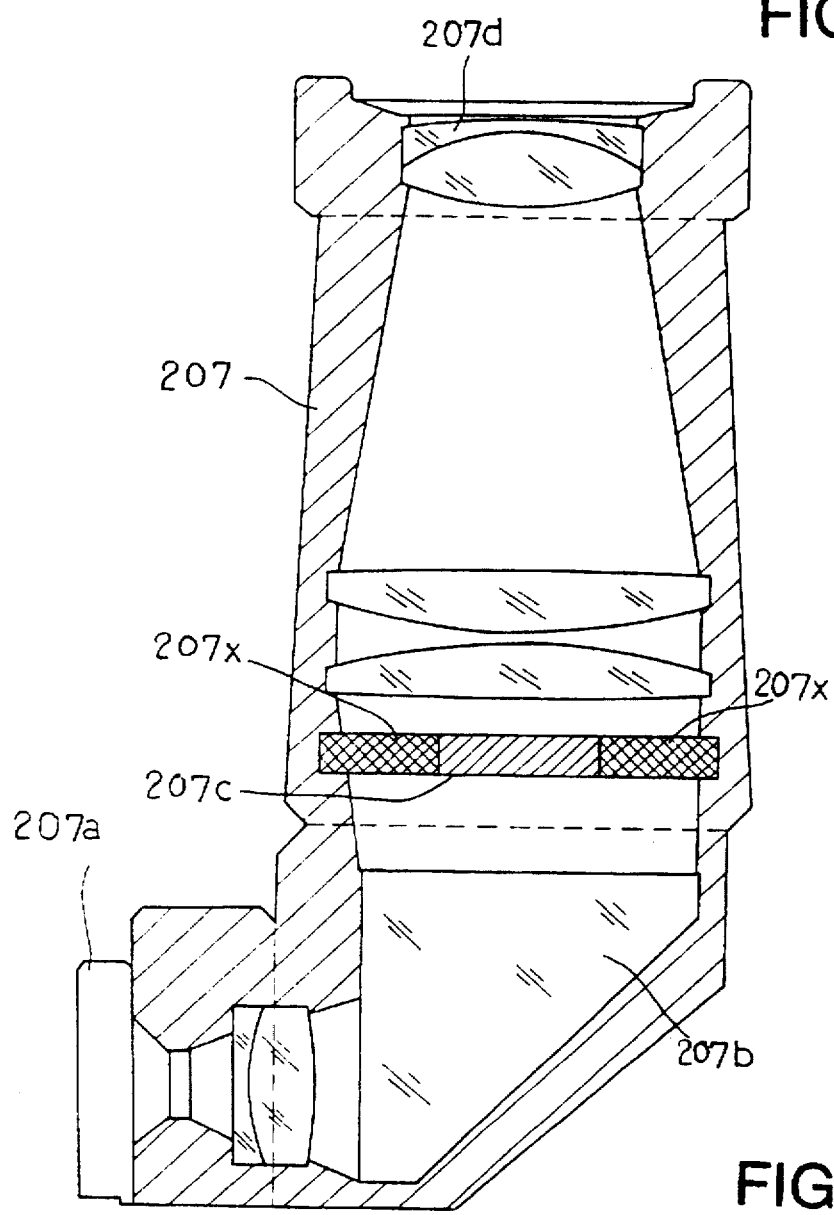
Figure 37:
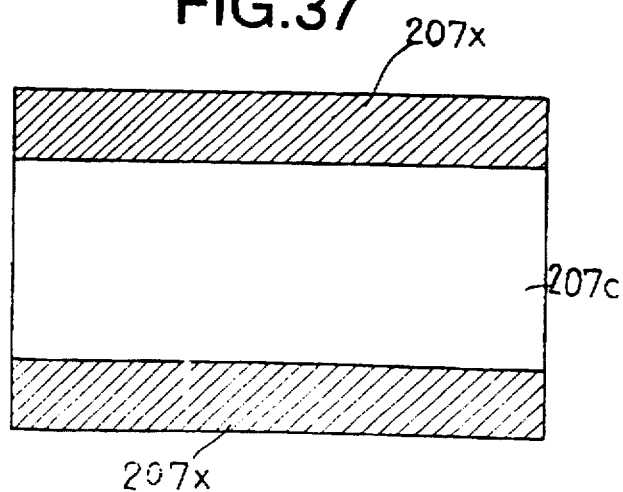

As shown in FIGS. 35 and 36, the angle finder 207 includes a mount portion 207a for engaging the eyepiece section 205a from above to fix the angle finder 207 to the camera body. As shown in FIG. 36, the angle finder 207 further includes a focusing plate 207c acting as an indicator disposed at a position where an image is formed by light entering through the eyepiece section 205a and refracted upwardly by a prism 207b. As shown in FIG. 37, the focusing plate 207c includes frames 207x for shielding light upwardly of a position corresponding to an upper edge of the panorama size frame Fp and downwardly of a position corresponding to a lower edge of the panorama size frame Fp.

Thus, the photographer is able to see, through an eyepiece 207a of the angle finder 207, only the portion not shielded by the frame 207x of a finder image formed on the focusing plate 207c, i.e. the portion corresponding to the photographic range defined by the light-shielding member 206 for the panorama size frame Fp. In this way, the photographer will know that the pictures being taken are in the size frame Fp. The display of a photographic object in the photographic range corresponding to the panorama size frame Fp helps reduce the chances of failure in taking pictures in the panorama size frame Fp. Thus, the angle finder 207 acts as an indicator.

The light-shielding member 206 and the angle finder 207 acting as an indicator are both offered as accessories to the camera. This feature, therefore, allows the user to take pictures in the panorama size frame Fp with great facility and at reasonable expenses.

Figure 38:
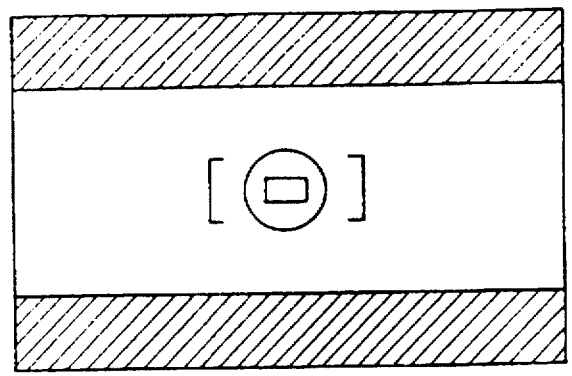
FIGS. 38 through 40 are plan views of modified indicating members.
Figure 39:
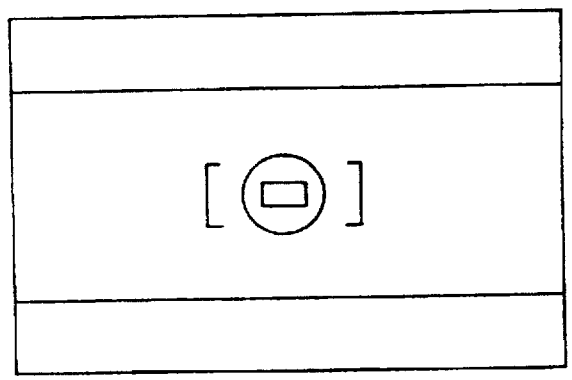
Figure 40:
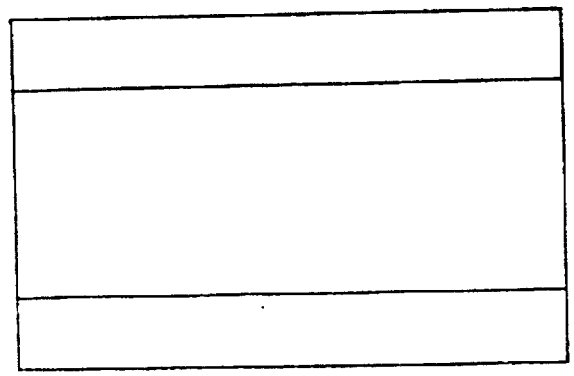
Figure 41:
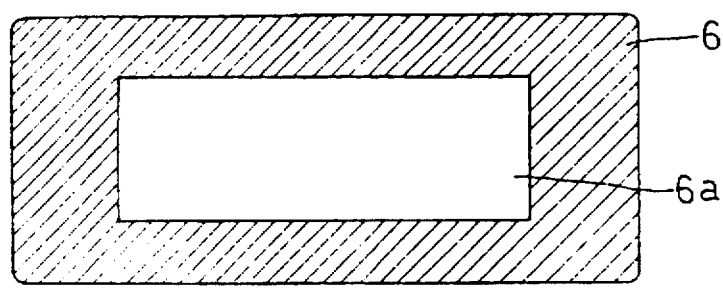
FIGS. 41 and 42 are rear views of modified light-shielding members.

The frame switching construction described above may be modified in various convenient ways. In a single lens reflex camera, for example, the indicator may comprise a focusing glass plate instead of the angle finder, which focusing glass causes light entering from the photographic optical system and reflected by the mirror to form an image in the viewfinder optical system. This focusing glass plate may be changed for the full size photography and the panorama photography. A focusing glass plate for the panorama photography acting as such an indicator may have black upper and lower portions for light-shielding purposes as shown in FIG. 38. Alternatively, the focusing glass plate may include horizontal lines, as shown in FIG. 39, at positions corresponding to the upper and lower edges of the panorama frame Fp. As shown in FIG. 40, the focusing plate 207c of the angle finder 207 in the above embodiment may have a construction similar to the latter example of the focusing glass plate. The focusing plate 207c in the above embodiment and the focusing glass plate may include a character indication for a clear indication of the panorama photography. The light-shielding member 206 may also have various specific constructions. As shown in FIG. 41, for example, the film rails 206c and 206d may be omitted therefrom. Though not shown, the adhesive applied portion 206b for attaching the light-shielding member 206 to the aperture 209 may be replaced by an arrangement in which a magnet is provided as part of the aperture 204 and the light-shielding member 206 is formed of steel, so that a portion of the light-shielding member 206 act as the attaching section. Alternatively, a threaded hole may be formed in the camera for screwing the light-shielding member 206 in position.

Further, though not shown, it is possible to provide a spare cover having a double cover construction integrating the light-shielding member 206 and indicator 207c. Then, an ordinary back cover is replaceable by the spare cover, with the light-shielding member 206 fixed to the spare cover being positioned rearwardly of the aperture, and the angle finder 207 being attached to the viewfinder optical system as in the foregoing embodiment. In this state, a cover similar to the ordinary cover and included as part of the spare cover may be opened for loading a film so that the film F is positioned rearwardly of the light-shielding member 206.

Figure 42:
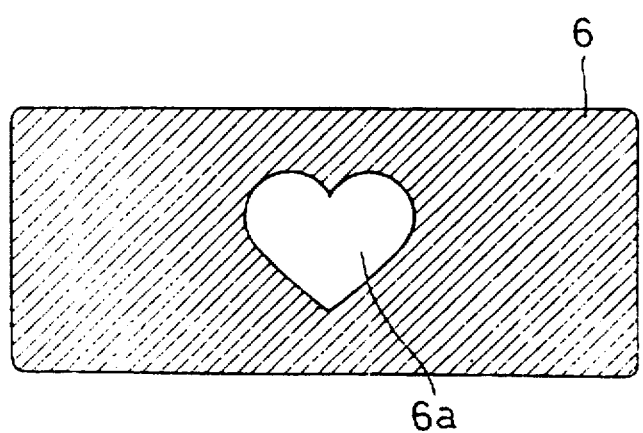

(6) While, in the embodiments described hereinbefore, the panorama size frame has been discussed as the special frame shape, other desired shapes may be employed as non-standard frames. One such example may be a heart shape for providing pictures with a special effect different from the ordinary rectangular frames, which may be useful in taking wedding photos, for example. FIG. 42 shows an example of the light-shielding member 206 suited for such purpose.

The embodiments have been described with reference to a camera for 35 mm films. However, the method of taking photographs in a special frame is not limited to any particular types of cameras or films. With a camera designed for 6×6 mm films, for example, the standard size is square and other aspects are unchanged. The standard size depends on the film or camera used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:
   scope specifying means for specifying a printing scope that designates an area on a film to be printed which is narrower than an area corresponding to an entire exposure region of a film and for outputting a form signal representing an aspect ratio of the printing scope;
   memory means in which a plurality of program lines are stored, each program line showing a combination of an aperture value and a time value corresponding to a brightness of an object;
   selecting means for selecting one of the program lines based on the form signal;
   light measuring means for measuring a brightness of an object;
   calculating means for calculating an aperture value and a time value based on the brightness measured by said light measuring means and the selected program line; and
   exposure controlling means for controlling an exposure operation based on the thus calculated aperture value and the thus calculated time value.

2. A camera according to claim 1, wherein the scope specifying means includes a form selecting means for selecting one of a first form and a second form, the aspect ratio of a horizontal dimension to a vertical dimension of the second form being larger than the aspect ratio of a horizontal dimension to a vertical dimension of the first form.

3. A camera according to claim 2, wherein the plurality of program lines include a first program line and a second program line, said selecting means selects the first program line when the first form is selected and selects the second program line when the second form is selected, and an aperture value that is calculated on the basis of the second program line is larger than an aperture value that is calculated on the basis of the first program line.

4. A camera according to claim 2, wherein the second form is delineated by shielding upper and lower portions of the exposure region.

5. A camera comprising:

mode selecting means for selecting one of a first mode to obtain a photograph having a first form and a second mode to obtain a photograph having a second form different from said first form, and for outputting a mode signal which designates the selected mode;

memory means in which a plurality of program lines are stored, each program line designating a combination of an aperture value and a time value corresponding to a brightness of an object;

selecting means for selecting one of the program lines based on the mode signal;

light measuring means for measuring a brightness of an object;

calculating means for calculating an aperture value and a time value based on the brightness measured by said light measuring means and the selected program line; and exposure controlling means for controlling an exposure operation based on the thus calculated aperture value and the thus calculated time value.

6. A camera according to claim 5, wherein the aspect ratio of a horizontal dimension to a vertical dimension of said second form is larger than the aspect ratio of a horizontal dimension to a vertical dimension of said first form.

7. A camera according to claim 6, wherein the first form corresponds to an entire exposure region of a film and the second form is delineated by shielding upper and lower portions of the exposure region.

8. A camera according to claim 6, wherein the plurality of program lines includes a first program line and a second program line, said selecting means selects the first program line when the first mode is selected and selects the second program line when the second mode is selected, and an aperture value that is calculated on the basis of the second program line is larger than an aperture value that is calculated on the basis of the first program line.

9. A camera comprising:

a mode selector which selects a photography mode between a first photography mode in which a certain area of a photographed image is to be printed in a subsequent printing process and a second photography mode in which an area narrower than said certain area is to be printed in a subsequent printing process;

a light measuring device which measures an object brightness;

a calculator which calculates a control aperture control value, so that the control aperture control value in said second photography mode is larger than that in said first photography mode.

10. A camera according to claim 9, wherein said area of said second photography mode is attained by omitting the upper and lower portions of said certain area.

11. A camera according to claim 9, wherein an aspect ratio of the second photography mode is greater than that of the first photography mode.

12. A camera comprising:

a mode selector which selects a photography mode between a first photography mode in which a certain area of a photographed image is to be printed in a subsequent printing process and a second photography mode in which an area having a greater aspect ratio than said certain area is to be printed in a subsequent printing process;

a light measuring device which measures an object brightness; and a calculator which calculates a control aperture control value, so that the control aperture control value in said second photography mode is larger than that in said first photography mode.

13. A camera according to claim 12, said area of said second photography mode is attained by omitting the upper and lower portions of said certain area.

* * * * *